United States Patent
Aftahi et al.

(10) Patent No.: US 8,909,220 B1
(45) Date of Patent: Dec. 9, 2014

(54) METHOD AND APPARATUS FOR GLOBAL BANDWIDTH MANAGEMENT

(75) Inventors: Sima Aftahi, Fairfax, VA (US); Antoine Raymond Naaman, Washington, DC (US); Joseph Jude Boone, Fairfax, VA (US); Peng Zhao, Rockville, MD (US)

(73) Assignee: VT iDirect, Inc., Herndon, VA (US)

( * ) Notice: Subject to any disclaimer, the term of this patent is extended or adjusted under 35 U.S.C. 154(b) by 202 days.

(21) Appl. No.: 13/618,965

(22) Filed: Sep. 14, 2012

Related U.S. Application Data

(60) Provisional application No. 61/547,497, filed on Oct. 14, 2011.

(51) Int. Cl.
| | |
|---|---|
| *H04W 4/00* | (2009.01) |
| *H04W 40/00* | (2009.01) |
| *H04B 3/08* | (2006.01) |
| *H04W 28/20* | (2009.01) |
| *H04W 84/06* | (2009.01) |
| *H04B 7/02* | (2006.01) |

(52) U.S. Cl.
CPC .............. *H04W 28/20* (2013.01); *H04W 84/06* (2013.01); *H04B 7/02* (2013.01)
USPC ............ 455/427; 455/430; 455/446; 370/316

(58) Field of Classification Search
CPC ......... H04B 7/02; H04B 7/185; H04W 28/20; H04W 84/06
USPC ................. 455/427, 446, 430, 431; 370/310, 370/316–327

See application file for complete search history.

(56) References Cited

U.S. PATENT DOCUMENTS

| | | | | |
|---|---|---|---|---|
| 6,278,876 | B1 * | 8/2001 | Joshi et al. ..................... | 455/427 |
| 2003/0031141 | A1 * | 2/2003 | Schweinhart et al. ........ | 370/316 |
| 2010/0097932 | A1 * | 4/2010 | Wu ............................... | 370/235 |
| 2010/0120418 | A1 * | 5/2010 | Agarwal ....................... | 455/427 |
| 2010/0128659 | A1 * | 5/2010 | Dziong ......................... | 370/316 |

* cited by examiner

*Primary Examiner* — Nizar Sivji
(74) *Attorney, Agent, or Firm* — Oblon, Spivak, McClelland, Maier & Neustadt, L.L.P.

(57) ABSTRACT

A satellite communication system includes a global bandwidth enforcer that allocates bandwidth from the global bandwidth pool in accordance with a group service plan having a predetermined geographic scope. The system further includes an allocation of bandwidth from the one or more channels of the one or more beams of a first satellite in accordance with the group service plan. The system further includes a second satellite access station that receives an allocation of bandwidth from the one or more channels of the one or more beams of the second satellite in accordance with the group service plan. The system further includes a first sub-network associated with the first satellite access having a coverage area in the predetermined geographic scope of the group service plan, where the first sub-network receives an allocation of bandwidth from the first satellite access station in accordance with the group service plan.

39 Claims, 43 Drawing Sheets

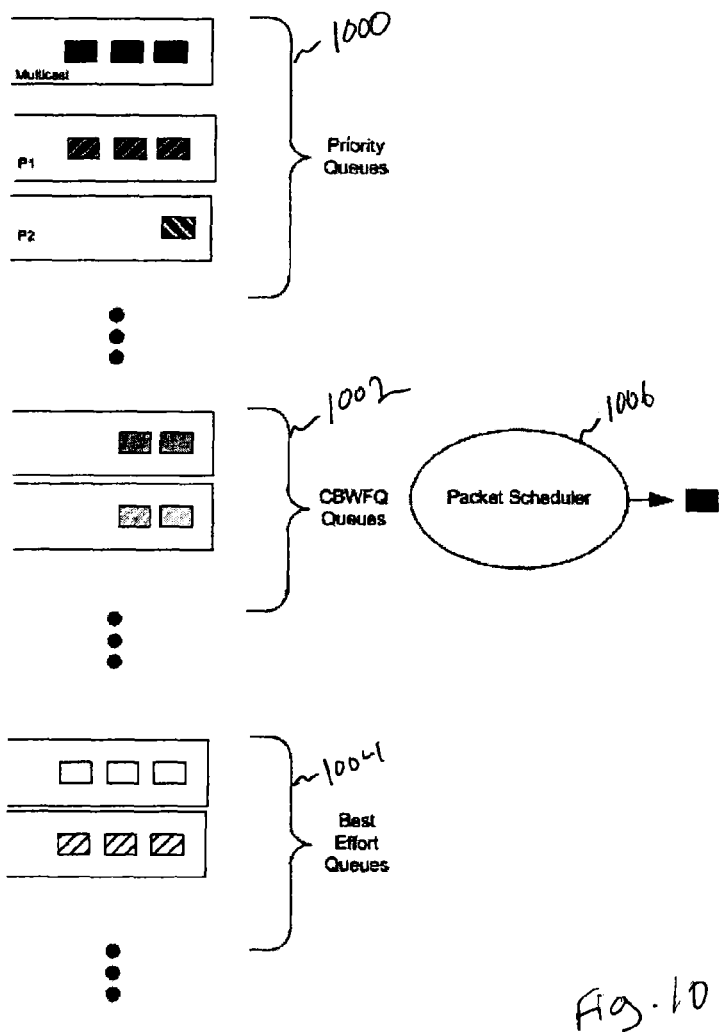

Packet Scheduling

Service Levels are defined for each unique packet classification result. Operator may configure:

Queue Type
Queue Priority (Multicast, P1 -> P4) (if Priority Queue)
Queue CBWFQ Cost (If CBWFQ Queue)
Queue depth
Queue Drop Policy
Packet Marking Rules (Diffserv/TOS Marking)
CIR Trigger Indication
Real Time Weight Each priority level preempts the higher numbered priority levels. After Multicast, P1 will receive exclusive service until it is emptied, then P2 will be serviced.

After all priority queues are serviced and emptied the classic CBWFQ algorithm is allowed an opportunity to service its queues.

Arrival of any packets at the priority level queues will preempt CBWFQ.

Note that once a packet is released from the scheduler it cannot be preempted.

Best effort queues are serviced only after all priority queues and CBWFQ queues are empty.

Any combination of Priority Queues, CBWFQ queus, and Best Effort queues can be utilized.

Fig. 10

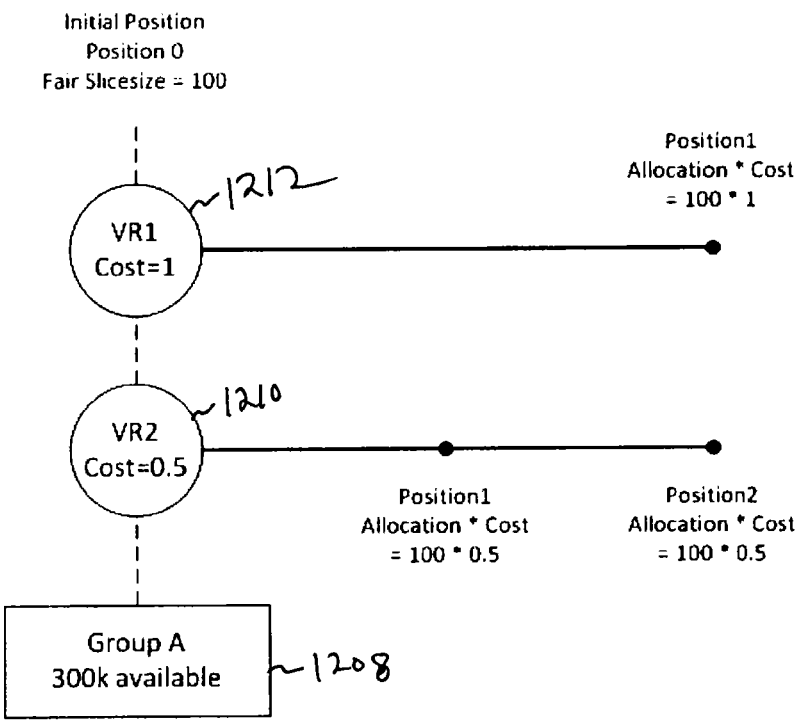
Fig. 12-C

| MODCOD | Cost |
|---|---|
| 16APSK8/9 | 1.000 |
| 16APSK5/6 | 0.923 |
| 16APSK4/5 | 0.872 |
| 16APSK3/4 | 0.820 |
| 16APSK2/3 | 0.743 |
| 8PSK8/9 | 0.752 |
| 8PSK5/6 | 0.694 |
| 8PSK3/4 | 0.617 |
| 8PSK2/3 | 0.559 |
| 8PSK3/5 | 0.501 |
| QPSK8/9 | 0.503 |
| QPSK5/6 | 0.464 |
| QPSK4/5 | 0.439 |
| QPSK3/4 | 0.413 |
| QPSK2/3 | 0.374 |
| QPSK3/5 | 0.335 |
| QPSK1/2 | 0.245 |
| QPSK2/5 | 0.219 |
| QPSK1/3 | 0.180 |
| QPSK1/4 | 0.103 |

*Fig. 17*

|  | SSPC1 | SSPC2 | SSPC3 |  |
|---|---|---|---|---|
| VR CIR | 1M | 512K | 1M |  |
| VR MIR | 2M | 2M | 2M |  |
| VR Current Demand | 2M | 1M | 512K | Aggregate |
| VR Current CIR Demand | 1M | 512K | 512K | 2M |
| VR Current MIR Demand | 2M | 1M | 512K | 3.5M |

FIG. 21B

| Bracket # | b0 | b1 | b2 | B3 | b4 | b5 | b6 | b7 | b8 | b9 | b10 | b11 |
|---|---|---|---|---|---|---|---|---|---|---|---|---|
| Bracket Size | 1 | 4 | 8 | 16 | 32 | 64 | 128 | 256 | 512 | 1024 | 2048 | 4096 |

FIG. 23A

| 1 | 4 | 8 | 16 | 32 | 64 | 128 | 256 | 512 | 1024 | 2048 | 4096 |
|---|---|---|---|---|---|---|---|---|---|---|---|
| b0 | b1 | b2 | b3 | b4 | b5 | b6 | b7 | b8 | b9 | b10 | b11 |
| 1 | 4 | 8 | 16 | 32 | 64 | 75 | | | | | |
| VR1 CIR demand vector with CIR demand = 200 Ksps, cost = 1.0 ||||||||||||

| 1 | 4 | 8 | 16 | 32 | 64 | 128 | 256 | 512 | 1024 | 2048 | 4096 |
|---|---|---|---|---|---|---|---|---|---|---|---|
| b0 | b1 | b2 | b3 | b4 | b5 | b6 | b7 | b8 | b9 | b10 | b11 |
| 1 | 16 | 32 | 64 | 87 | | | | | | | |
| VR2 CIR demand vector with CIR demand = 200 Ksps, cost = 0.25 ||||||||||||

FIG. 23B

| VR CIR Demand | | | | | | | | | | | | | | |
|---|---|---|---|---|---|---|---|---|---|---|---|---|---|---|
| Cost | Demand | Pri | b0 | b1 | b2 | b3 | b4 | b5 | b6 | b7 | b8 | b9 | b10 | b11 |
| 1.00 | 200 | 1 | 1 | 4 | 8 | 16 | 32 | 64 | 75 | | | | | |
| 0.25 | 200 | 2 | 1 | 16 | 32 | 64 | 87 | | | | | | | |
| 1.00 | 700 | 2 | 1 | 4 | 8 | 16 | 32 | 64 | 128 | 256 | 191 | | | |
| 0.50 | 500 | 2 | 1 | 8 | 16 | 32 | 64 | 128 | 251 | | | | | |
| 0.25 | 300 | 3 | 1 | 16 | 32 | 64 | 128 | 59 | | | | | | |
| 0.10 | 100 | 3 | 1 | 40 | 59 | | | | | | | | | |

FIG. 24A

| iNet CIR Demand Matrix | | | | | | | | | | | | | |
|---|---|---|---|---|---|---|---|---|---|---|---|---|---|
| Demand | | b0 | b1 | b2 | b3 | b4 | b5 | b6 | b7 | b8 | b9 | b10 | b11 |
| 200 | p1 | 1 | 4 | 8 | 16 | 32 | 64 | 75 | | | | | |
| 1400 | p2 | 3 | 28 | 56 | 112 | 183 | 192 | 379 | 256 | 191 | | | |
| 400 | p3 | 2 | 56 | 91 | 64 | 128 | 59 | | | | | | |
| | ... | | | | | | | | | | | | |
| | p16 | | | | | | | | | | | | |

FIG. 24B

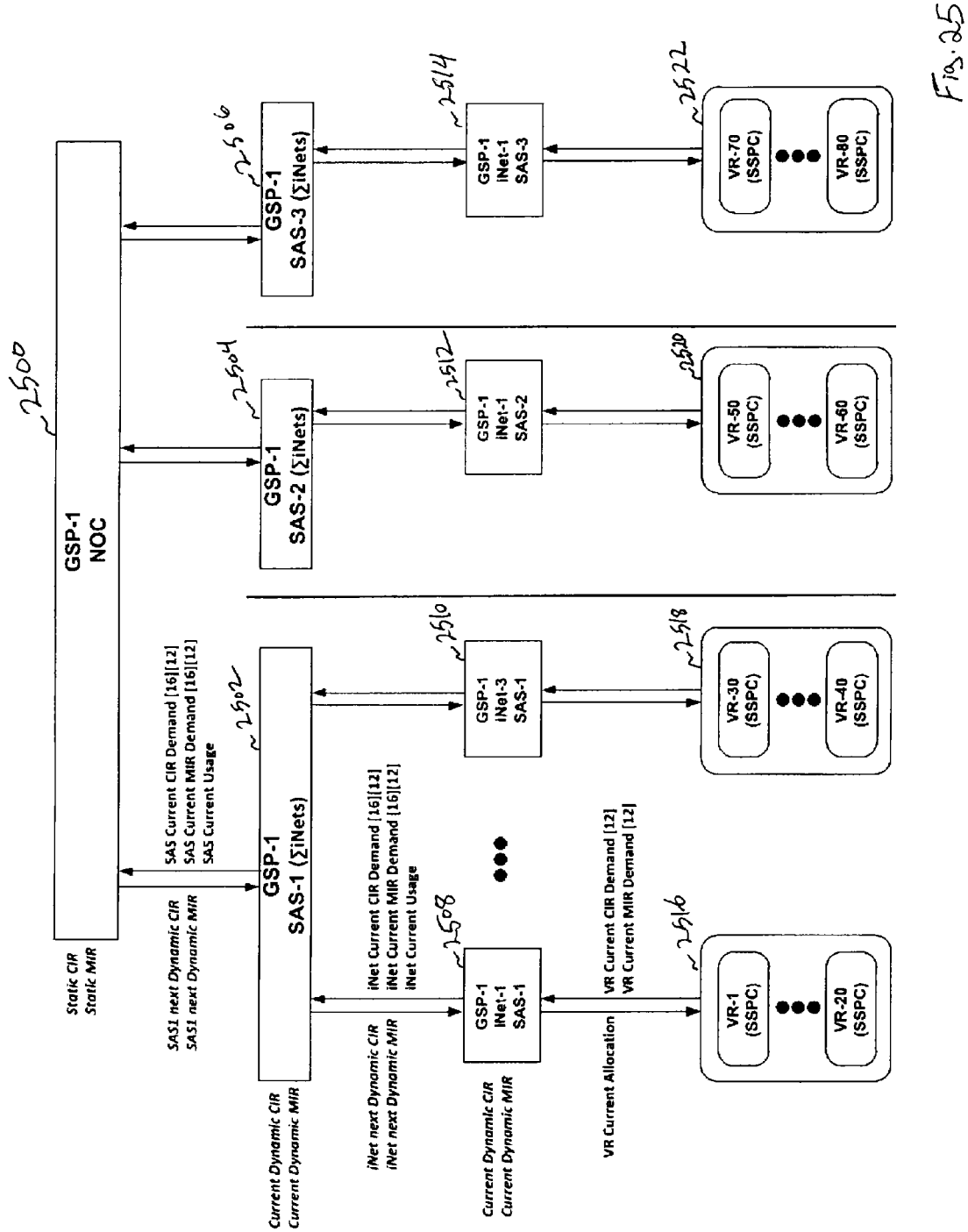

| VR | Pri | Cost | CIR | MIR | Demand |
|----|-----|------|------|------|--------|
| 1  | 1   | 1.00 | 256  | 512  | 400    |
| 2  | 1   | 0.50 | 128  | 128  | 200    |
| 3  | 2   | 0.25 | 512  | 1048 | 700    |
| 4  | 2   | 1.00 | 1024 | 2048 | 500    |
| 5  | 2   | 1.00 | 128  | 256  | 300    |
| 6  | 2   | 0.25 | 128  | 256  | 100    |
| 7  | 2   | 1.00 | 512  | 512  | 200    |
| 8  | 2   | 0.10 | 128  | 256  | 100    |
| 9  | 2   | 1.00 | 1024 | 2048 | 200    |
| 10 | 2   | 0.20 | 128  | 256  | 300    |
| 11 | 2   | 0.50 | 512  | 512  | 400    |
| 12 | 3   | 1.00 | 128  | 256  | 100    |
| 13 | 3   | 0.10 | 512  | 1048 | 300    |
| 14 | 3   | 1.00 | 512  | 512  | 300    |
| 15 | 3   | 1.00 | 512  | 1048 | 700    |
| 16 | 3   | 0.20 | 1024 | 2048 | 500    |
| 17 | 3   | 0.50 | 128  | 256  | 500    |
| 18 | 3   | 0.10 | 512  | 1048 | 400    |
| 19 | 4   | 1.00 | 128  | 256  | 300    |
| 20 | 4   | 1.00 | 512  | 1024 | 700    |

| VR | CIR-D | MIR-D |
|----|-------|-------|
| 1  | 256   | 400   |
| 2  | 128   | 128   |
| 3  | 512   | 700   |
| 4  | 500   | 500   |
| 5  | 128   | 256   |
| 6  | 100   | 100   |
| 7  | 200   | 200   |
| 8  | 100   | 100   |
| 9  | 200   | 200   |
| 10 | 128   | 256   |
| 11 | 400   | 400   |
| 12 | 100   | 100   |
| 13 | 300   | 300   |
| 14 | 300   | 300   |
| 15 | 512   | 700   |
| 16 | 500   | 500   |
| 17 | 128   | 256   |
| 18 | 400   | 400   |
| 19 | 128   | 256   |
| 20 | 512   | 700   |

| | iNet-1 GSP-1 VR CIR Demand Vector [12] | | | | | | | | | | | |
|---|---|---|---|---|---|---|---|---|---|---|---|---|
| Pri | b0 | b1 | b2 | b3 | b4 | b5 | b6 | b7 | b8 | b9 | b10 | b11 |
| 1 | 1 | 4 | 8 | 16 | 32 | 64 | 128 | 3 | 0 | 0 | 0 | 0 |
| 1 | 1 | 8 | 16 | 32 | 64 | 7 | 0 | 0 | 0 | 0 | 0 | 0 |
| 2 | 1 | 16 | 32 | 64 | 128 | 256 | 15 | 0 | 0 | 0 | 0 | 0 |
| 2 | 1 | 4 | 8 | 16 | 32 | 64 | 128 | 247 | 0 | 0 | 0 | 0 |
| 2 | 1 | 4 | 8 | 16 | 32 | 64 | 3 | 0 | 0 | 0 | 0 | 0 |
| 2 | 1 | 16 | 32 | 51 | 0 | 0 | 0 | 0 | 0 | 0 | 0 | 0 |
| 2 | 1 | 4 | 8 | 16 | 32 | 64 | 75 | 0 | 0 | 0 | 0 | 0 |
| 2 | 1 | 40 | 59 | 0 | 0 | 0 | 0 | 0 | 0 | 0 | 0 | 0 |
| 2 | 1 | 4 | 8 | 16 | 32 | 64 | 75 | 0 | 0 | 0 | 0 | 0 |
| 2 | 1 | 20 | 40 | 67 | 0 | 0 | 0 | 0 | 0 | 0 | 0 | 0 |
| 2 | 1 | 8 | 16 | 32 | 64 | 128 | 151 | 0 | 0 | 0 | 0 | 0 |
| 3 | 1 | 4 | 8 | 16 | 32 | 39 | 0 | 0 | 0 | 0 | 0 | 0 |
| 3 | 1 | 40 | 80 | 160 | 19 | 0 | 0 | 0 | 0 | 0 | 0 | 0 |
| 3 | 1 | 4 | 8 | 16 | 32 | 64 | 128 | 47 | 0 | 0 | 0 | 0 |
| 3 | 1 | 4 | 8 | 16 | 32 | 64 | 128 | 256 | 3 | 0 | 0 | 0 |
| 3 | 1 | 20 | 40 | 80 | 160 | 199 | 0 | 0 | 0 | 0 | 0 | 0 |
| 3 | 1 | 8 | 16 | 32 | 64 | 7 | 0 | 0 | 0 | 0 | 0 | 0 |
| 3 | 1 | 40 | 80 | 160 | 119 | 0 | 0 | 0 | 0 | 0 | 0 | 0 |
| 4 | 1 | 4 | 8 | 16 | 32 | 64 | 3 | 0 | 0 | 0 | 0 | 0 |
| 4 | 1 | 4 | 8 | 16 | 32 | 64 | 128 | 256 | 3 | 0 | 0 | 0 |

| | iNet-1 GSP-1 CIR Demand Matrix [16][12] | | | | | | | | | | | |
|---|---|---|---|---|---|---|---|---|---|---|---|---|
| | b0 | b1 | b2 | b3 | b4 | b5 | b6 | b7 | b8 | b9 | b10 | b11 |
| P1 | 2 | 12 | 24 | 48 | 96 | 71 | 128 | 3 | 0 | 0 | 0 | 0 |
| P2 | 9 | 116 | 211 | 278 | 320 | 640 | 447 | 247 | 0 | 0 | 0 | 0 |
| P3 | 7 | 120 | 240 | 480 | 458 | 373 | 256 | 303 | 3 | 0 | 0 | 0 |
| P4 | 2 | 8 | 16 | 32 | 64 | 128 | 131 | 256 | 3 | 0 | 0 | 0 |

| Beam-1 (iNet-1 & iNet-2) GSP-1 CumulativeCIR Demand Matrix [16][12] | | | | | | | | | | | | |
|---|---|---|---|---|---|---|---|---|---|---|---|---|
|  | b0 | b1 | b2 | b3 | b4 | b5 | b6 | b7 | b8 | b9 | b10 | b11 |
| P1 | 7 | 55 | 151 | 330 | 586 | 952 | 1209 | 1212 | 1212 | 1212 | 1212 | 1212 |
| P2 | 1225 | 1373 | 1648 | 2054 | 2517 | 3292 | 3942 | 4436 | 4436 | 4436 | 4436 | 4436 |
| P3 | 4453 | 4649 | 5041 | 5812 | 6697 | 7813 | 8488 | 9094 | 9100 | 9100 | 9100 | 9100 |
| P4 | 9103 | 9115 | 9139 | 9187 | 9283 | 9475 | 9609 | 9865 | 9868 | 9868 | 9868 | 9868 |
2830
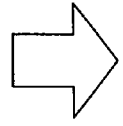
| Beam-1 (iNet-1 & iNet-2) GSP-1 CumulativeCIR Demand Matrix [16][12] | | | | | | | | | | | | |
|---|---|---|---|---|---|---|---|---|---|---|---|---|
|  | b0 | b1 | b2 | b3 | b4 | b5 | b6 | b7 | b8 | b9 | b10 | b11 |
| P1 | 7 | 55 | 151 | 330 | 586 | 952 | 1209 | 1212 | 1212 | 1212 | 1212 | 1212 |
| P2 | 1225 | 1373 | 1648 | 2054 | 2517 | 3292 | 3942 | 4436 | 4436 | 4436 | 4436 | 4436 |
| P3 | 4453 | 4649 | 5000 | 0 | 0 | 0 | 0 | 0 | 0 | 0 | 0 | 0 |
| P4 | 0 | 0 | 0 | 0 | 0 | 0 | 0 | 0 | 0 | 0 | 0 | 0 |
2832
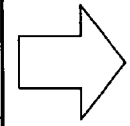
*Fig. 28B (1)* iNet-1 GSP-1 CIR Demand Matrix [16][12] - Adjusted to Enforce Beam Limit — 2834

| | b0 | b1 | b2 | b3 | b4 | b5 | b6 | b7 | b8 | b9 | b10 | b11 |
|---|---|---|---|---|---|---|---|---|---|---|---|---|
| P1 | 2 | 12 | 24 | 48 | 96 | 71 | 128 | 3 | 0 | 0 | 0 | 0 |
| P2 | 9 | 116 | 211 | 278 | 320 | 640 | 447 | 247 | 0 | 0 | 0 | 0 |
| P3 | 7 | 120 | 215 | 0 | 0 | 0 | 0 | 0 | 0 | 0 | 0 | 0 |
| P4 | 0 | 0 | 0 | 0 | 0 | 0 | 0 | 0 | 0 | 0 | 0 | 0 | iNet-2 GSP-1 CIR Demand Matrix [16][12] - Adjusted to Enforce Beam Limit — 2836

| | b0 | b1 | b2 | b3 | b4 | b5 | b6 | b7 | b8 | b9 | b10 | b11 |
|---|---|---|---|---|---|---|---|---|---|---|---|---|
| P1 | 5 | 36 | 72 | 131 | 160 | 295 | 129 | 0 | 0 | 0 | 0 | 0 |
| P2 | 4 | 32 | 64 | 128 | 143 | 135 | 203 | 247 | 0 | 0 | 0 | 0 |
| P3 | 10 | 76 | 136 | 0 | 0 | 0 | 0 | 0 | 0 | 0 | 0 | 0 |
| P4 | 0 | 0 | 0 | 0 | 0 | 0 | 0 | 0 | 0 | 0 | 0 | 0 |

*Fig. 28B (2)* iNet-1 GSP-1 CIR Demand Matrix [16][12]

| | b0 | b1 | b2 | b3 | b4 | b5 | b6 | b7 | b8 | b9 | b10 | b11 |
|---|---|---|---|---|---|---|---|---|---|---|---|---|
| P1 | 2 | 12 | 24 | 48 | 96 | 71 | 128 | 3 | 0 | 0 | 0 | 0 |
| P2 | 9 | 116 | 211 | 278 | 320 | 640 | 447 | 247 | 0 | 0 | 0 | 0 |
| P3 | 7 | 120 | 240 | 480 | 458 | 373 | 256 | 303 | 3 | 0 | 0 | 0 |
| P4 | 2 | 8 | 16 | 32 | 64 | 128 | 131 | 256 | 3 | 0 | 0 | 0 |

Total GSP-1 Demand from iNet-1: 5,532    GSP-1 Dynamic CIR Allocation for iNet-1: 2,405 iNet-2 GSP-1 CIR Demand Matrix [16][12]

| | b0 | b1 | b2 | b3 | b4 | b5 | b6 | b7 | b8 | b9 | b10 | b11 |
|---|---|---|---|---|---|---|---|---|---|---|---|---|
| P1 | 5 | 36 | 72 | 131 | 160 | 295 | 129 | 0 | 0 | 0 | 0 | 0 |
| P2 | 4 | 32 | 64 | 128 | 143 | 135 | 203 | 247 | 0 | 0 | 0 | 0 |
| P3 | 10 | 76 | 152 | 291 | 427 | 743 | 419 | 303 | 3 | 0 | 0 | 0 |
| P4 | 1 | 4 | 8 | 16 | 32 | 64 | 3 | 0 | 0 | 0 | 0 | 0 |

Total GSP-1 Demand from iNet-2: 4,336    GSP-1 Dynamic CIR Allocation for iNet-2: 1,537 iNet-3 GSP-1 CIR Demand Matrix [16][12]

| | b0 | b1 | b2 | b3 | b4 | b5 | b6 | b7 | b8 | b9 | b10 | b11 |
|---|---|---|---|---|---|---|---|---|---|---|---|---|
| P1 | 0 | 0 | 0 | 0 | 0 | 0 | 0 | 0 | 0 | 0 | 0 | 0 |
| P2 | 8 | 116 | 232 | 298 | 224 | 103 | 75 | 0 | 0 | 0 | 0 | 0 |
| P3 | 5 | 40 | 80 | 147 | 171 | 110 | 128 | 47 | 0 | 0 | 0 | 0 |
| P4 | 6 | 48 | 96 | 192 | 363 | 398 | 259 | 303 | 3 | 0 | 0 | 0 |

Total GSP-1 Demand from iNet-3: 3,452    GSP-1 Dynamic CIR Allocation for iNet-3: 1,056

FIG. 28E

METHOD AND APPARATUS FOR GLOBAL BANDWIDTH MANAGEMENT

CROSS-REFERENCE TO RELATED APPLICATIONS

This application claims the benefit under 35 U.S.C. §119 (e) of the earlier filing date of U.S. Provisional Application No. 61/547,497 entitled "Method and Apparatus for Global Bandwidth Management" filed Oct. 14, 2011, the entirety of which is incorporated herein by reference.

BACKGROUND

An organization can purchase capacity for services associated with a group of terminals within a satellite network. Particularly, the organization purchases the right to use bandwidth in the satellite network. However, the bandwidth demands of the organization are not constant in time or across all channels. Accordingly, when the bandwidth demands of the organization are low, the network resources are inefficiently used since unused capacity in various channels is not reallocated to another party that requires the bandwidth.

SUMMARY

According to some embodiments, a satellite communication system includes a plurality of satellites each having one or more beams with each beam having one or more channels and the one or more channels from each of the one or more beams from each satellite providing a global bandwidth pool. The a global bandwidth enforcer that allocates bandwidth from the global bandwidth pool in accordance with a group service plan having a predetermined geographic scope. The system further includes a first satellite access station that receives the one or more channels of the one or more beams from a first satellite included in the plurality of satellites, where the first satellite access station receives, from the global bandwidth enforcer, an allocation of bandwidth from the one or more channels of the one or more beams of the first satellite in accordance with the group service plan. The system further includes a second satellite access station that receives the one or more channels of the one or more beams from a second satellite included in the plurality of satellites, the second satellite access station receiving, from the global bandwidth enforcer, an allocation of bandwidth from the one or more channels of the one or more beams of the second satellite in accordance with the group service plan. The system also includes a first sub-network associated with the first satellite access station that has a channel bandwidth manager controlling the bandwidth pool of the channel associated with the sub-network and the channel associated with a beam having a coverage area in the predetermined geographic scope of the group service plan. The first sub-network receives an allocation of bandwidth from the first satellite access station in accordance with the group service plan, where the first sub-network provides the allocated bandwidth to each user terminal service associated with the group service plan and located in the coverage area of the first sub-network.

According to some embodiments a satellite communication method includes allocating, by a global bandwidth enforcer, bandwidth from a global bandwidth pool in accordance with a group service plan having a predetermined geographic scope, the global bandwidth pool provided by a plurality of satellites each having one or more beams, each beam having one or more channels and the one or more channels from each of the one or more beams from each satellite. The method further includes providing, to a first satellite access station that receives the one or more channels of the one or more beams from a first satellite included in the plurality of satellites, an allocation of bandwidth from the global bandwidth pool in accordance with the group service plan. The method further includes providing, to a second satellite access station that receives the one or more channels of the one or more beams from a second satellite included in the plurality of satellites, an allocation of bandwidth from the global bandwidth pool in accordance with the group service plan. Additionally a first sub-network associated with the first satellite access station and having a channel bandwidth manager controlling the bandwidth pool of the channel associated with the sub-network and the channel associated with a beam having a coverage area in the predetermined geographic scope of the group service plan, receives an allocation of bandwidth from the first satellite access station in accordance with the group service plan, the first sub-network providing the allocated bandwidth to each user terminal service associated with the group service plan and located in the coverage area of the first sub-network.

According to some embodiments, a non-transitory computer readable storage medium having instructions stored therein, which when executed by a processor in a global bandwidth enforcer cause the processor to execute a method. The method includes allocating, by the global bandwidth enforcer, bandwidth from a global bandwidth pool in accordance with a group service plan having a predetermined geographic scope, the global bandwidth pool provided by a plurality of satellites each having one or more beams, each beam having one or more channels and the one or more channels from each of the one or more beams from each satellite. The method further includes providing, to a first satellite access station that receives the one or more channels of the one or more beams from a first satellite included in the plurality of satellites, an allocation of bandwidth from the global bandwidth pool in accordance with the group service plan. The method further includes providing, to a second satellite access station that receives the one or more channels of the one or more beams from a second satellite included in the plurality of satellites, an allocation of bandwidth from the global bandwidth pool in accordance with the group service plan. Additionally a first sub-network associated with the first satellite access station and having a channel bandwidth manager controlling the bandwidth pool of the channel associated with the sub-network and the channel associated with a beam having a coverage area in the predetermined geographic scope of the group service plan, receives an allocation of bandwidth from the first satellite access station in accordance with the group service plan, the first sub-network providing the allocated bandwidth to each user terminal service associated with the group service plan and located in the coverage area of the first sub-network.

An embodiment includes bandwidth management on a global basis across multiple GQoS systems, each managing a separate bandwidth pool, allowing a service provider to sell Global or Regional capacity. In a global satellite communication system, the GBWM allows bandwidth management across multiple satellites with multiple beams and multiple channels per beam. End-user terminals may be at fixed locations or roaming across multiple beams and satellites, globally or regionally.

An embodiment includes dynamic adjustment of QoS parameters across multiple GQoS systems based on a Global configuration of parameters (CIR, MIR, Priority and Cost) for each user group node, real-time demand and congestion measurements from each individual GQoS system. This scheme allows the operator of the Global system to offer a Global or Regional Service Level Agreement (SLA) with QoS parameters such as CIR and MIR that on a global or regional basis. A customer under such a scenario may purchase a Global or Regional capacity allowing a group of end-user terminals to roam across multiple beams and satellites. The dynamic adjustment makes it possible to overcome the above described inefficiencies associated with a static configuration of individual channels.

An embodiment includes a method of reporting demand in brackets for a leaf node that factors in the QoS Cost, CIR and MIR parameters and allows the aggregation of demand for a group of leaf nodes into a matrix by Priority and demand brackets. The QoS Cost parameter may be used to provide proportional allocation in contention based on a configured Cost, proportional allocation in contention with respect to a configured CIR and choices in the allocation behavior such as by bandwidth or by information rate in an adaptive satellite communication environment where end-user terminals are operating at different modulation and coding.

An embodiment includes a method of bandwidth allocation globally based on demand matrices from various GQoS systems.

An embodiment includes a method of global bandwidth management in a distributed architecture where a central GBWM system may manage bandwidth allocation of intermediate GBWM systems which in turn are managing bandwidth allocation of multiple individual GQoS systems.

An embodiment includes a method of enforcing aggregate limits, such as CIR and MIR limits for a specific group of GQoS systems (such as one or multiple beams) while performing the bandwidth allocation across a larger number of GQoS systems (such as multiple satellites and beams).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10 illustrates an exemplary embodiment of a packet scheduling algorithm.

FIG. 12C illustrates an exemplary embodiment of allocation based on configured cost.

FIG. 17 illustrates a list of cost values based on the MODCOD spectral efficiency.

FIGS. 21A and 21B illustrate an example calculation of CIR and MIR demand.

FIGS. 23A and 23B illustrate exemplary embodiments of demand bracket tables.

FIGS. 24A and 24B illustrate exemplary embodiments of demand matrices.

FIG. 25 illustrates an exemplary embodiment of dynamically changing CIR/MIR in a GSN according to a static CIR/MIR associated with a group service plan.

28B(1) and 28B(2) illustrate exemplary embodiments of CIR and MIR demand matrices.

Figure 28A:
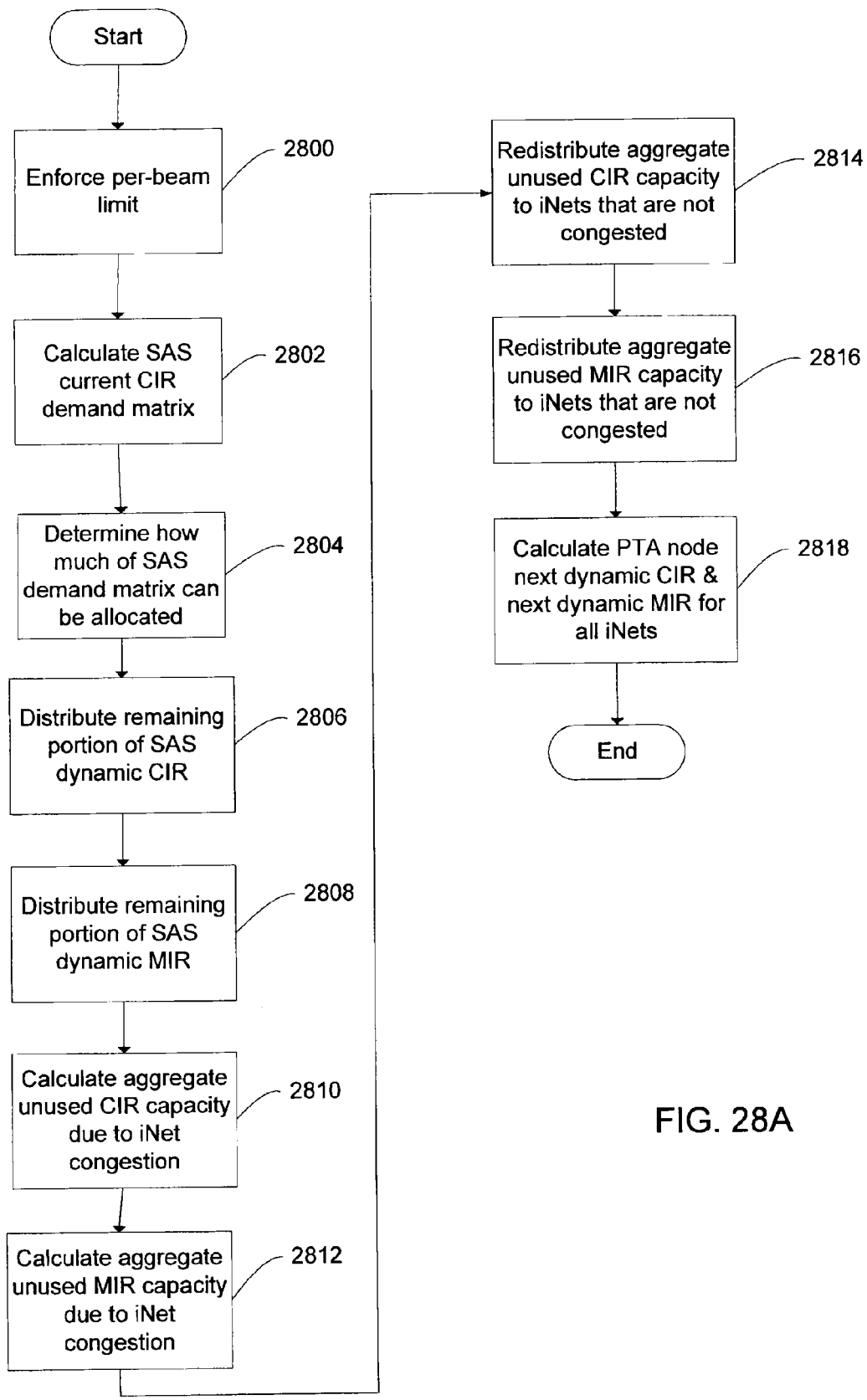
FIG. 28A illustrates an exemplary embodiment of a process for implementing the SAS QoS enforcer algorithm.
Figure 28C:
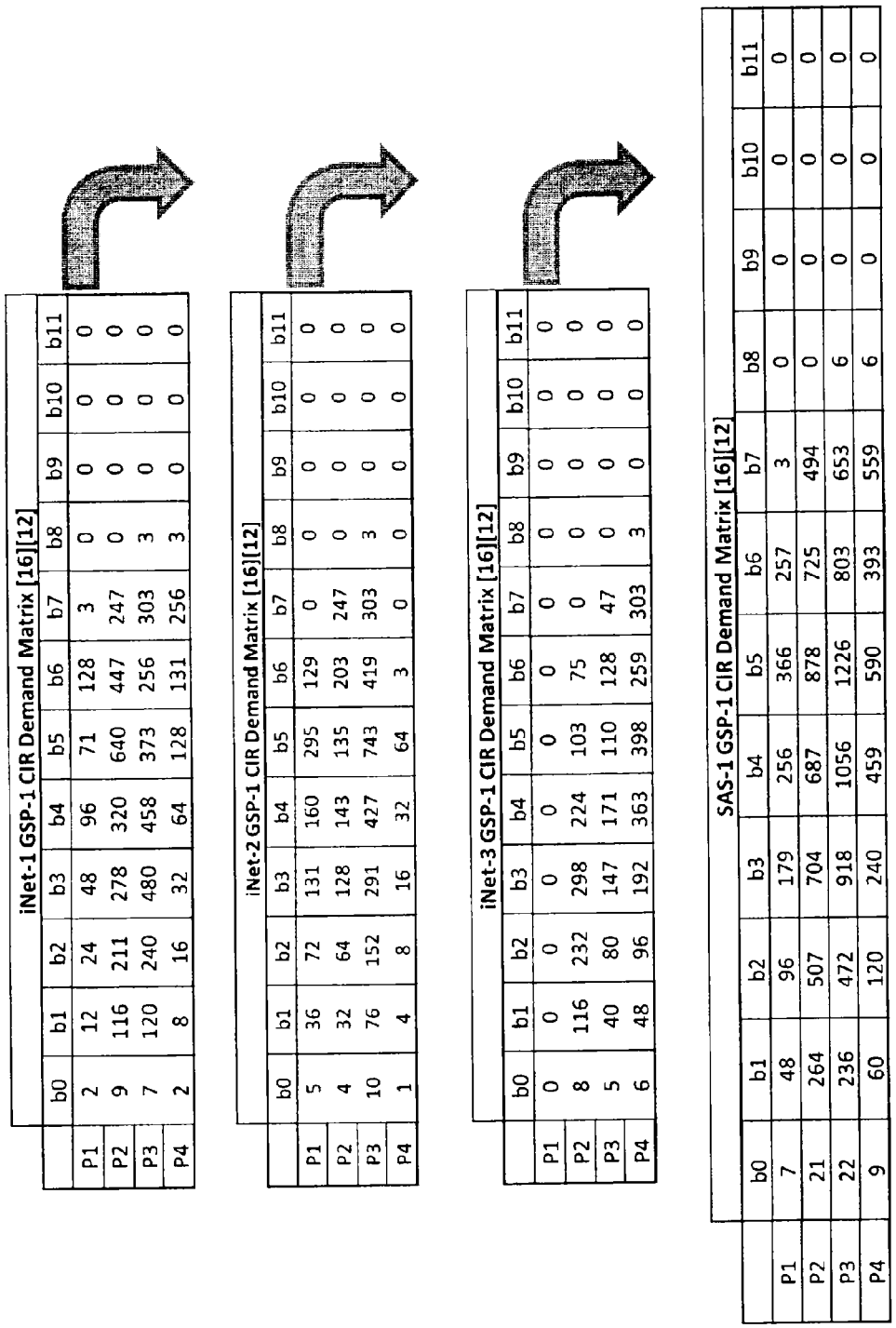

FIG. 28C illustrates an exemplary embodiment of a SAS CIR demand matrix.

Figure 28D:
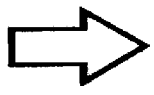

FIG. 28D illustrates an exemplary embodiment of a SAS CIR cumulative demand matrix.

FIG. 28E illustrates an exemplary embodiment of iNet allocation matrices.

Figure 29:
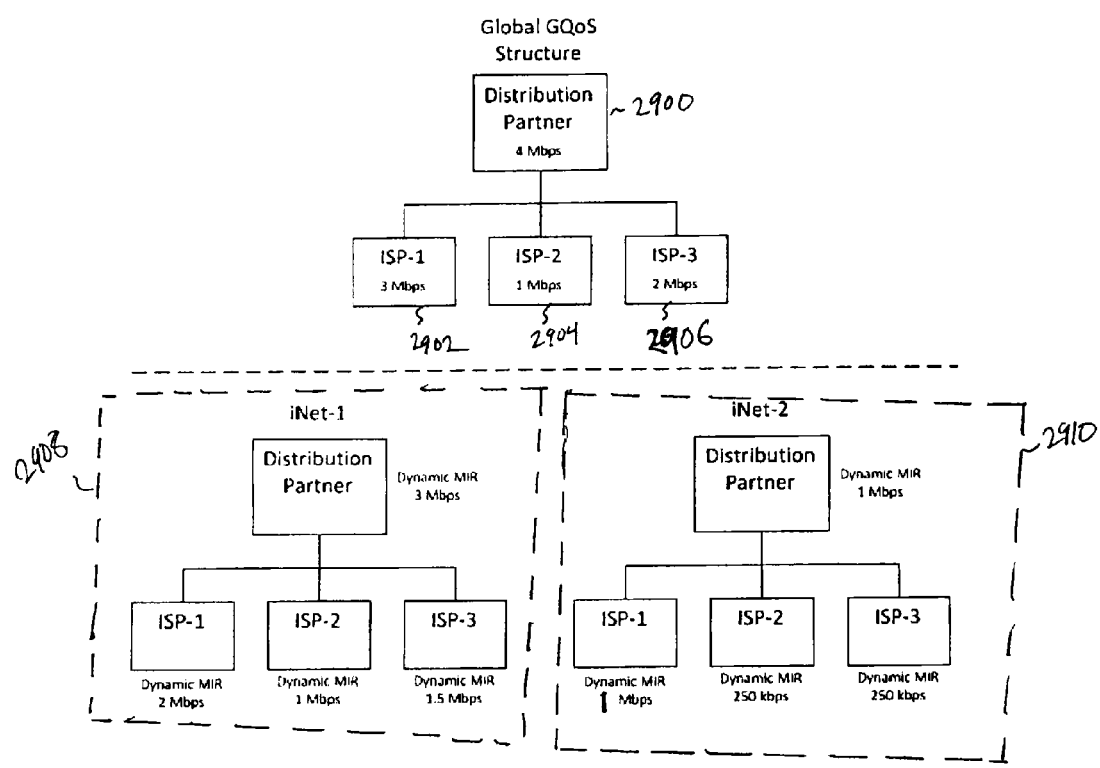

FIG. 29 illustrates an exemplary embodiment of dynamic adjustment of non-PTA nodes.

Figure 30:
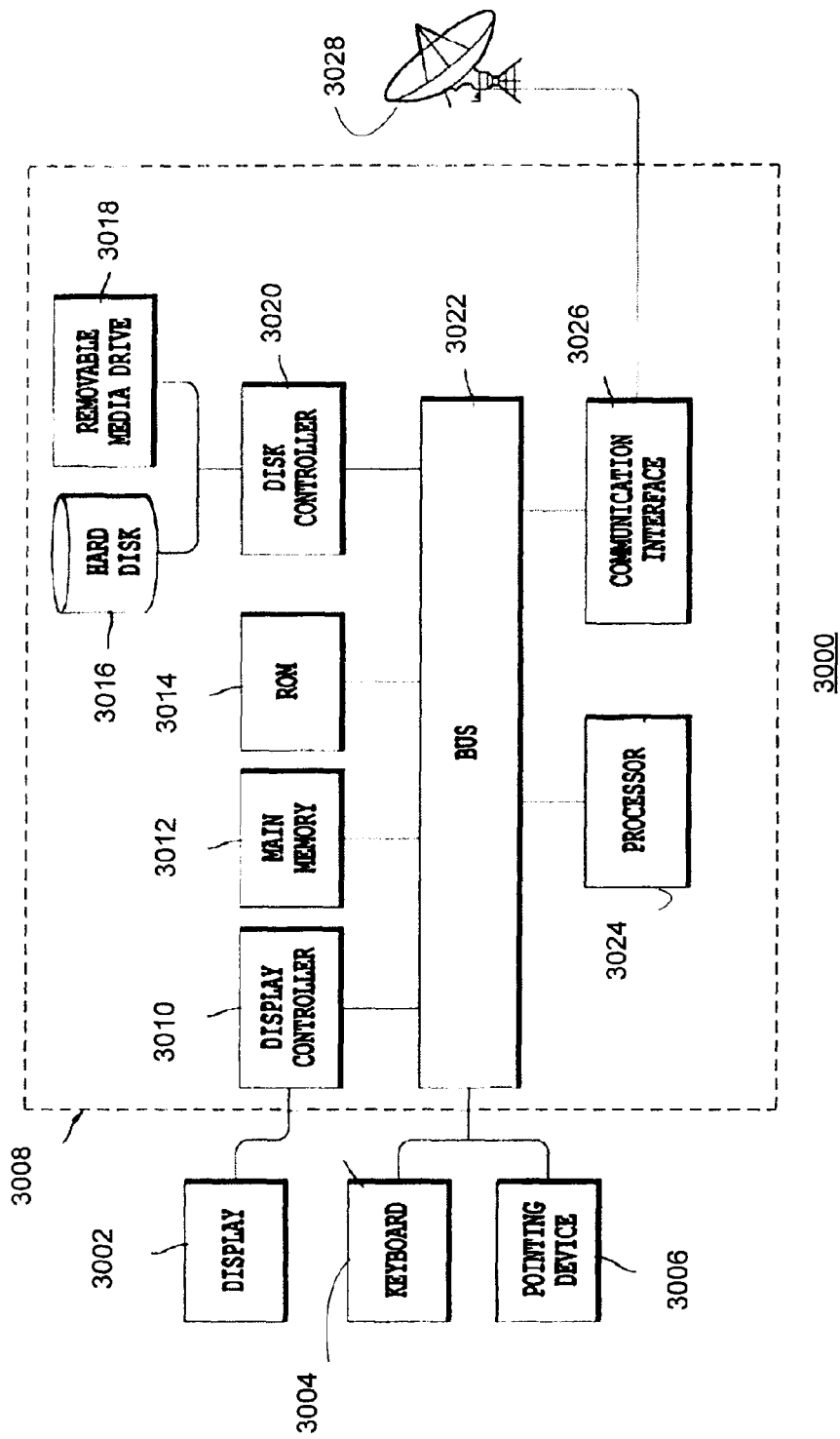

FIG. 30 illustrates an exemplary embodiment of a hardware configuration.

DESCRIPTION OF THE PREFERRED EMBODIMENTS

The present advancements relate to a system, apparatus, and associated methodologies for dynamically adjusting QoS parameters in a satellite network having one or multiple satellites, each satellite having one or multiple beams and each beam having one or multiple channels. The dynamic adjustment is done according to global QoS rules for each group and demand from individual network services associated with terminals and satellite channel networks (i.e., sub-networks) with each satellite channel network having a channel bandwidth manager controlling the bandwidth pool of the channel associated with the satellite channel network.

According to some embodiments, a Group Quality of Service (GQoS) system allows the management of a single bandwidth pool by partitioning and allocating bandwidth from the pool based on defined GQoS rules across a hierarchical user group structure where each user group is defined as a node in the structure. In some embodiments, the GQoS parameters used at each node in the structure are Priority, Cost, Committed Information Rate (CIR) and Maximum Information Rate (MIR). The GBWM System allows bandwidth management on a global basis across multiple GQoS systems by dynamically adjusting QoS parameters across multiple individual GQoS systems with the same user group structure, where each individual GQoS system is managing a single bandwidth pool. The algorithm for the dynamic adjustment uses GBWM rules, constraints at individual pools, constraints at a group of pools (such as a limit within a satellite beam consisting of multiple channels where each channel may have one or multiple individually managed GQoS system), configured parameters for each group of users node (Priority, Cost, CIR and MIR), real-time demand from every group of user node across all individual GQoS systems and congestion measurements to allow for the redistribution of unused capacity in congested GQoS systems to other non-congested systems.

I. INTRODUCTION

A Global Bandwidth Management system manages the capacity of a Global Satellite Network (GSN). According to some embodiments, the Global Satellite Network consists of multiple satellites with multiple beams. Each beam may have multiple channels. In further embodiments, each channel may have multiple GQoS systems, each with an individual pool of satellite capacity. An individual GQoS system is referred to as "iNet".

According to some embodiments, service plans, global GQoS structure, and global QoS enforcement support the management of the global capacity in a hierarchical manner across the GSN owned by a Satellite Operator. In some embodiments, each satellite in the system is controlled from a teleport, also referred to as a Satellite Access Station (SAS), which also provides the communication to the Network Operations Center (NOC). The SAS is connected via a terrestrial network to Points of Presence (POP) for connectivity to the Internet. Embodiments offer considerable flexibility for distribution partners (DPs) in developing and enforcing group and subscriber service plans. Embodiments enable distribution partners to sell capacity and enforce group service plan agreements. Embodiments also enable distribution partners to sell services by developing subscriber service plans for various applications.

II. OVERVIEW

This section provides an overview of the various user groups and the different methods of purchasing, managing and reselling service. It provides an overview of the global group QoS structure to show the division and management of the global capacity in a hierarchical manner across a unified global network. This is followed by an overview of how the system allocates bandwidth to the terminals or group of terminals according to the parameters defined in a distribution partner's service plan.

1.1 User Groups

According to some embodiments, the Global Bandwidth Management system supports three kinds of distinct user groups with different methods of purchasing, managing and reselling the Global Xpress services. In some embodiments, these user groups are defined as follows:

Dealer—A dealer purchases subscriber service plans on a wholesale basis from the Satellite Operator or distribution partners, and resells them to individual subscribers. Dealers only manage subscribers. They do not manage global capacity bandwidth partitions.

Distribution Partner (DP)—A DP purchases capacity from the Satellite Operator for the purpose of partitioning and reselling that capacity to groups of user terminals. A DP may develop group service plans to resell capacity on a wholesale basis. A DP may develop subscriber service plans for individual subscribers. A DP may also act as a dealer and resell subscriber service plans defined by Satellite Operator or by other distribution partners. The system allows multiple levels in the DP hierarchy allowing a DP to resell global capacity to another DP. The term DP is used to refer to any customer represented by a node in the user group tree hierarchy with the ability to create service plans.

Subscriber—A subscriber purchases service through a dealer or distribution partner for an individual Satellite Terminal. The subscriber service plans may be developed by the Satellite Operator or by distribution partners. The bandwidth for the subscriber is allocated from the DP bandwidth partition associated with the service plan.

Figure 1:
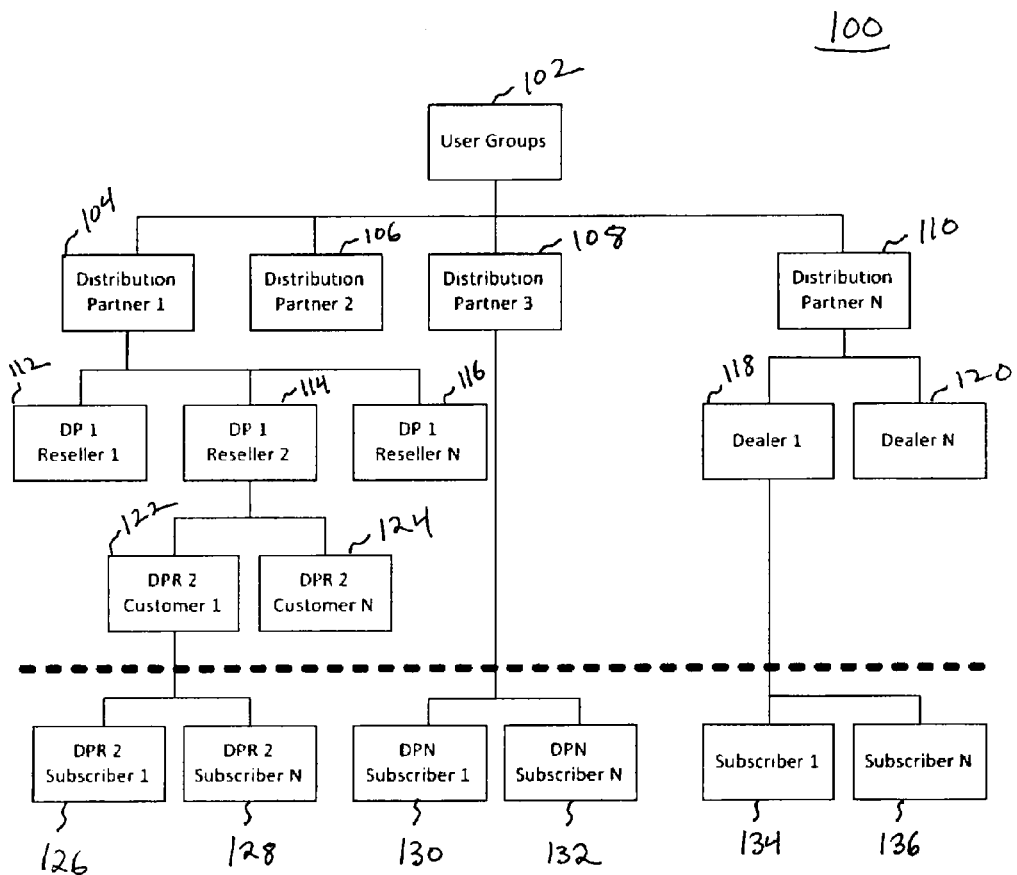
FIG. 1 illustrates an exemplary embodiment of a tree structure that shows a hierarchy of user groups.

FIG. 1 illustrates an embodiment of a tree structure 100 that shows a hierarchy of user groups 102. The top level of the hierarchy includes distribution partners 104-110. The next level includes distribution partner resellers 112-116 and/or dealers 118-120. The next level of the hierarchy includes customers 122-124 of the distribution partner resellers. The next level of the hierarchy includes subscribers 126-136.

The right-hand side of the diagram above shows a distribution partner who sold subscriber service plans to Dealers 1 and N (118 and 120). In this case, individual subscribers 134 and 136 purchase a service through a dealer. Value-add options and pricing may be set by individual dealers within parameters dictated by the distribution partner. In some embodiments, the Satellite Operator is treated like a distribution partner and may be represented in this example as distribution partner N. The management of the subscriber terminals is performed by the dealers selling the service.

The left-hand side of FIG. 1 shows Distribution Partner DP1 (104) purchasing global capacity from Satellite Operator on a wholesale basis for the purpose of partitioning and reselling it to other distribution partners, such as distribution resellers 112-116 on a wholesale basis or to a group of end-users managed by that DP. Management of each group of terminals can be done by the DP or delegated to a third party, such as an energy company, commercial shipping company or a maritime ISP.

In the example above, DP1 (104) is reselling the capacity to multiple resellers. DP1 R 2 (114) is reselling the capacity to multiple customers 122-124. Each customer offers service and manages a group of subscriber terminals 126-128. This is a practical example of three levels in the user tree. The system does not impose any limitation, however, on the number of levels in the hierarchy.

In this example, DP 3 (108) does not resell capacity on a wholesale basis. DP 3 is only providing service to a group of subscriber terminals 130-132 that DP 3 is managing. The service plans in this case are designed and priced by DP 3.

1.2 Service Plans

According to some embodiments, the Global Bandwidth Management system supports two types of service plans: group service plans and subscriber service plans. According to some embodiments, these service plans are defined as follows:

Group Service Plan—A Group Service Plan (GSP) is a capacity purchase plan offered by the Satellite Operator to a DP or by a DP to another DP. It is equivalent to purchasing bandwidth on the GSN. It is specified in terms of Mbps at a nominal MODCOD, which can be translated directly to MSps or bandwidth. The group service plan is associated with a single Geographic Scope where the capacity will be purchased. The default Geographic Scope is Global. The Regional Geographic Scope may be configured as a collection of Beams. Each GSP is represented as a single node in the Global GQoS tree structure, referred to as GSP Node in this document. A DP may purchase multiple GSPs with different Geographic Scopes and/or priorities which results in having multiple GSP Nodes in the Global GQoS tree.

Subscriber Service Plan—A subscriber service plan is a plan that applies to an individual user terminal. It may be defined by Satellite Operator or by a DP. It is specified in terms of Kbps or Mbps and a base MODCOD. A subscriber service plan may be created as a bundle of multiple components, such as a data plan component, a voice plan component and a video plan component.

Subscriber Service Plan Component (SSPC)—According to some embodiments, a Subscriber Service Plan Component is linked to a GSP node, from which bandwidth is allocated. For example, a Subscriber Service Plan may have a Data Plan component and a Voice Plan component where the Data Plan Component and Voice Plan Component are allocated bandwidth from two different Group Service Plans, one for Data and the other for Voice. Each SSPC when assigned to a terminal makes a Virtual Remote (VR) configuration and therefore are the leaves in the iNet GQoS tree.

Geographic Scope—For a group service plan, in some embodiments, Geographic Scope may be global or regional. In some embodiments, the regional Geographic Scope in a group service plan is a combination of satellite and beam(s) and defines the regional capacity purchase. The region may be defined as a collection of beams where the specified beams may not be adjacent to form a region. For a subscriber service plan, Geographic Scope is defined by satellite, beam(s) and service area (SA) combinations and defines CIR/MIR restrictions when the terminal operates in the specified region.

Single Beam Restrictions—According to some embodiments, the single beam restrictions parameter defines the maximum CIR/MIR allowed in a single beam to avoid a situation where too many terminals with high demand are in a single beam. The system allows the configuration of a default maximum CIR/MIR which applies to all beams. The system allows exceptions for specific beams.

High Capacity Payload (HCP) Beam—According to some embodiments, the HCP beams are steerable beams and are used to supplement capacity of fixed beams in congested regions. They are added and removed from the GSN capacity pool seamlessly. By default they are not specified in a Group Service Plan or Subscriber Service Plan. When added to a region, they become part of the Geographic Scope of the Group Service Plan. The Subscriber Service Plan developed under this Group Service Plan will also be able to use the HCP beam. In order to prevent the use of HCP in a Group Service Plan, HCP beams have to be excluded from the Group Service Plan's Geographic Scope. In such case, the Subscriber Service Plan under this Group Service Plan is also restricted from the HCP beam.

1.3 Global GQoS Structure

Figure 2:
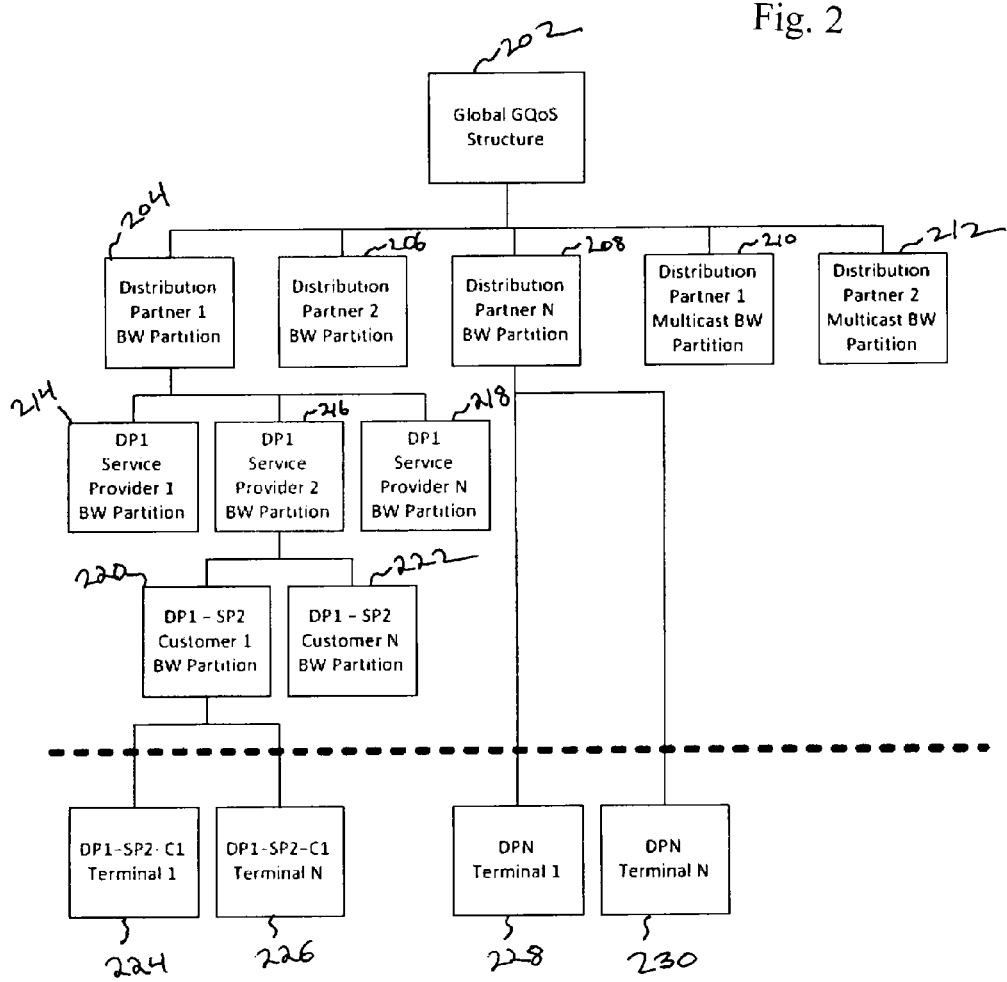
FIG. 2 illustrates an exemplary embodiment of a global GQoS structure based on user groups.

FIG. 2 illustrates a tree 200 that shows an embodiment of a global Group QoS (GQoS) structure 202 for the example provided in FIG. 1. In some embodiments, the global capacity consists of capacity from all channels in all fixed beams, as well as designated capacity from channels in steerable beams. As channels are switched on and off, the global resource manager (GRM) informs the Network Management System of satellite configuration changes.

According to some embodiments, the global network capacity is partitioned at the top level into DPs' partitions (204-212). Each DP partition can be further partitioned into distribution partner resellers. The DPs' partitions are configured with a group service plan which includes global CIR/MIR across the Global Xpress network. The system can also support beam-specific or regional capacity by defining regions (a collection of beams) in a group service plan.

As illustrated in FIG. 2, the top level the GQoS structure 202 includes bandwidth partition among distribution partners 204-212. For example, the bandwidth capacity of the GQoS structure 202 is partitioned among Distribution Partners 1-N (204-208) and multicast Distribution Partners 210-212. The next level of the GQoS structure 202 includes bandwidth partition to service providers 214-218 of the distribution partners. For example, the bandwidth of Distribution Partner 1 (204) is partitioned among Service Providers 1-N (214-218). The next level of the GQoS structure includes bandwidth partition among customers (220-222). For example, the bandwidth of Service Provider 2 (216) is partitioned among Customer 1 and N (220 and 222). The next level of the GQoS structure includes bandwidth partition among terminals. For example, the bandwidth of Customer 1 is partitioned among terminals 224 and 226. Further, the bandwidth of Distribution Partner N is partitioned among terminals 228 and 230. Furthermore, Multicast Distribution partners 210 and 212 may also have subscriber terminals.

1.4 Global QoS Enforcement

According to some embodiments, the Global QoS Enforcer forms and maintains the global GQoS structure based on distribution partners group service plans. In some embodiments, each group service plan will represent a DP's QoS parameters and will be a node in the global GQoS structure.

In some embodiments, all the iNets have the same GQoS structure as the global structure where each DP has a bandwidth partition node in the iNet structure. According to some embodiments, the Global QoS Enforcer communicates with all the iNets to dynamically adjust their GQoS parameters. The group service plan includes QoS parameters (CIR/MIR/priority/cost) and a single Geographic Scope. The Geographic Scope may be global (all available beams) or regional (a combination of satellite and beams).

According to some embodiments, the CIR/MIR for the DP node is calculated dynamically by the Global QoS Enforcer based on traffic demand/usage from each iNet, and within the configured group CIR/MIR.

1.4.1 Global Group Service Plan Enforcement for Distribution Partners

Figure 3:
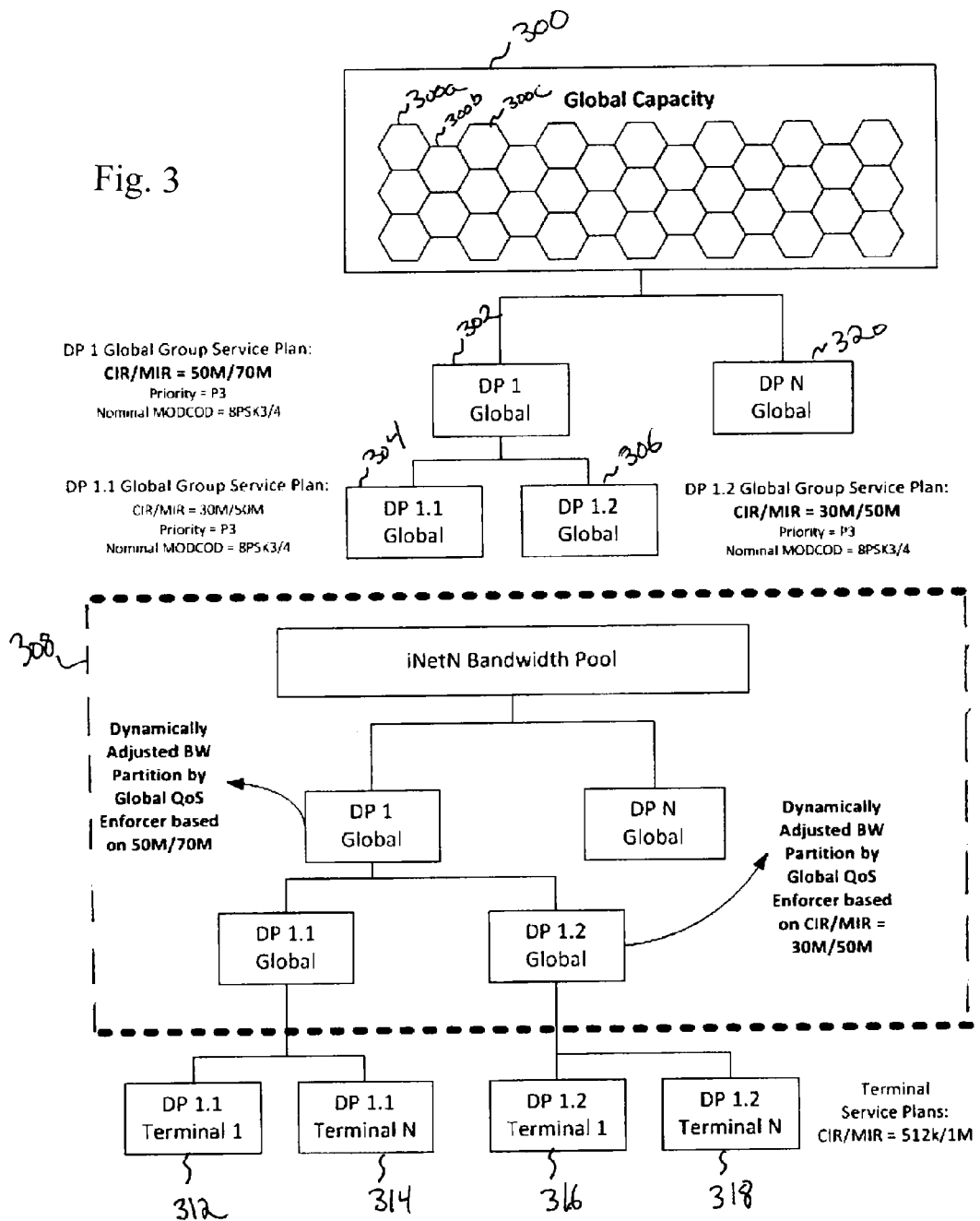
FIG. 3 illustrates an exemplary an embodiment of a global GQoS structure based on a global group service plan.

FIG. 3 shows an embodiment of an example of a global capacity purchase plan by DP1 (302). In this example, DP1 has purchased CIR/MIR=50M/70M from global bandwidth capacity 300, where the Geographic Scope is set to be global.

This means all available iNets allocate bandwidth to the terminals 312-318 for this distribution partner as they move in and out service areas associated with each of the iNets. The CIR/MIR of the DP node at all iNets will get dynamically adjusted to achieve the DP's CIR/MIR of 50M/70M globally. DP N (320) also has a global group service plan independent of DP1 (302). In some embodiments, the global bandwidth capacity represents the capacity provided by all fixed beams and steerable beams from the satellites in a satellite communication network. In other words, the global capacity is the aggregation of all individual iNet bandwidth pools. DP1 (302) has further partitioned its bandwidth and sold DP1.1 (304) and DP1.2 (306) each a group service plan with CIR/MIR=30M/50M with a global Geographic Scope. The group nodes for DP1.1 (304) and DP1.2 (306) each get dynamically adjusted in all iNets to achieve a CIR/MIR of 30M/50M. The structure 308 illustrates GQoS structure at the iNet level. As an example, DP1 may represent a cruise ship company that has purchased a global group service plan with a CIR of 50M and an MIR of 70M for 50 user terminals. This group service plan guarantees that no matter where the user terminals are in the world, they are guaranteed to receive service with a CIR of 50M and an MIR of 70M. If the group service plan purchased by DP1 is regional instead of global, then the user terminals are guaranteed service only if they are located in the region associated with their group service plan.

According to some embodiments, the global bandwidth capacity 300 includes a plurality of spot beams, examples of which include 300a-300c. In some embodiments, a single spot beam (i.e., 300a) is associated with one or more beams from a single satellite, or with one or more beams from a plurality of satellites. In further embodiments, each spot beam included with the global bandwidth capacity 300 is associated with a Satellite Access Station (SAS). Further, each spot beam includes one or more iNets.

In some embodiments, spot beams are provided by High Throughput Satellites (HTS), which is a classification for communications satellites that provide at least twice, (though usually by a factor of 20 or more) the total throughput of a classic Fixed Service Satellite (FSS) for the same amount of allocated orbital spectrum thus significantly reducing cost-per-bit.

The dramatic increase in capacity is achieved by a high level frequency re-use and spot beam technology which enables frequency re-use across multiple narrowly focused spot beams (usually in the order of 100s of kilometers), which both are defining technical features of High Throughput Satellites. By contrast, traditional satellite technology, which may be used in alternative embodiments, utilizes much broader beams (usually in the order of 1000s of kilometers) to cover entire continents and regions. Satellites operating in the Ka band are usually considered High Throughput Satellites however this is not a defining criterion. Some Ku band satellites with multiple spot beams are also considered HTS.

A fundamental difference to existing satellites is also the fact that HTS are linked to ground infrastructure through a feeder link using a regional spot beam dictating the location of possible teleports (i.e., Satellite Access Stations). By contrast teleports for traditional satellites can be set up in a wider area as their spot beams' footprints cover entire continents and regions.

1.4.2 Regional Group Service Plan Enforcement for Distribution Partners

Figure 4:
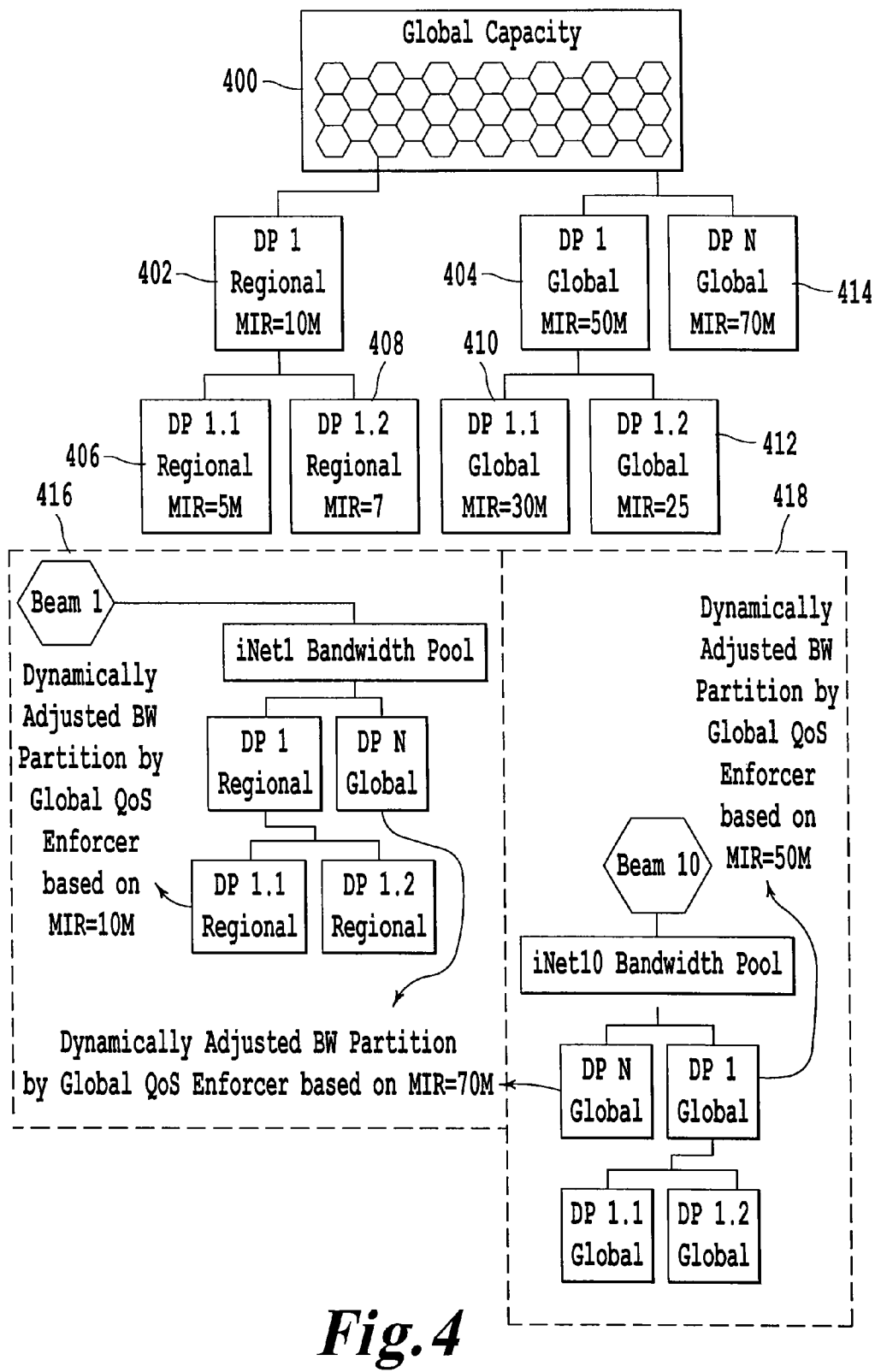
FIG. 4 illustrates an exemplary embodiment of a global GQoS structure where a distribution partner has purchased a group service plan with regional capacity, and a group service plan with global capacity.

Regional capacity is defined as a beam or a collection of multiple beams. According to some embodiments, when a distribution partner purchases regional capacity, a CIR/MIR is associated with the regional capacity and is independent from any CIR/MIR that may be purchased globally or in other regions. This results in a separate tree node for the regional capacity as shown in FIG. 4. In some embodiments, the global GQoS enforcer performs the CIR/MIR dynamic adjustments for the DP's regional tree branch independently from the DP's global tree branch.

FIG. 4 illustrates an example GQoS structure where a distribution partner has purchased a group service plan with regional capacity, and a group service plan with global capacity. In the example below, DP1 purchased 10M regional capacity in addition to the 50M global capacity from the global bandwidth pool 400, and DP 2 purchased 70M global capacity. The GQoS structure reflects the regional as a separate tree node 402 than the global tree node 404 for DP1. The global GQoS enforcement is performed on the DP1.1 and 1.2 regional nodes 406 and 408 independently from the DP1.1 and 1.2 global nodes 410 and 412. The GQoS structure 416 illustrates bandwidth allocation to the DP1 regional node 402 and DP N global node 414 from a particular iNet. The GQoS structure 418 illustrates bandwidth allocation to the DP1 global node 404 and the DP N global node 414. In some embodiments, the bandwidth allocation of the DP N regional node 402, the DP1 global node 404, and the DP N global node 414 is dynamically adjusted by the Global QoS enforcer based on 10M, 50M, and 70M, respectively.

1.4.3 Prioritized Group Service Plan Enforcement for Distribution Partners

According to some embodiments, the global or regional group service plans also have a priority associated with them. This group service plan CIR/MIR and associated priority is independent from any CIR/MIR that may be purchased at a different priority. In some embodiments, this results in a separate tree node for each priority capacity. The global GQoS enforcer performs the CIR/MIR dynamic adjustments for each priority node independently.

Figure 5:
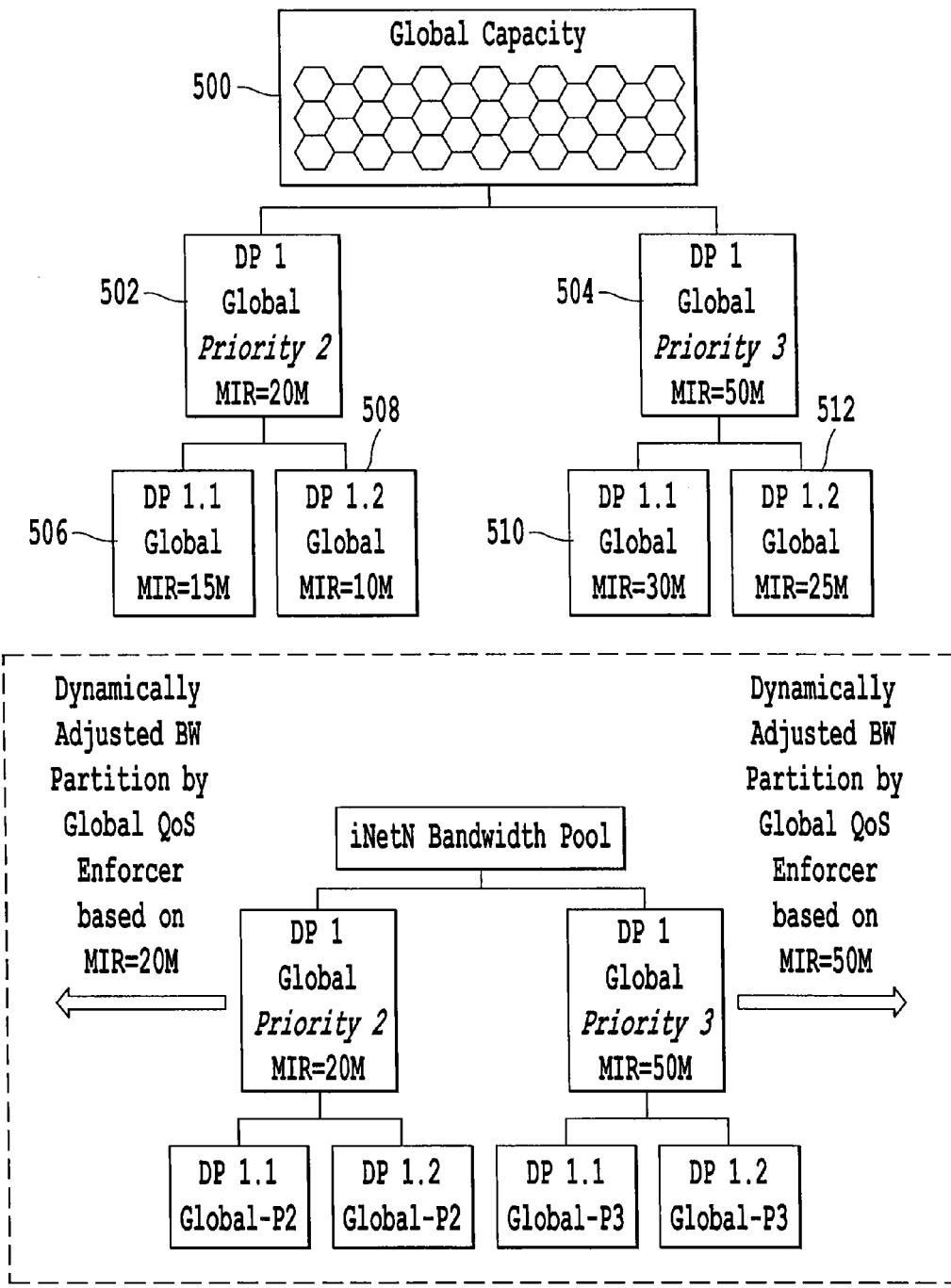
FIG. 5 illustrates an exemplary embodiment of an example GQoS structure based on priority.

FIG. 5 illustrates and example GQoS structure where DP1 purchased 20M at priority 2 and 50M at priority 3. Accordingly, the GQoS structure includes a node 502 for DP1 at priority 2 and a separate node 504 for DP1 at priority 3. Further, the DP1 node at priority 2 (502) is partitioned for DP1.1 (506) at 15M and DP1.2 (508) at 10M. The DP1 node at priority 3 (503) is separately partitioned for DP1.1 (510) at 30M and DP 1.2 (512) at 25M. The GQoS structure 514 illustrates the bandwidth allocation at the iNet level for DP1 at priority 2 (502) and DP1 at priority 3 (504). The DP1 at priority 2 (502) and priority 3 (504) are independently dynamically adjusted by the Global QoS Enforcer based on 20M and 50M, respectively.

1.4.4 DP Bandwidth Partition in ACM Outbound and A-TDMA Inbound

According to some embodiments, the Global Bandwidth Management system enables partitioning of the global capacity by defining CIR/MIR in the distribution partner's group service plan.

In some embodiments, the ACM outbound allows terminals to operate at their optimal modulation and coding (MODCOD) based on their real-time signal-to-noise ratio (SNR). The SNR depends upon the antenna size of the User Terminal, geographic location within the beam coverage, and rain fade conditions.

Figure 6:
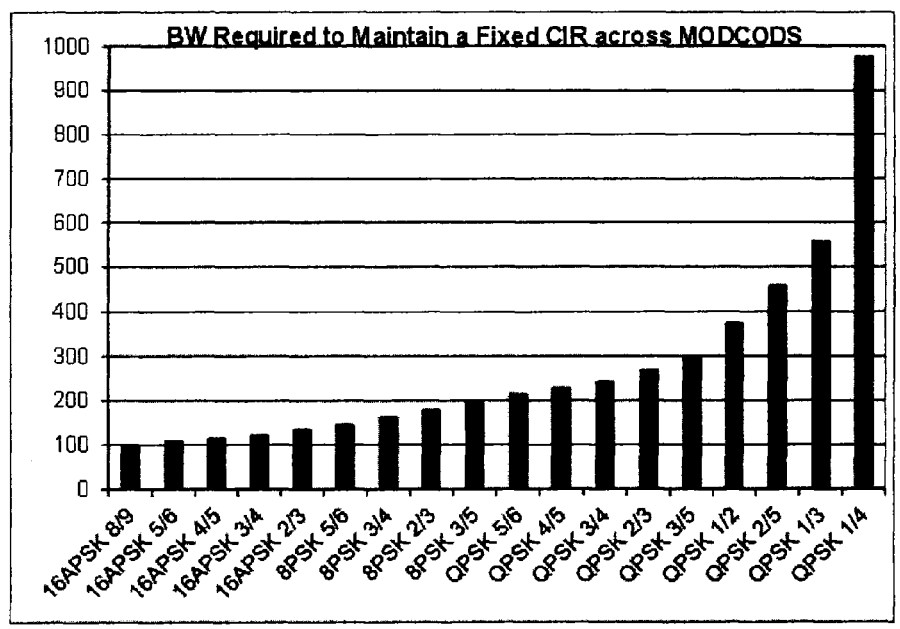
FIG. 6 illustrates a chart of bandwidth vs. information rate.

As illustrated in FIG. 6, the bandwidth required to deliver a fixed information rate increases significantly when the remote operates at lower SNR and therefore lower MODCODs.

In some embodiments, on the ACM outbound, the system allows the user to configure a base MODCOD for each Subscriber Service Plan Component of a User Terminal. The CIR/MIR configured for the SSPC is honored, as the terminal is operating above or at base MODCOD. In some embodiments, when the terminal goes into a rain fade, the allocated bandwidth remains fixed at the base MODCOD bandwidth. The degradation in throughput is gradual, because the SSPC continues to use the same amount of satellite bandwidth that was allocated to it at its base MODCOD.

1.4.5 Options to Achieve Fairness in Contention

According to some embodiments, the Global Bandwidth Management system provides the Satellite Operator or distribution partners with options in configuring the GQoS to allow them to pick the bandwidth allocation fairness scheme most appropriate to their business.

In some embodiments, the options, which can be specified in the group service plan, include: allocation fairness relative to CIR and allocation fairness relative to MODCOD. As an example, for the allocation fairness relative to MODCOD, the system provides a choice of fairness relative to operating MODCOD.

1.4.5.1 Allocation Fairness Relative to CIR

In some embodiments, this option allows the CIR/MIR allocation to be proportional to the configured CIR during contention. In further embodiments, the system computes an internal cost parameter that is used by the demand allocation algorithm to implement the proportional allocation behavior. The QoS cost parameter is still be available to the user.

In order to understand the concept, consider an example where the outbound of 20 Mbps is partitioned into two distribution partner reseller (DPR) groups, DPR-1 with a CIR of 10 Mbps and DPR-2 with a CIR of 15 Mbps. During contention, if this option is not specified, each of the DPR groups gets 10 Mbps. If this option is selected, the system automatically computes a cost parameter for each DPR group so that bandwidth allocation is proportional to the CIR resulting in an allocation of 8 Mbps to DPR-1 and 12 Mbps for DPR-2.

When this option is selected, in some embodiments, the best effort round used to allocate bandwidth in excess of the CIR and up to the MIR is proportional to the configured CIR.

1.4.5.2 Allocation Fairness Relative to Base MODCOD

In some embodiments, this option allows for a choice of fairness in allocation relative to base MODCODs during contention based on satellite bandwidth or CIR. When this option is selected, the system computes an internal cost parameter to be used by the demand allocation algorithm to implement the MODCOD fairness behavior.

In order to understand the concept, consider an example of two terminals in a service group; Terminal A configured with a 1 Mbps CIR and operating at its base MODCOD of 8PSK 3/4, and Terminal B also configured with a 1 Mbps CIR but operating at a different base MODCOD of QPSK 3/4. During contention, if this option is not selected, the available satellite bandwidth is split equally between the two terminals; resulting in roughly a 2.054/1.373 ratio in their CIR. Terminal A may get 820 Kbps, for example, while Terminal B gets 549 Kbps while the available satellite bandwidth is split equally.

However, if this option is selected, fairness in allocation is done based on bps rather than satellite bandwidth and both Terminal A and Terminal B gets the same CIR of 658 Kbps. Note that the service provider pricing model already reflects the higher satellite bandwidth consumption of Terminal B relative to Terminal A.

Similarly, in some embodiments, the above applies to the best effort round of allocation up to the MIR. If the two terminals in the example above are configured with an MIR of 2 Mbps and bandwidth is available after satisfying the 1 Mbps CIR for each, the available bandwidth for the best effort round is split equally based on satellite bandwidth if the option is not selected, resulting in different information rates. If the option is selected, however, both terminals would get the same information rate.

This fairness option is appropriate for a network with fixed terminals where the base MODCOD is typically selected to be the operating point of the terminal with some rain fade margin.

1.4.5.3 Allocation Fairness Relative to Operating MODCOD

In a maritime or mobile environment, it would be appropriate to have bits per second fairness. For these customers, according to some embodiments, the base MODCOD is usually configured to be the beam edge. In this regard, as long as remotes operate at or above base MODCOD, then CIR allocation in bps should be equal.

In a mobile environment where all terminals' base MODCODs may be the same but they operate at different MODCODs depending on their location relative to the beam center, the fairness relative to base MODCOD will not accomplish allocation based on bps.

According to some embodiments, the system provides a mode of operation which supports bits per second allocation in DVB-S2/ACM which is based on a terminal's operating MODCOD. As an example, this fairness option comes into play under contention for the CIR and for the allocation of bursting traffic above the CIR up to the MIR.

In some embodiments, the fairness with respect to operating MODCOD allows all terminals in the group to be treated equally regardless of their operating MODCOD, allowing fair bps allocation as long as they are operating above their base MODCOD.

Figure 7:
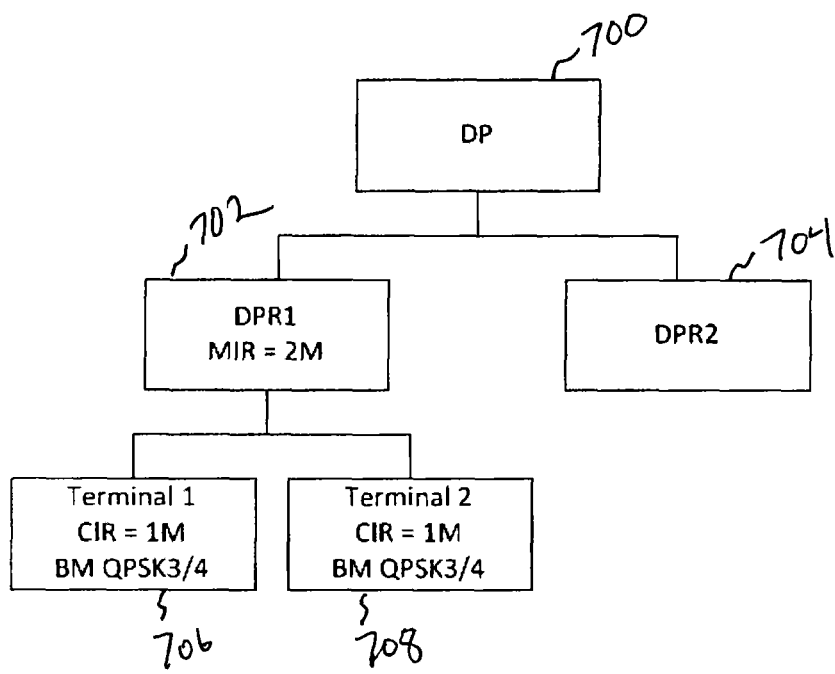
FIG. 7 illustrates an exemplary embodiment of a GQoS demonstrating fairness relative to operating MODCOD.

For example, FIG. 7 illustrates a GQoS structure for DP (700) with bandwidth partitioned to DPR1 (702) and DPR2 (704) and two terminals (706 and 708) of DPR1 (702) in a group with the same antenna size, same base MODCOD of QPSK3/4 (being the edge of the beam) and same CIR (1M). One terminal is in the beam center while the other terminal is at the beam edge. As a result of the difference in SNR between the beam center and the beam edge, the terminals are operating at different MODCODs. Terminal 1's operating MODCOD=16APSK3/4, and Terminal 2's operating MODCOD=8PSK 3/4. The terminal at the less efficient MODCOD consumes more bandwidth than the terminal at the beam center to provide the same information rate.

When there is no contention, both terminals get their CIR, regardless of their operating point. If there is contention and the fairness relative to operating MODCOD is not selected, then the terminal running at the higher MODCOD gets the higher bps than the remote running at the lower MODCOD.

The fairness relative to operating MODCOD option allows both terminals to get equal bps allocation in contention as long as they are both operating above their base MODCOD.

III. SYSTEM DESIGN

Figure 8A:
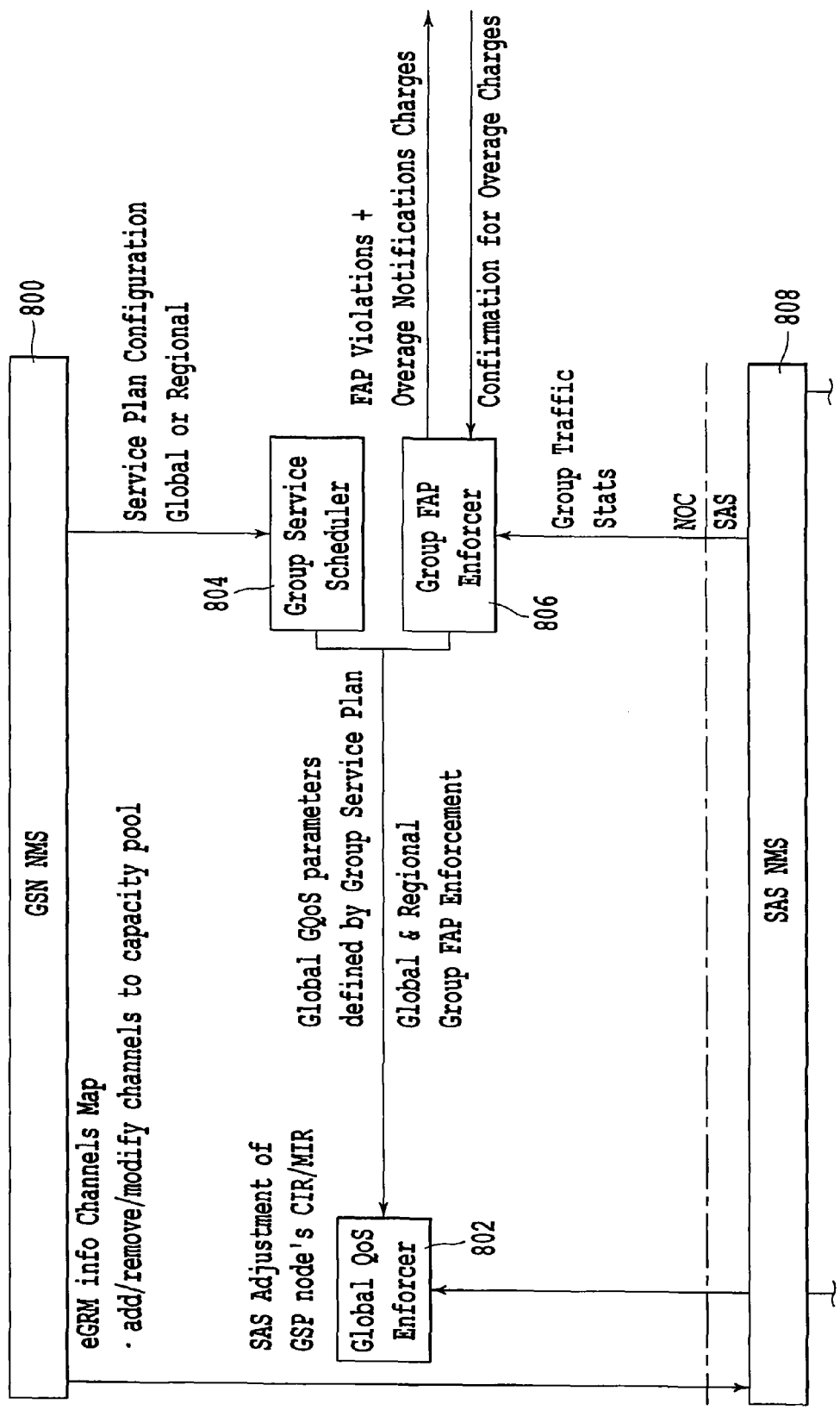
FIGS. 8A and 8B illustrate an exemplary embodiment of a Global Bandwidth Management System.
Figure 8B:
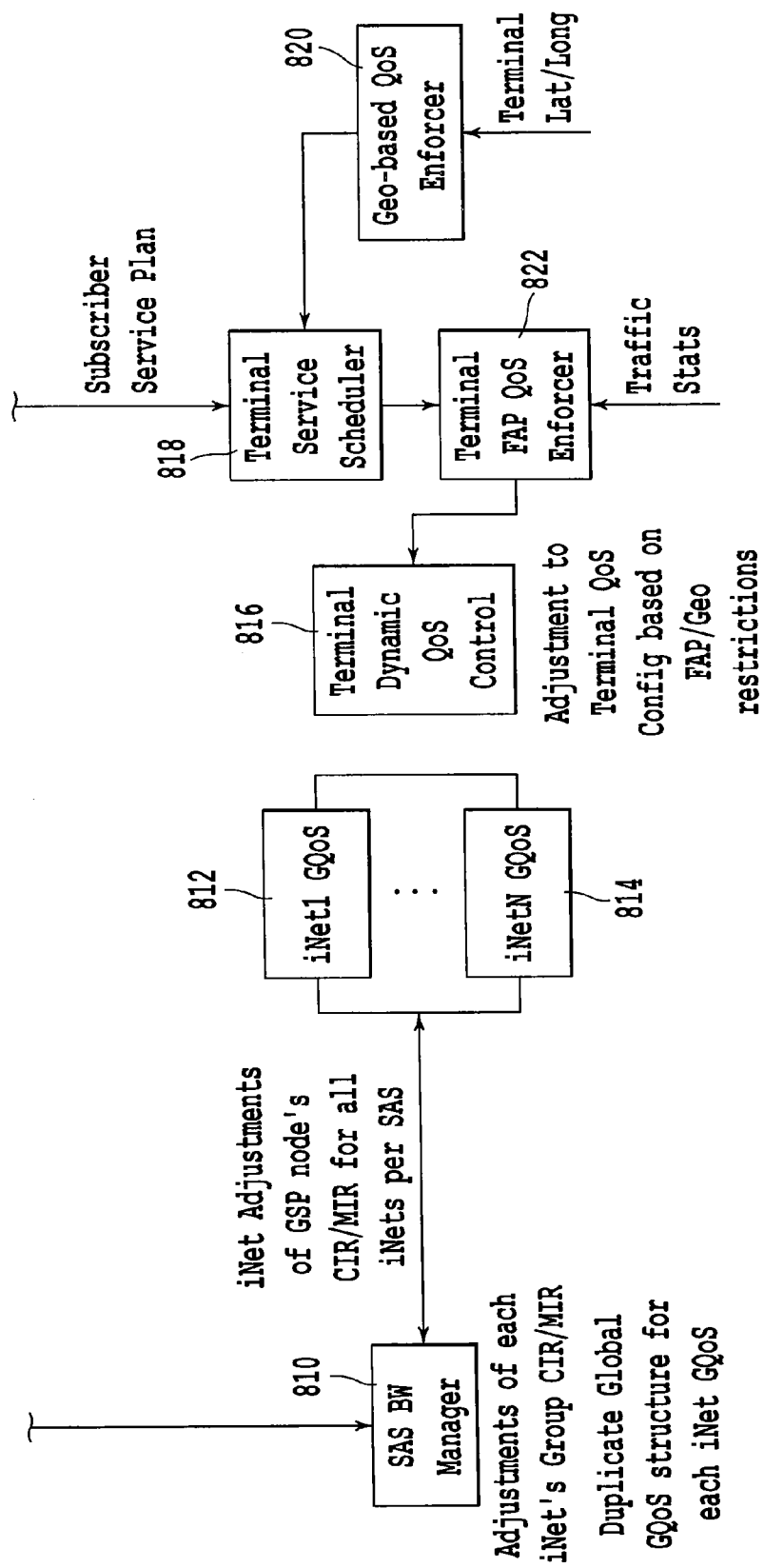

This section describes the design of an embodiment of the Global Bandwidth Management system. FIG. 8 illustrates FIGS. 8A and 8B illustrate an embodiment of a system that operates at both the NOC and the SAS to maintain Global Bandwidth Management for distribution partners and associated terminals based on their contractual service plans.

According to some embodiments, the bandwidth management function at the NOC is distributed between the Global QoS Enforcer 802, Group Service Scheduler 804 and the Group FAP Enforcer 806. The Group Service Scheduler 804 receives the active Group Service Plan configuration from the GSN-NMS (Network Management System) 800. The Group Service Scheduler updates the Group FAP Enforcer 806 with the new configuration. The Group Service Scheduler 804 also sends the Group QoS configuration to the Global QoS Enforcer 802. The Group FAP Enforcer 806 receives group traffic stats from the SAS and confirmation for overage charges. The Group FAP Enforcer 806 outputs FAP violations and overage notifications charges.

According to some embodiments, the Global QoS Enforcer inherits and builds a global GQoS structure based on the parameters configured in the Group Service Plan. The nodes of the Global QoS tree are referred to as Group Service Plan (GSP) nodes. The Global QoS Enforcer uses the Group Service Plan configuration and aggregated GSP node demand/usage stats from each SAS to calculate CIR/MIR of each GSP node within the SAS.

The Global QoS Enforcer 802 and Group FAP Enforcer 806 are updated by any changes to the group service plans by the Group Service Scheduler 804.

In some embodiments, the bandwidth management at the SAS consists of the SAS Bandwidth Manager 810, the iNet GQoS engine 812, the Terminal Service Scheduler 818, and Terminal FAP Enforcer 822.

According to some embodiments, the SAS Bandwidth Manager 810 receives the Global QoS Configuration from the Global QoS Enforcer 802. The SAS Bandwidth Manager 810 resides at the SAS and receives aggregated demand/usage per GSP node from all iNets 812-814 associated with the SAS. It uses its current CIR/MIR configuration and the GSP node's demand/usage to calculate the CIR/MIR of the GSP node within each iNet and perform iNet adjustments of GSP node's CIR/MIR.

Each iNet GQoS 812-814 runs the demand/allocation algorithm to allocate inbound/outbound bandwidth to terminals as they move into iNets. The Terminal Service Scheduler 818 receives subscriber service plan configurations from the SAS NMS 808 and lat/long positions from the Geo-based QoS Enforcer 820; it updates the Terminal FAP Enforcer 822 with the subscriber service plan configuration. The Terminal FAP Enforcer 822 further receives traffic stats. A Terminal Dynamic QoS Control 816 makes adjustments to Terminal QoS Config based on FAP/GEO restrictions. The following sections describe these processes in more detail.

1.5 Global Bandwidth Management Process Architecture

Figure 9A:
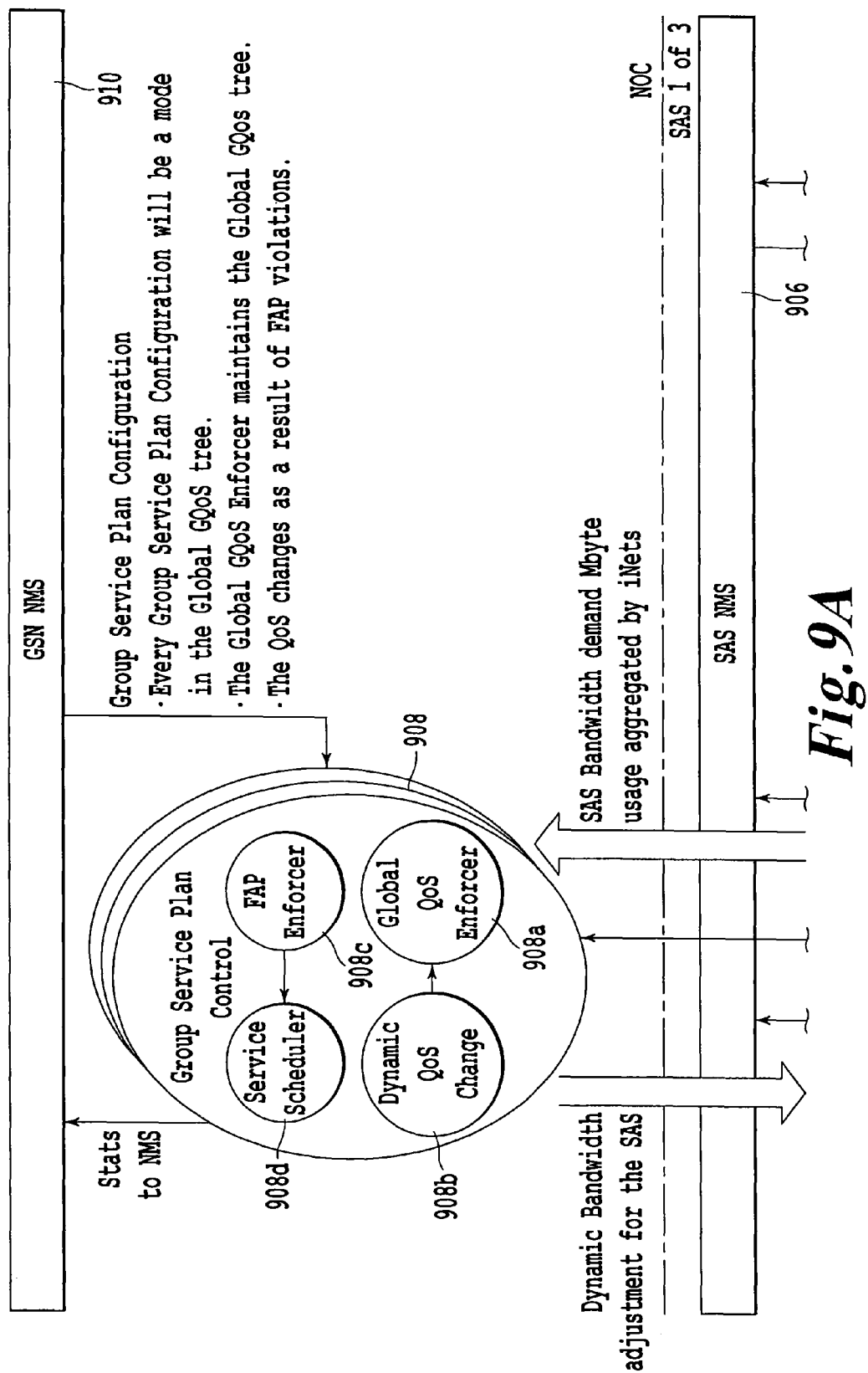
FIGS. 9A and 9B illustrate an exemplary embodiment of a Global Bandwidth Manager process architecture diagram.
Figure 9B:
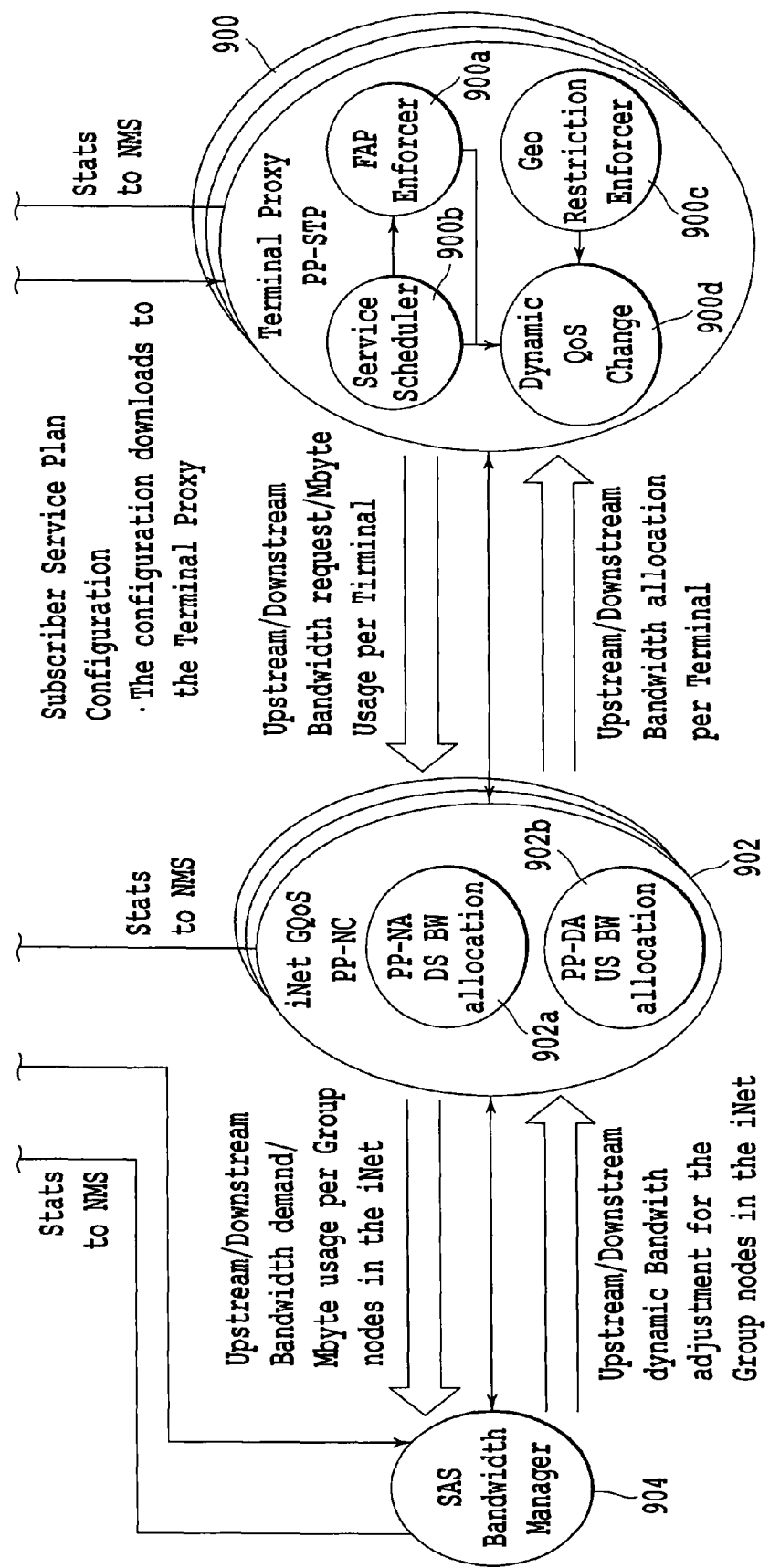

FIGS. 9A and 9B illustrate an embodiment of the Global Bandwidth Management system process architecture. According to some embodiments, these processes form a hierarchical architecture between the NOC and three satellite access stations (SAS) as follows:

Terminal Bandwidth Management
iNet Bandwidth Management
SAS Bandwidth Management
Global (or NOC) Bandwidth Management In some embodiments, at each level, the usage is aggregated and sent upward, and each hierarchy level gets dynamically configured with the QoS parameters from nodes above. The terminal proxy is the leaf node in the hierarchy which requests bandwidth and generates usage stats. According to some embodiments, all bandwidth management decisions are handled by this architecture, including FAP, CIR/MIR and geographic based QoS enforcement.

According to some embodiments, the terminal bandwidth management includes the terminal FAP enforcer 900a, terminal service scheduler 900b, geographic based QoS enforcer 900c and dynamic QoS control objects 900d. These objects are instantiated within the satellite terminal proxy (PP_STP) 900 process running at the Hub. There will be one PP_STP 900 per terminal which receives the per-terminal configuration including the terminal's subscriber service plan. The terminal proxy handles all per-terminal QoS enforcements. The terminal bandwidth management 900 receives a subscriber service plan configuration from the SAS NMS 906 and provides stats to the SAS NMS 906.

According to some embodiments, the iNet bandwidth management is implemented within the iNet control processes such as the iNet GQoS 902. There is a set of processes running the current GQoS algorithm. (The details of this algorithm are described in the following sections.) The outbound bandwidth allocation is handled by the PP_NA 902a process and the inbound bandwidth allocation is handled by the PP DA process 902b. As terminals move into an iNet, via their subscriber service plan ID, they will get attached to the associated group node in the iNet GQoS tree and demand bandwidth.

As part of its normal operation, the iNet bandwidth management process aggregates the per-terminal bandwidth allocation and FAP usage and interacts with the SAS bandwidth management process 904. The SAS bandwidth management process 904 aggregates per-iNet bandwidth allocation and FAP usage and interacts with the Global QoS Enforcer 908a at the NOC.

The Global QoS Enforcer 908a receives the per-SAS bandwidth and FAP usage, and performs the global bandwidth management at the NOC, including global QoS enforcement based on group service plans, the group FAP enforcer 908c and the group service scheduler 908d. In some embodiments, the Global QoS Enforcer 908a, Dynamic QoS Change 908b, FAP Enforcer 908c, and Service Scheduler 908d are instantiated in a Group Service Plan Control 908. The Group Service Plan Control receives a group service plan configuration from the GSN NMS 910. In some embodiments, in the group service plan configuration, every group service plan component is a node in the global GQoS tree, the Global GQoS Enforcer 908a maintains the global GQoS tree, and the QoS changes as a result of FAP violations. As an example, a service plan may have a Fair Access Policy (FAP) rules that dictate the amount of volume transfer within a specified period of time (upload and download in MegaBytes) and associated actions such as changing QoS parameters such as CIR/MIR when certain levels of volume transfer are reached. A violation of one of these rules is an FAP violation.

According to some embodiments, the bandwidth for each SAS is calculated by the Global QoS Enforcer based on demand/usage at each SAS and group FAP usage. Each SAS receives the updated bandwidth from Global QoS Enforcer 908a.

In some embodiments, the SAS bandwidth manager 904 provides the iNets with the group node's parameters (CIR/MIR).

In further embodiments, the terminal FAP threshold detection and enforcement is done by the terminal bandwidth management processes. The terminal bandwidth management process identifies the point at which the FAP is exceeded and takes the configured action. This action may be to send an event to the SAS NMS 906, an automatic change of CIR/MIR, or a FAP state raised in the terminal's traffic statistics message.

According to some embodiments, Group FAP may be implemented by the global bandwidth management processes. For example, each node in the bandwidth allocation tree has a configured FAP and configured FAP rules. The global bandwidth management system checks its FAP rules whenever it updates its FAP fields and takes the configured action when the FAP is exceeded. The action may be to send an event to the NMS, or it may be an automatic change to CIR/MIR, or it may be a "FAP state" raised in the GBWM statistics message.

1.5.1 iNet Bandwidth Management

According to some embodiments, the iNet QoS engine is responsible for allocating outbound and inbound bandwidth to terminals according to their defined subscriber service plan. The engine is built based on a tree hierarchy of nodes. Each node is configured dynamically with CIR/MIR parameters by the Global QoS Enforcer, but terminals are allocated bandwidth by the iNet QoS engine.

The following sections describe the basic QoS functionality which consists of packet classification and scheduling. Also covered is the iNet Group Quality of Service (GQoS) feature which is responsible for terminal bandwidth allocation. The GQoS Demand/Allocation Algorithm is also covered.

1.5.1.1 Basic QoS Functionality

This section explains the basic QoS functionality at iNet level in two different areas:

Packet classification
Packet scheduling

1.5.1.1.1 Packet Classification

Packet classification is the ability of a given network element to correctly identify IP traffic flows according to the application it represents.

According to some embodiments, each packet that enters the GSN system is classified into one of the configured service levels. A service level may represent a single application (such as VoIP traffic from a single IP address) or a broad class of applications (such as all TCP-based applications). In some embodiments, each service level is defined by one or more packet-matching rules. The set of rules for a service level allows logical combinations of comparisons to be made between the following IP packet fields:

Source IP address
Destination IP address
Source port
Destination port
VLAN ID
Protocol
DSCP, TOS, Precedence The Virtual Remote (VR) is a container of one or more service levels. The virtual remote is the leaf node in the GQoS tree that generates bandwidth demand based on the associated service level queue.

1.5.1.1.2 Packet Scheduling

Packet scheduling determines the order in which packets are transmitted according to priority and classification.

When a terminal always has sufficient bandwidth for all of its applications, packets are transmitted in the order that they are received without significant delay. Priority makes little difference since the terminal never has to select which packet to transmit next.

However, when a terminal does not have sufficient bandwidth to transmit all queued packets, the terminal scheduling algorithm must determine which packet to transmit next from the set of queued packets across a number of service levels.

For each service level defined, in some embodiments, any one of the following queue types are used to determine how packets using that service level are to be selected for transmission: priority queue, class-based weighted fair queue (CBWFQ), and best effort queue. Priority queues are emptied before CBWFQ queues are serviced; CBWFQ queues are in turn emptied before best effort queues are serviced. FIG. 10 illustrates an embodiment of a packet scheduling algorithm. According to some embodiments, the packet scheduling algorithm first services packets from priority queues in order of priority, P1 being the highest priority for non-multicast traffic. It selects CBWFQ packets only after all priority queues are empty. Similarly, packets are taken from best effort queues only after all CBWFQ packets are serviced. The service level may be defined for each unique packet results. Operator configurations include, but are not limited to: queue type, queue priority (multicast, P1→P4)(if priority queue), queue CBWFQ cost (if CBWFQ queue), queue drop policy, packet marking rules (diffserv/TOS marking), CIR trigger indication, and real time weight.

Priority Queues—

According to some embodiments, there are sixteen levels of priority queues 1000, Level-1 (the highest) to Level-16 (the lowest).

In some embodiments, all queues of higher priority must be empty before any lower priority queues are serviced. If two or more queues are set to the same priority level, then all queues of equal priority are emptied using a round robin selection algorithm prior to selecting any packets from lower priority queues. As an example, each priority level preempts the higher numbered priority levels. After multicast packets are serviced, P1 receives exclusive service until it is emptied, and then P2 is subsequently serviced.

Class-Based Weighted Fair Queues—

According to some embodiments, packets are selected from class-based weighted fair queues 1002 for transmission based on the service level (or 'class') of the packet. Each service level is assigned a 'cost'. Packet cost is defined as the cost of its service level multiplied by its length. Packets with the lowest cost are transmitted first, regardless of service level.

In some embodiments, the cost of a service level changes during operation. Each time a queue is passed over in favor of other service levels; the cost of the skipped queue is credited, which lowers the cost of the packets in that queue. Over time, all service levels have the opportunity to transmit at least occasionally, even in the presence of higher priority traffic. Assuming there is a continuously-congested link with an equal amount of traffic at each service level, the total bandwidth available is divided more evenly by deciding transmission priority based on each service level cost.

As an example, after all priority queues are serviced and emptied, a CBWFQ algorithm is performed to service CBWFQ queues 1002. Arrival of any packets at the priority level queues 1000 would preempt packets at the CBWFQ queues 1002. In some embodiments, when a packet is released from the packet scheduler 1006, the packet cannot be preempted.

Best Effort Queues—

According to some embodiments, packets in best effort queues 1004 do not have priority or cost. All packets in these queues are treated equally by applying a round robin selection algorithm to the queues. In some embodiments, best effort queues 1004 are only serviced if there are no packets waiting in priority queues and no packets waiting in CBWFQ queues.

In some embodiments, any combination of priority queues, CBWFQ queues, and best effort queues can be utilized. According to some embodiments, the packet scheduler 1006 determines when packets are serviced from the priority queues 1000, CBWFQ queues, and best effort queues.

1.5.1.2 iNet Group Quality of Service (GQoS)

Packet classification and scheduling are the foundations of a basic QoS capability. However, in some embodiments, the bandwidth management functionality is done by the iNet GQoS algorithm.

According to some embodiments, the iNet GQoS is a demand/allocation algorithm, where demand flows up the tree from the lower nodes and capacity is allocated down the tree starting from the iNet bandwidth pool.

The iNet GQoS algorithm consists of a set of processes managing inbound and outbound bandwidth demand and allocation. PP_NA is responsible for outbound bandwidth allocation and PP_DA is responsible for inbound bandwidth allocation.

In the iNet GQoS structure, at the top is the network layer consisting of a DVB-S2 (Digital Video Broadcasting—Satellite—Second Generation) forward carrier and associated TDMA return carriers. At the bottom are the Virtual Remotes (VR) which contain one or more service levels (SLs). These nodes are always present in the GQoS tree. Between the network and the Virtual Remote there could be multiple group nodes, for example, representing distribution partners and their customers.

According to some embodiments, the iNet GQoS algorithm applies the following configuration parameters to all nodes in the iNet GQoS tree. For the group nodes in the GQoS tree, some of these configuration parameters are static and are inherited from the group service plan such as priority, cost, fairness options etc. The CIR and MIR configurations at the iNet level, however, are dynamic configurations and are controlled by the SAS portion of the QoS enforcer.

Examples of the configuration parameters applied to each node include:
  CIR (Committed Information Rate)
  MIR (Maximum Information Rate)
  Priority
  Cost
  Fairness Options:
  Fairness relative to CIR, and
  Fairness relative to MODCOD:
    Fairness relative to operating MODCOD, or
    Fairness relative to base MODCOD In some embodiments, in addition to configured properties, each node in the iNet GQoS tree also has run-time properties. As an example, the run-time property is the run-time demand generated by the leaf node (VR) and then aggregated by the parent nodes. As the VR is the source of the demand, run-time properties flow up from child to parent and configured properties flow down from parent to child.

Figure 11:
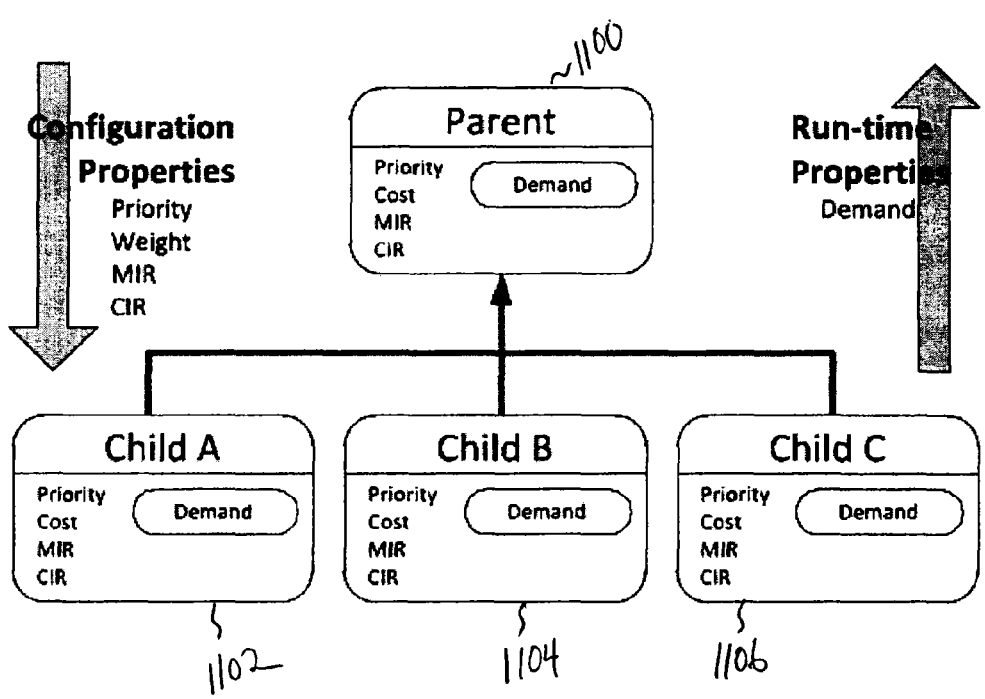
FIG. 11 illustrates an exemplary embodiment of parent and child properties and demand hierarchy.

During allocation of parent nodes, in some embodiments, only the parent node's configuration properties are considered while the demand is derived from children nodes. The GQoS algorithm uses demand from children nodes and configuration properties of the parent node to determine the parent's allocation. FIG. 11 illustrates an example tree structure with a parent node 1100 with corresponding child nodes 1102, 1104, and 1106. As illustrated in FIG. 11, configuration properties flow down from the parent 1100 to the child nodes 1102-1106, and run-time properties flow up from the childe nodes 1102-1106 to the parent 1100.

1.5.1.2.1 Data Structure and Definitions

The following are embodiments of definitions of the terminology used regarding the iNet GQoS algorithm:
  iNet GQoS Tree—The iNet GQoS tree is a tree structure. The iNet capacity is the root of the tree and subscriber service plan components (SSPCs) or virtual remotes (VRs) are the leaf nodes of the tree. All nodes in between are group service plan (GSP) nodes. There is one iNet GQoS tree for each inbound and outbound direction.
  Node—The GQoS tree consists of a hierarchy of nodes defining parent/child relationships between the nodes. A node element in the GQoS tree has the demand property. The leaf node generates the demand and a parent node aggregates the demand from all its children nodes.
  Service Level—A service level is the only source of demand in the group QoS tree. It can only be contained by a virtual remote (VR) node.
  Virtual Remote Node—A virtual remote (VR) node is a container of service levels (SLs). The VRs are the leaves in the iNet GQoS tree and their demand is the input to the iNet GQoS algorithm. They are defined by subscriber service plan components (SSPCs).
  Demand—The demand is generated by service levels in bytes and aggregated by the service levels' parent VR. As demand moves up the tree it gets converted into symbols per second for the outbound and slots per second for the inbound.
  Congestion—The condition that exists when the amount of bandwidth requested is more than amount of bandwidth available.
  Committed Information Rate (CIR)—A node with CIR set is given preference in an allocation group over nodes that do not have any CIR. Bandwidth is allocated up to the demand and CIR.
  Maximum Information Rate (MIR)—A node with MIR set cannot exceed this bit rate.
  Base MODCOD—The base MODCOD is the lowest MODCOD at which a terminal's or application's CIR/MIR will be honored.
  Priority—The order in which bandwidth is to be exclusively allocated. Allocation can only be done on nodes with the same priority.
  Cost—Value assigned to a node to realize proportional bandwidth allocation.

1.5.1.2.2 iNet Demand/Allocation Algorithm

Demand Calculation Algorithm:

According to some embodiments, on the downstream, the demand is generated ten times per second. On the upstream it is generated eight times per second. In some embodiments, service levels generate bandwidth demand and are contained in the VR node; therefore, the VR is the source of demand for the GQoS engine. Since the GQoS structure is a tree hierarchy consisting of group nodes, every node's demand is the aggregated demand of all children nodes.
  Outbound (Downstream) Demand—In some embodiments, on the ACM outbound, the demand is generated in bytes for the next 100 msec and converted into symbols using the current MODCOD scaling factor of the terminal.
  Demand in Symbols=Demand in Bytes*8/Current MODCOD spectral efficiency
  The demand in symbols is then normalized to the network's best MODCOD for all terminals, called scaled information rate (SIR). All the nodes report aggregated SIR demand up the tree.
  Inbound (Upstream) Demand—In some embodiments, on the upstream, the demand is generated by service levels in bytes for the next 125 msec and then converted into slots. All nodes report demand up the tree in slots. The demand is converted into the number of slots by dividing the demand in bytes by the configured size of the time-slot. Each node in the tree aggregates demand from its child node and sends it up the tree in slots.

Bandwidth Allocation Algorithm.

As mentioned above, the iNet GQoS algorithm works by calculating demand from the bottom to the top of the QoS tree for every node. The bottom nodes are the VRs which gather demand from service levels. Demands from VRs are grouped according to their configured priority. Groups with higher priority preempt lower priority groups. According to some embodiments, there are two rounds of allocation for each priority; CIR round and Best Effort round. In some embodiments, the engine offers two types of priorities: absolute and per allocation round. With absolute priority, nodes are grouped based upon their configured priority, and the round of allocations applies to the higher priority node before moving to the next priority level allocation. With per allocation round priority, nodes are grouped based upon their configured priority. In this case, the priority applies to the round of allocation, serving CIR by priority, then moving on to the best effort round of allocation.

Outbound (Downstream) Allocation—In some embodiments, on the ACM outbound, all node allocations are done based on SIR. For virtual remotes, the SIR is converted based upon the scaling factor of the current operating MODCOD.

Inbound (Upstream) Allocation—In some embodiments, on the inbound, allocation is based upon slots. The terminal will be allocated slots, which will be filled by packets waiting in the SL queues. Refer to the core module section of the Maritime 60 cm Ka Band Terminal Functional Specification for more details.

Figure 12A:
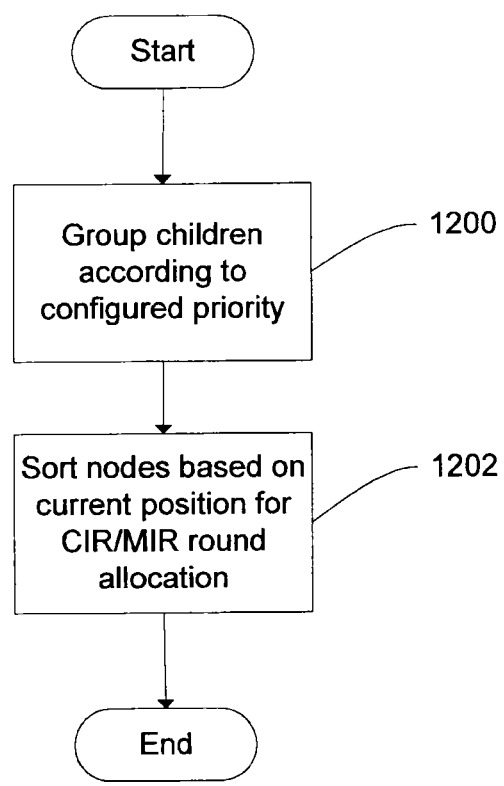
FIG. 12A illustrates an exemplary embodiment for performing bandwidth allocation.

FIG. 12A illustrates an example process for performing bandwidth allocation. In some embodiments, the process illustrated in FIG. 12 starts at 1200 to group children according to their configured priority. The grouping of children according to priority is performed, in some embodiments, as follows:

From top to bottom, for every node
Children are grouped according to their configured priority. Groups with higher priority preempt lower priority groups.

For absolute priority type:
1. Allocation is done in two rounds—CIR round followed by the best-effort round (MIR round)

For Per-Allocation-Round priority type:
1. Allocation is done in the CIR round. After satisfying all nodes' CIRs, allocation moves to the best-effort round (MIR round) by the order of the configured priority.

Figure 12B:
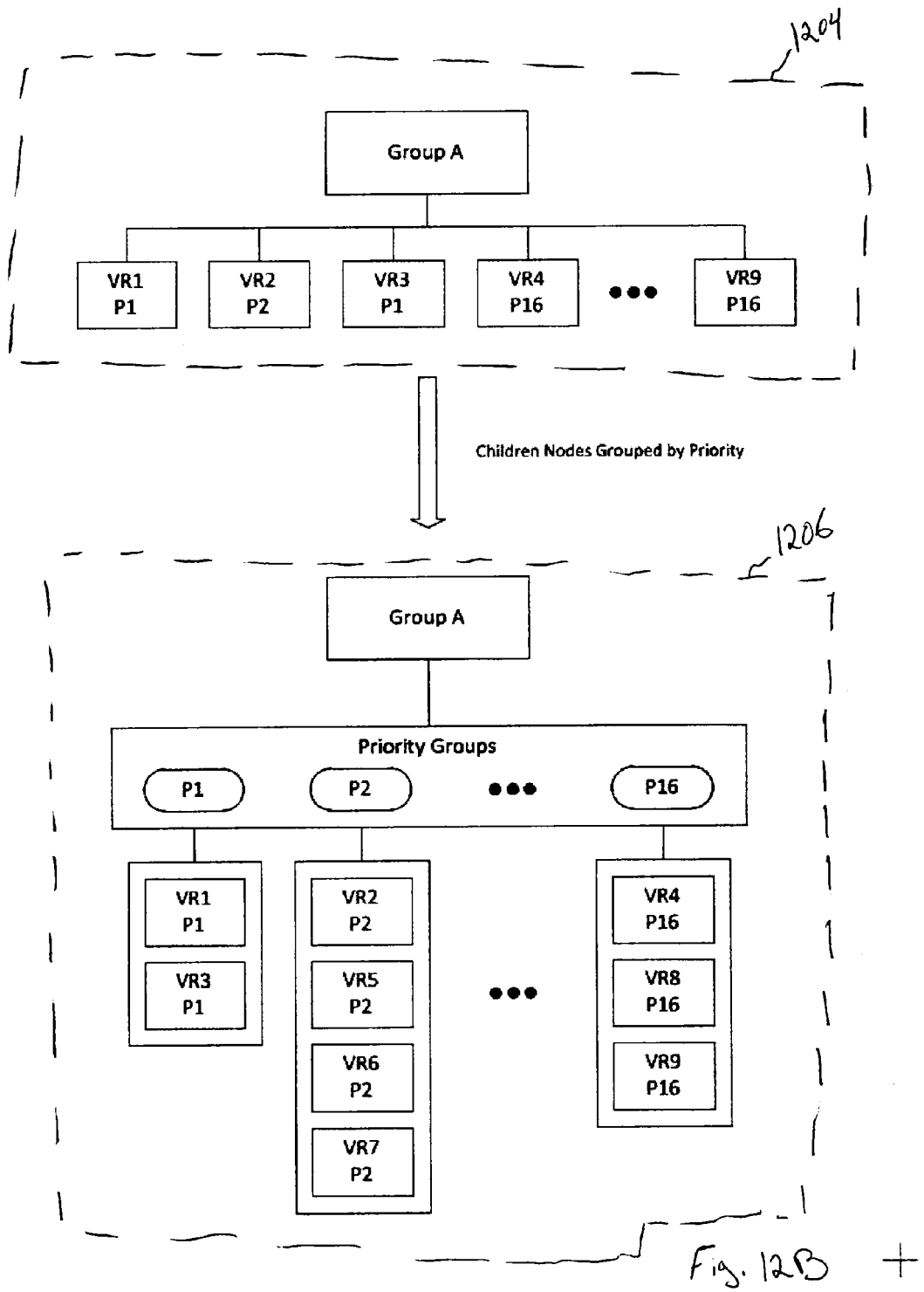
FIG. 12B illustrates an exemplary embodiment of grouping of nodes by priority during allocation.

FIG. 12B illustrates an example tree structure 1204, where the children nodes have not been grouped according to priority, and an example tree structure 1206, where the children nodes have been grouped according to priorities 1-16.

Process flow proceeds from 1200 to 1202 to sort nodes based on CIR/MIR round allocation. The sorting of nodes is performed, in some embodiments, as follows: For CIR & MIR round of allocation, nodes are sorted based on their current positions. The position starts from 0 and adjusts as follows:

1. The node whose position is the closest to the parent's working position is served. The parent's working position is the position of the latest served node. At the start, all nodes have a position of 0.
2. Calculate allocation for each round. The available bandwidth is divided into equal units. The configured cost of each child node is used to calculate the number of units.

$$\text{Number of Fair Slices} = \sum_{i=1}^{n} \frac{1}{\text{cost(child node } i\text{)}}$$

where
n=total number of child nodes
Fair Slice Size=Parent Total Available Bandwidth/Number of Fair Slices
Allocation=min (Fair Slice Size, Demand)

3. The node's position increases by: Allocation*cost.
4. The node will be inserted back into the sorted list with a new position. If the node is detected as satisfied or out of limit, it will be removed from the working list. Its position will be set to the parent's working position when it is inserted back.

FIG. 12C illustrates an example allocation based on the following parameters: Parent node available bandwidth=300 k
Demand for each VR=400 k
Number of Fair Slices=1/1+1/0.5=3
Fair Slice size=300 k/3=100 k
Allocation=min (100 k, 400 k)=100 k
Position1_VR1=100*1=100
Position1_VR2=100*0.5=50

According to these parameters, VR2 (1210) gets two rounds of allocation for every one round that VR1 (1212) gets until the parent's (1208) available bandwidth is reached.

1.5.1.2.3 iNet Demand/Allocation Algorithm Example

Figure 13:
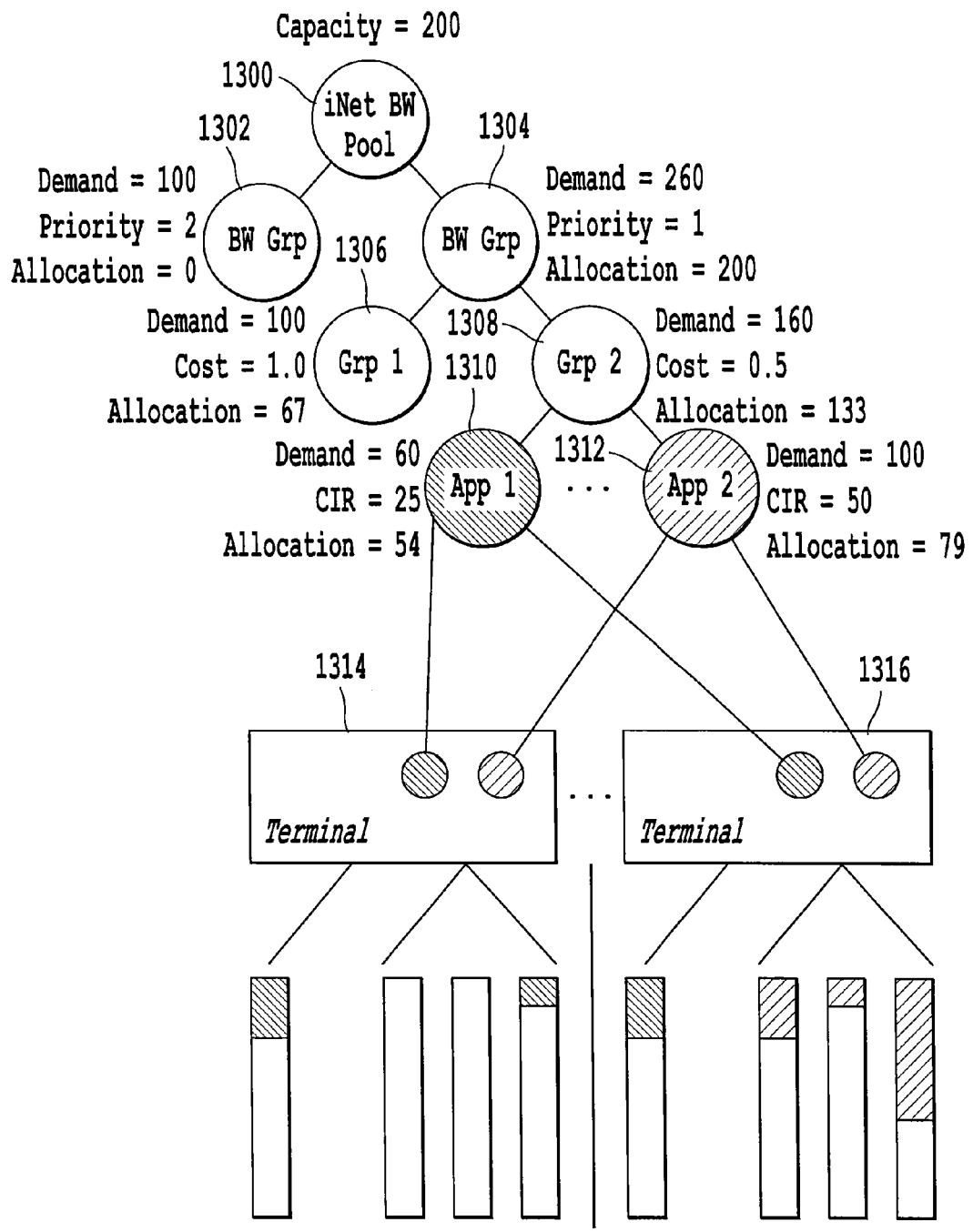
FIG. 13 illustrates an exemplary embodiment of an example of the iNet demand allocation algorithm.

FIG. 13 illustrates an embodiment of an example of the iNet demand allocation algorithm. As illustrated in FIG. 13, an iNet BW pool 1300 has capacity of 200 units, which is partitioned among a first BW Group 1302 and a second BW Group 1304. The second BW Group 1304 is further portioned among Grp 1 (1306) and Grp 2 (1308). Grp 2 (1308) is partitioned among App 1 (1310) and App2 (1312), which are used by Terminals 1314 and 1316.

Demand flows up the tree from the lower nodes and capacity is allocated down the tree starting from the bandwidth pool. In this example, demand from App 1 (1310) and App 2 (1312) is aggregated at the service group to 160 units, demand from the two service groups is aggregated at the bandwidth group to 260 units. The total demand from both bandwidth groups is 360 units. The bandwidth pool capacity is only 200 units. Since the bandwidth group on the right has a higher priority (absolute priority) with no MIR, it gets allocated the total capacity of 200 units while the bandwidth group on the left, with an absolute priority 2, does not get any units allocated. At the service group level, since the cost parameter has been set, the service group with cost 0.5 gets twice the allocation of the service group with a cost of 1.0. At the application level, since CIR has been set, the first round of allocation attempts to satisfy all CIRs. In this case, App 1 gets 25 units and App 2 gets 50 units. The best effort round of allocation will divide the remainder equally between the two nodes since no cost parameter is set, resulting in an additional 29 units for each App for a total of 54 units for App 1 and 79 units for App 2.

Figure 14:
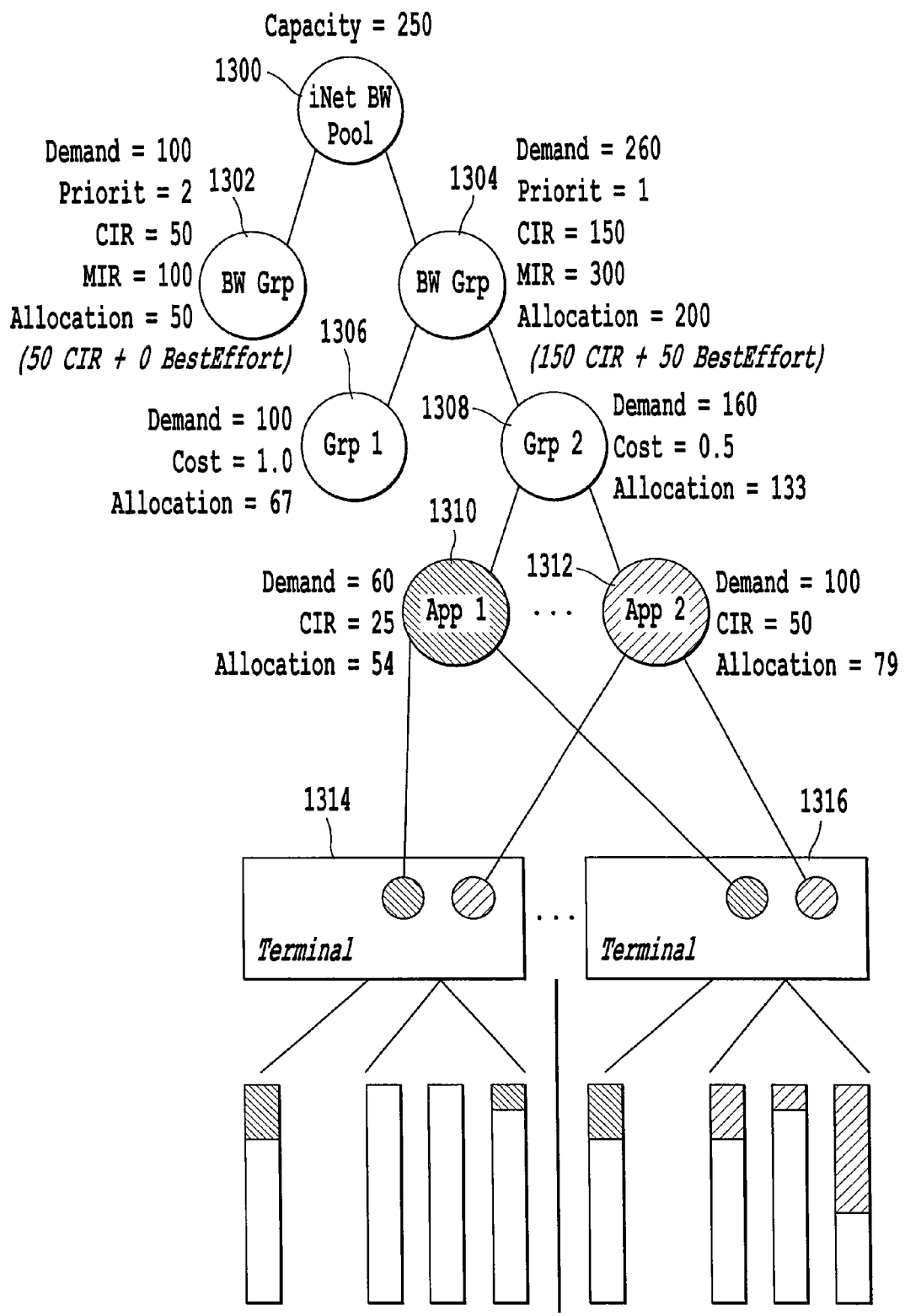
FIG. 14 illustrates an exemplary embodiment of an example of the iNet demand allocation algorithm with per-allocation-round priority.

FIG. 14 shows an example of an embodiment of the allocation algorithm with per-allocation-round priority. The structure illustrated in FIG. 14 corresponds to the structure illustrated in FIG. 13. In this example, the bandwidth pool capacity is only 250 units. Since the bandwidth group on the right has a higher per allocation round priority, it gets allocated the total CIR of 150 units first, then the bandwidth group on the left will get its 50 units of CIR. On the MIR round of allocation, the bandwidth group on the right will get all of the remaining 50 units since it has a higher priority than the group on the left. This results in zero MIR allocation for the bandwidth group on the left.

1.5.1.3 ACM GQoS

According to some embodiments, the outbound iNet GQoS uses adaptive coding and modulation (ACM) and allows terminals to operate at their optimal modulation and coding (MODCOD) based on their real-time signal-to-noise ratio (SNR). The SNR depends upon the antenna size of the Satellite Terminal, geographic location within the beam coverage and rain fade conditions.

Figure 15:
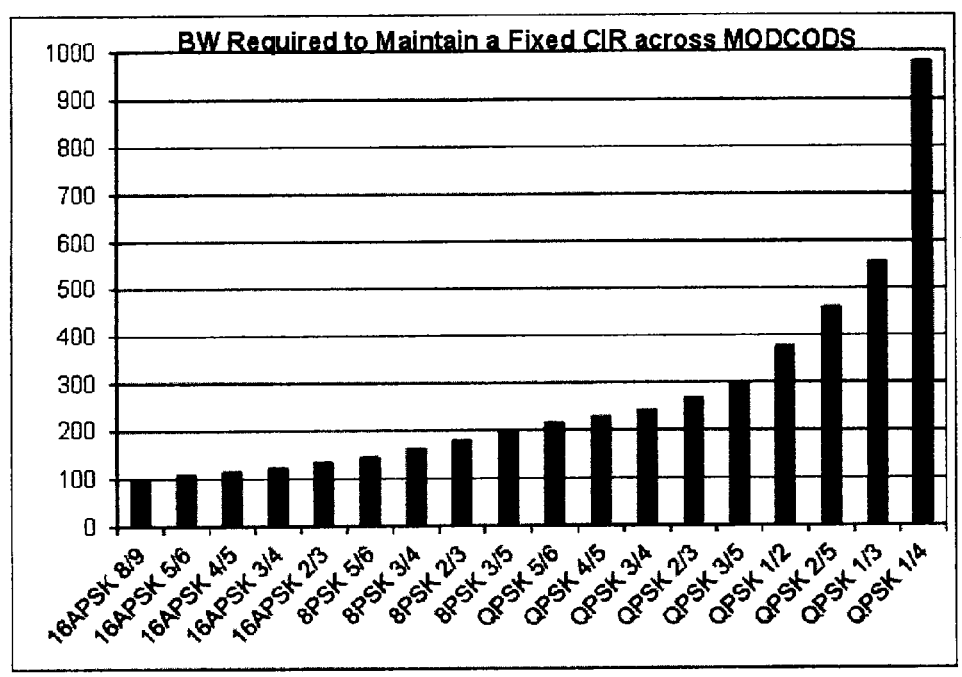
FIG. 15 illustrates a chart of MODCOD vs. bandwidth.

As shown in FIG. 15, the bandwidth required to deliver a fixed information rate increases significantly when the remote operates at lower SNR and therefore lower MOD-CODs.

According to some embodiments, the system allows the configuration of a base MODCOD for a SSPC. For example, the SSPC's CIR/MIR are honored when the terminal is operating at or above the base MODCOD. When the terminal is operating above its base MODCOD, the SSPC does not get rewarded with a higher CIR/MIR. If the terminal is operating below the base MODCOD, however, the CIR/MIR is scaled down based on the bandwidth efficiency of the operating MODCOD.

Figure 16:
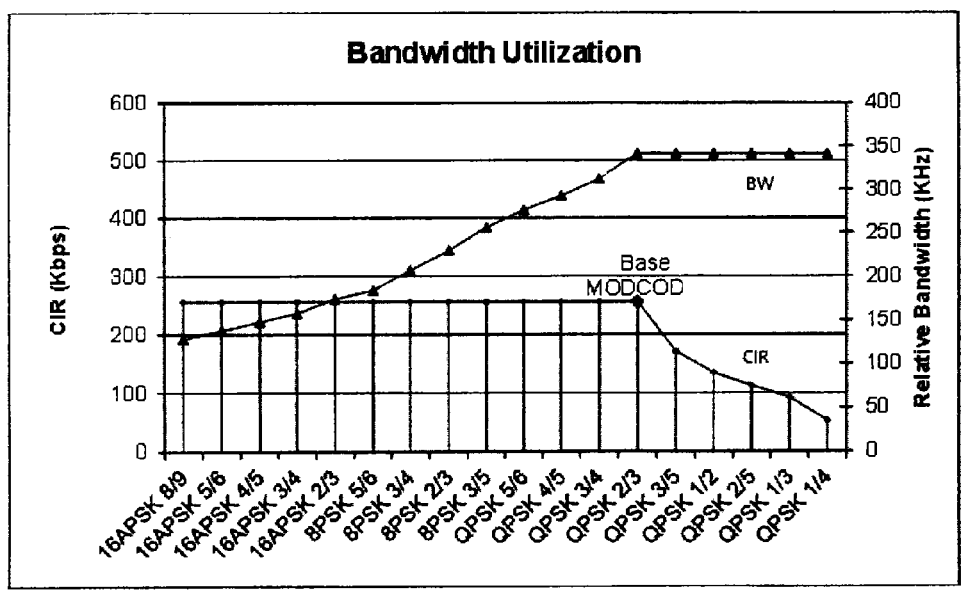
FIG. 16 illustrates a chart of CIR based on base MODCOD & bandwidth utilization.

FIG. 16 illustrates the scaling of CIR/MIR when a terminal is operating below its base MODCOD.

1.5.1.3.1 Allocation Fairness Under Contention

According to some embodiments, to achieve various fairness options, the cost of nodes is adjusted as follows:

Adjusted SSPC cost=configured SSPC cost*adjustment for CIR fairness*adjustment for MODCOD fairness The adjustment for CIR fairness applies when the relative to CIR fairness is selected for the group and changes dynamically as the SSPC CIR changes in different Geographic Scopes, Service Areas or due to throttling.

In some embodiments, the adjustment for MODCOD fairness is a static adjustment if the relative to base MODCOD fairness option is selected and dynamically adjusted if the relative to operating MODCOD fairness option is selected.

1.5.1.3.1.1 Relative to CIR

According to some embodiments, this option allows the cost allocation to be proportional to the configured CIR during contention. For example, the system computes an internal cost parameter that is used by the PP_NC algorithm to implement the proportional allocation behavior. The QoS cost parameter is still available to the user.

1.5.1.3.1.2 Relative to Base MODCOD

According to some embodiments, this option allows for a choice of fairness in allocation relative to base MODCODs during contention based on satellite bandwidth or bps. For example, when this option is selected, the system computes an internal cost parameter that is used by the demand allocation (DA) algorithm to implement the MODCOD fairness behavior. This computed cost parameter is internal to the system and is not available to the user. It is also a different cost parameter than the one used for CIR fairness. The configured QoS cost parameter is still be available to the user.

FIG. 17 lists the cost values based on the MODCOD spectral efficiency.

According to some embodiments, this option allows for a choice of fairness in allocation relative to the operating MODCODs during contention. For example, when this option is selected, the cost of the nodes in the QoS tree will be dynamically set based on the operating MODCOD resulting in bps fairness. The configured QoS cost parameter is still available to the user.

1.5.1.4 A-TDMA Inbound

According to some embodiments, the inbound GQoS bandwidth allocation algorithm supports A-TDMA.

In further embodiments, the GQoS engine honors the configured CIR/MIR as long as the terminal is operating at or above the base $C/N_0$. The base $C/N_0$ is specified in the subscriber service plan component.

For example, when a terminal drops below its base $C/N_0$, the system scales the CIR & MIR based on a scaling factor scheme similar to that used on the outbound when the terminal drops below its base MODCOD.

In additional embodiments, the scaling factor is also used to calculate cost in order to support and implement similar fairness options as supported on the outbound. Examples of fairness options include:

Fairness relative to the CIR—This option allows bandwidth allocation in contention proportional to the configured CIR.

Fairness relative to the operating MODCOD—Fairness relative to operating MODCOD allows all SSPCs in the group to be treated equally, regardless of their operating MODCOD, resulting in bps fairness.

Fairness relative to the base MODCOD—Fairness relative to base MODCOD allows for a choice of fairness in allocation relative to base MODCODs during contention, resulting in bps fairness.

1.6 Global Bandwidth Control 1.6.1 Global QoS Enforcer 1.6.1.1 Process Architecture According to some embodiments, the global GQoS enforcer resides at the NOC and maintains the global GQoS structure. Each node in the global GQoS tree is built based on a group service plan (GSP). The nodes are called GSP nodes. According to some embodiments, the group service plan contains QoS parameters including CIR and MIR. In further embodiments, the CIR and MIR configured in the group service plan are the static configuration for the GSP nodes of the global QoS tree.

In additional embodiments, each iNet has the same GQoS tree structure as the global structure, where the Global QoS Enforcer dynamically adjusts the CIR and MIR for the GSP nodes in each iNet in order to enforce the static CIR and MIR of the group service plan.

In some embodiments, each GSP node in the iNet tree gets assigned a CIR/MIR dynamically by the global GQoS enforcer, based on changes in aggregate traffic demand from terminals for that GSP node, within the configured terminal CIR and MIR.

According to some embodiments, the Global QoS Enforcer process is distributed between the NOC and each of the three SASs. In further embodiments, the NOC performs the CIR and MIR adjustments for the GSP node in the SAS GQoS tree based on the aggregate demand from each SAS, and the SAS makes CIR and MIR adjustments for each GSP node in all of its iNets based on the aggregate demand of each iNet.

Figure 18:
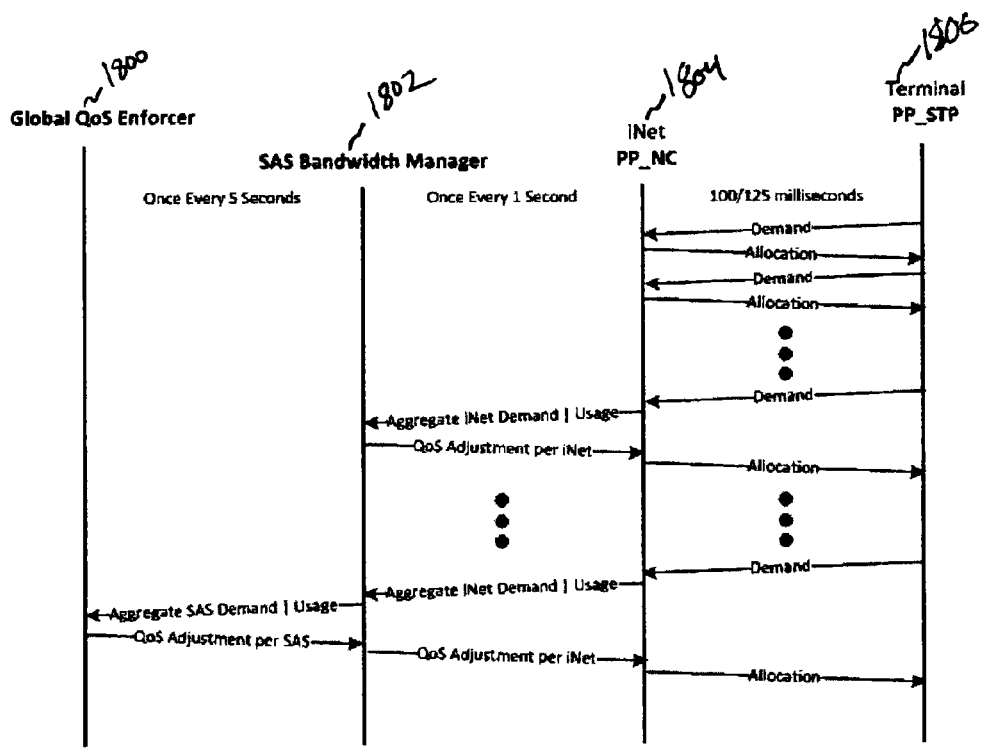
FIG. 18 illustrates an exemplary embodiment of a timing diagram between the Global QoS Enforcer, SAS Bandwidth Manager, iNet PP_NC, and Terminal PP_STP.

FIG. 18 illustrates an embodiment of a timing diagram between the Global QoS Enforcer 1800, SAS Bandwidth Manager 1802, iNet PP_NC 1804, and Terminal PP_STP 1806. As shown in FIG. 18, the NOC global GQoS enforcer 1800 runs once every 5 seconds. The NOC receives aggregate bandwidth demand of iNets for GSP nodes from all SASs; it computes and sends the dynamic CIR and MIR for the GSP nodes in each SAS.

The SAS Bandwidth Manager 1802 runs once every 1 second to perform the dynamic adjustments within the SAS. Under this scheme, the NOC determines the allocation for each GSP node per SAS, and the SAS determines the allocation between the iNets based on the NOC allocation to the SAS.

As illustrated in FIG. 18, the iNet PP_NC 1804 receives a demand from the Terminal PP_STP 1806 every allocation interval (100 ms on the downstream and 125 ms on the upstream), and provides an allocation to the Terminal PP_STP.

According to some embodiments, the QoS tree structure of the SAS is similar to the Global QoS Enforcer. The algorithm is exactly the same as the algorithm in the Global QoS Enforcer. The SAS bandwidth manager 1802 computes the CIR/MIR for each GSP node in the iNet.

For example, if a GSP node has a global CIR of 20 M, the NOC enforcer 1800 may determine at a 5 second interval that SAS-1 gets 10 M, SAS-2 gets 7 M and SAS-3 gets 3 M. The SAS-1 enforcer performs the dynamic adjustments for the next 5 seconds, at 1 second intervals, for all iNets within SAS-1 based on its allocated 10 M.

In a case of NOC failure, when the communication to the NOC QoS enforcer is lost, the SAS bandwidth manager runs with the last update from the NOC. During the NOC outage interval, the SAS QoS enforcer adjusts the CIR/MIR of GSP nodes across all iNets. According to some embodiments, all terminal bandwidth management functionality including service scheduling and FAP enforcement also runs at the SAS during the NOC outage.

Figure 19:
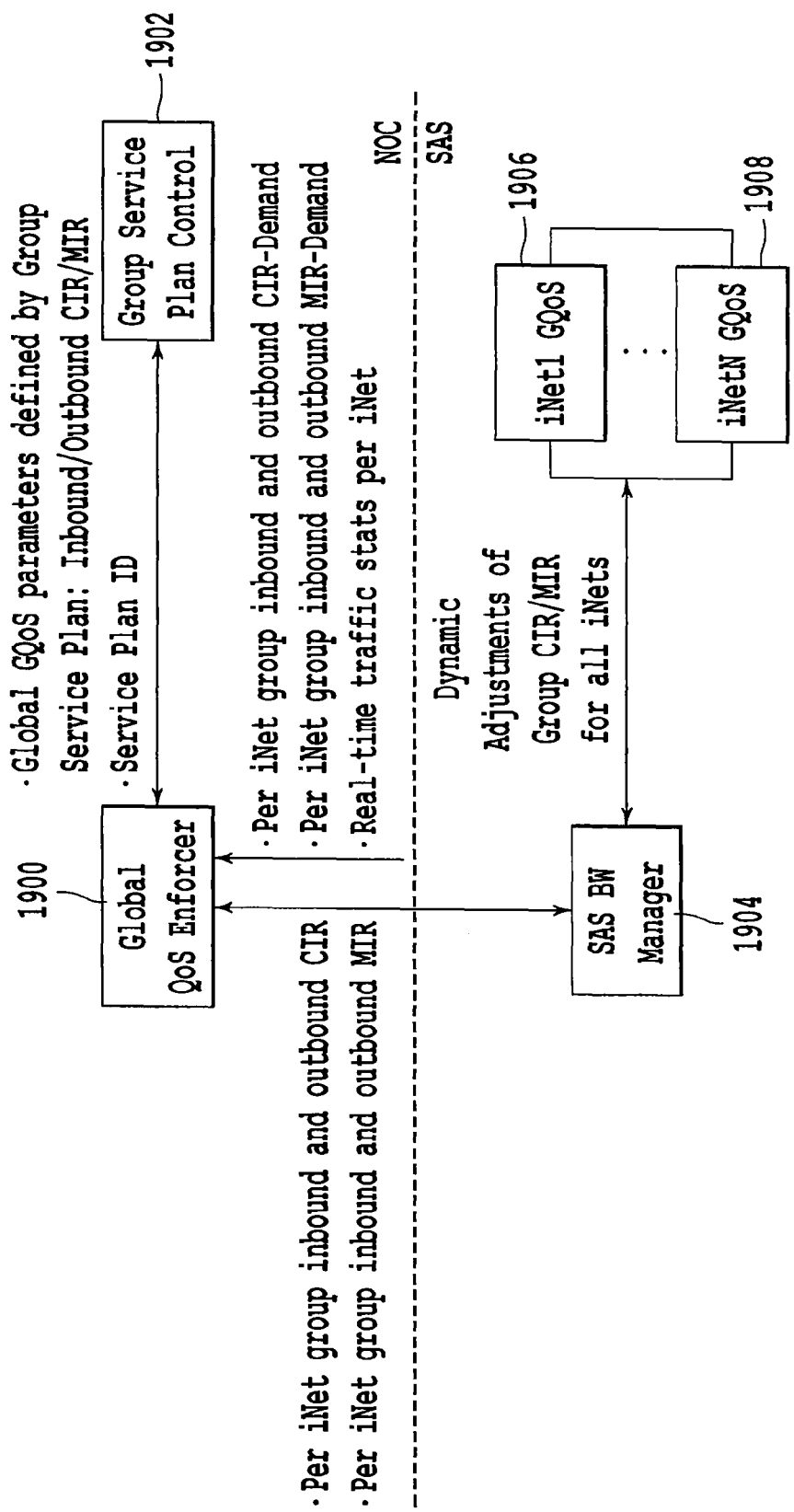
FIG. 19 illustrates an exemplary embodiment of the Global QoS Enforcer.

FIG. 19 illustrates an embodiment of the Global GQoS enforcer 1900 in communication with the SAS BW manager 1904 and Group Service Plan Control manager 1902. As illustrated in FIG. 19, the Global QoS Enforcer 1904 receives group QoS configuration from the Group Service Plan Manager 1902 at the NOC. According to some embodiments, the input from the Group Service Plan Manager 1902 includes:
  Service plan ID
  Group QoS bandwidth parameters (inbound/outbound static CIR/MIR)

The Global QoS Enforcer 1904 also receives, in some embodiments, the following from the SAS bandwidth manager 1904:
  Inbound and outbound traffic demand of the GSP nodes from all SASs
  Aggregate real-time traffic stats from all SASs In some embodiments, the Global QoS Enforcer runs once every 5 seconds to compute and send to the SAS BW Manager 1904 the following parameters for each GSP node:
  Inbound and outbound dynamic CIR per SAS for GSP nodes
  Inbound and outbound dynamic MIR per SAS for GSP nodes As also illustrated in FIG. 19, the SAS BW Manager 1904 provides dynamic adjustments of the group CIR/MIR for all iNets (1906-1908).

1.6.1.2 Global QoS Enforcer Data Structure & Definitions

The following are exemplary embodiments of the Global QoS Enforcer data structure and corresponding components included in the data structure.

Global Group QoS Tree—The global GQoS tree is a tree structure. The GSN capacity is the root of the tree and group service plans (GSPs) are nodes of the tree. Each Point of Demand Aggregation (PTA) node in the tree has three leaves, one corresponding to each SAS. There exists one global group QoS tree for each direction (inbound and outbound), which resides at the NOC. As an example, there can be three satellites with three associated SASs (i.e., one SAS per satellite). As another example, there can be one satellite operated from a single SAS or a satellite with capacity managed by more than one SAS, where half of the capacity is managed by one SAS and other half by a different SAS.

SAS Group QoS Tree—The SAS GQoS tree is a tree structure. The satellite capacity is the root of the tree and group service plans (GSPs) are nodes of the tree. Each PTA node in the tree has its leaves corresponding to iNets of this SAS. There exists one SAS group QoS tree per SAS per direction (inbound & outbound). This tree structure resides at the SAS.

iNet Group QoS Tree—The iNet GQoS tree resides at the SAS and has the same structure of GSP nodes as the global group QoS tree and the SAS group QoS tree. Its root node, however, corresponds to the capacity of the iNet as dictated by the global resource manager (GRM), and each of its PTA nodes has virtual remotes (VRs) as leaves corresponding to subscriber service plan components (SSPCs).

Points of Terminal Aggregation (PTA Node)—PTA nodes are the nodes in the iNet GQoS tree structure which receive demand directly from VRs or SSPCs. Since the iNet GQoS tree, SAS GQoS tree, and global GQoS tree all have the same structure, the corresponding nodes in the SAS and global GQoS tree are also called PTA nodes.

Figure 20:
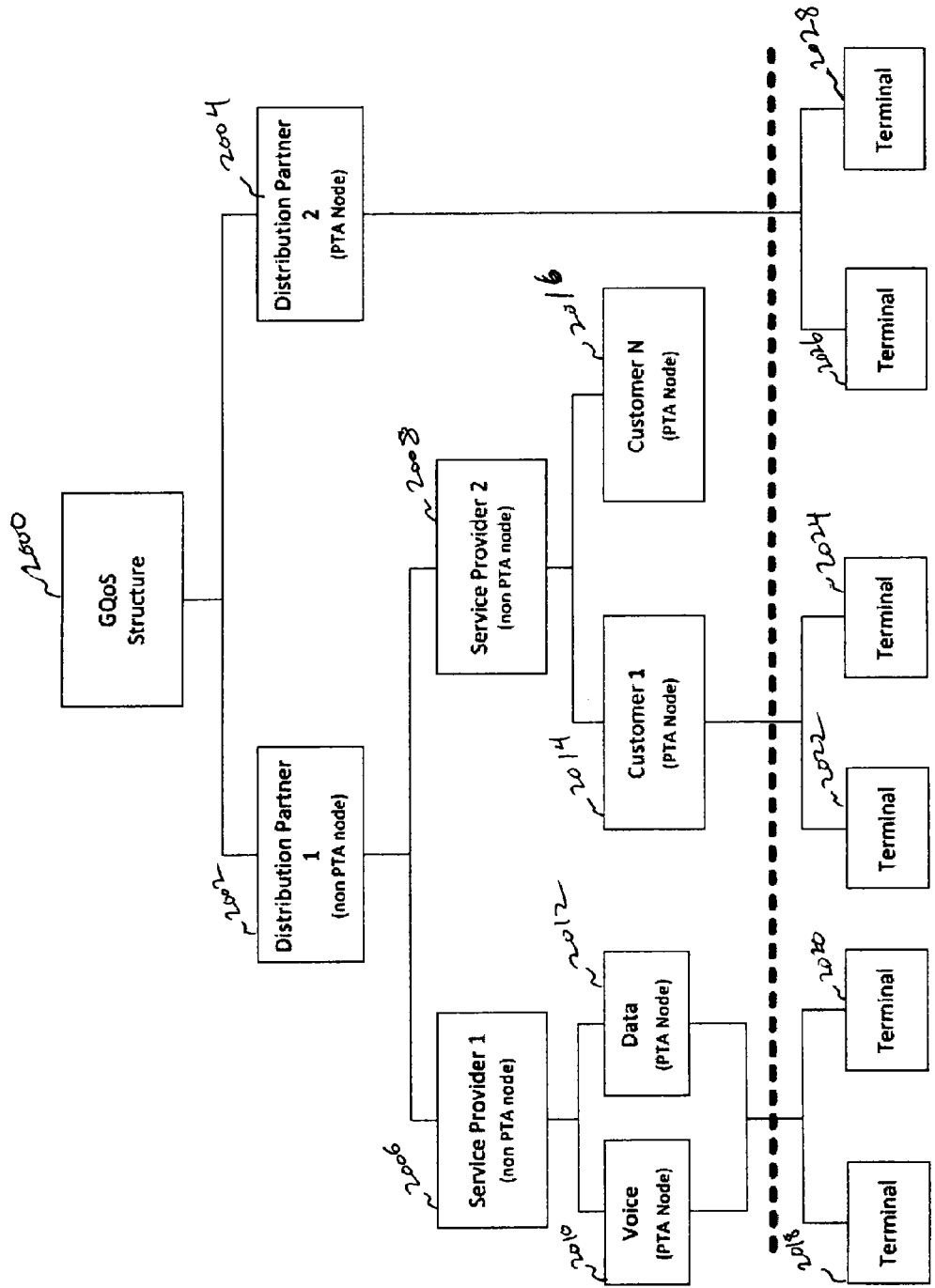
FIG. 20 illustrates an exemplary embodiment of points of terminal aggregation (PTA) vs. non-PTA nodes.

Non-Points of Terminal Aggregation (non-PTA Node)—All the other nodes that are partitioned into groups and receive demand from group nodes are non-PTA nodes. As shown in FIG. 20, the GQoS structure 2000 includes PTA nodes (2004, 2010, 2012, 2014, 2016) and non-PTA nodes (2002, 2006, 2008). The non-PTA nodes do not have VRs attached to them. As illustrated in FIG. 20, the PTA nodes are attached to one of terminals 2018-202, which provide demand to the PTA nodes.

VR Current Demand—The VR reports demand eight times per second on the upstream and ten times per second on the downstream. The VR current demand is calculated as the average demand for the current interval of 1 second.

VR Current CIR Demand—The demand from a VR up to its CIR is used in the calculation of CIR demand. The VR's current CIR demand is calculated as the average CIR demand from the VR for the current interval of 1 second that just ended, which is the average of ten entries on the downstream and eight entries on the upstream.

VR Current MIR Demand—The demand from a VR in excess of its CIR and up to its MIR is used in the calculation of MIR demand. It is also calculated as the average for the current interval of 1 second that just ended.

Figure 21A:
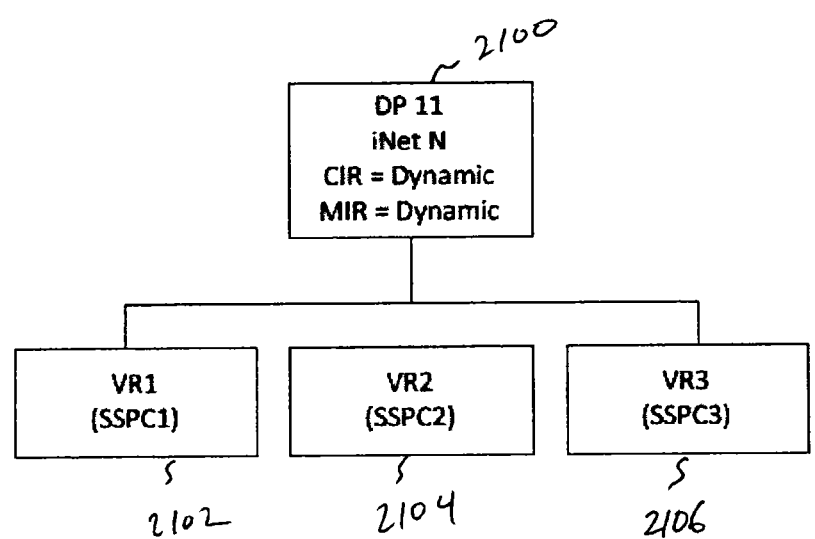

FIGS. 21A and 21B illustrate an example of calculation of CIR and MIR demand. As illustrated in FIG. 21A, DP 11 (2100) is associated with VR1 (2102), VR2 (2104), and VR3 (2106). As illustrated in FIG. 21B, in this example, SSPC 2 (2106) demands 1M and its CIR and MIR are configured as 512K and 2M. The current CIR demand is the demand within CIR (i.e., minimum between current CIR and current demand), which is 512K, and the current MIR demand is the demand within MIR (i.e., minimum between current MIR and current demand), which is 1M. In this example, the aggregate demand within CIR is 2M and the aggregate demand within MIR is 3.5M for the three SSPCs of DP11 (2102).

VR Current CIR Demand [12] —The VR current CIR demand is spread into twelve demand brackets and reported as a vector of twelve entries. The demand brackets are used to express demand while accounting for cost, and allow the algorithm to allocate capacity in the same manner as the QoS engine.

VR Current MIR Demand [12] —The VR current MIR demand is spread into twelve demand brackets and reported as a vector of twelve entries.

VR Current Allocation—The actual allocation for a VR in the iNet tree during the interval of 1 second that just ended. The aggregate of all current VR allocations is used in this algorithm to report as the current usage for a GSP node in an iNet. Note that actual VR usage may differ slightly from the VR allocation and could also be used for the algorithm.

iNet Current CIR Demand [16][12] —The aggregated CIR demand from all VRs for a PTA node in an iNet. The CIR demand is reported as a 16×12 matrix corresponding to sixteen priority levels and twelve demand brackets. The SAS QoS enforcer receives one 16×12 matrix per PTA node per iNet.

iNet Current MIR Demand [16][12]—The aggregated MIR demand from all VRs for a PTA node in an iNet. The MIR demand is reported as a 16×12 matrix corresponding to sixteen priority levels and twelve demand brackets. The SAS QoS enforcer receives one 16×12 matrix per PTA node per iNet.

iNet Current Usage—The actual usage for all VRs for a PTA node in the iNet tree during the current interval that just ended. Current usage is reported as a single value.

SAS Current CIR Demand [16][12]—The aggregated CIR demand from all iNets for a PTA node in a SAS. The CIR demand is reported as a 16×12 matrix corresponding to sixteen priority levels and twelve demand brackets. The NOC QoS enforcer receives one 16×12 matrix per PTA node per SAS.

SAS Current MIR Demand [16][12]—The aggregated MIR demand from all iNets for a PTA node in a SAS. The MIR demand is reported as a 16×12 matrix corresponding to sixteen priority levels and twelve demand brackets. The NOC QoS enforcer receives one 16×12 matrix per PTA node per SAS.

SAS Current Usage—The actual usage for the GSP node in the iNet tree or the SAS tree during the current interval (1 second) that just ended. Current usage is reported as a single value and is not split into CIR usage and MIR usage.

Static GSP CIR—The static CIR defined in the group service plan and assigned to a GSP node at the NOC in the global group QoS tree.

Static GSP MIR—The static MIR defined in the group service plan and assigned to a GSP node at the NOC in the global group QoS tree.

Initial Dynamic CIR—The initial dynamic CIR allocated for a GSP node in the iNet tree or the SAS tree when a GSP is initially configured at the NOC.

Initial Dynamic MIR—The initial dynamic MIR allocated for a GSP node in the iNet tree or the SAS tree when a GSP is initially configured at the NOC.

iNet Current Dynamic CIR—The dynamically allocated CIR for a GSP node in the iNet tree or the SAS tree during the current interval that just ended. At the SAS tree, the current dynamic CIR is the dynamically allocated CIR by the NOC to the SAS, to be distributed to the iNets at the SAS.

iNet Current Dynamic MIR—The dynamically allocated MIR for a GSP node in the iNet tree or the SAS tree during the current interval that just ended. At the SAS tree, the current dynamic MIR is the dynamically allocated MIR by the NOC to the SAS, to be distributed to the iNets at the SAS.

iNet Next Dynamic CIR—The dynamically allocated CIR for a GSP node in the iNet tree or the SAS tree to be used during the next interval.

iNet Next Dynamic MIR—The dynamically allocated MIR for a GSP node in the iNet tree or the SAS tree to be used during the next interval.

SAS Current Dynamic CIR—The dynamically allocated CIR for a GSP node in the SAS tree during the current interval that just ended. At the SAS tree, the current dynamic CIR is the dynamically allocated CIR by the NOC to the SAS, to be distributed to the iNets at the SAS.

SAS Current Dynamic MIR—The dynamically allocated MIR for a GSP node in the SAS tree during the current interval that just ended. At the SAS tree, the current dynamic MIR is the dynamically allocated MIR by the NOC to the SAS, to be distributed to the iNets at the SAS.

SAS Next Dynamic CIR—The dynamically allocated CIR for a GSP node in the SAS tree to be used during the next interval.

SAS Next Dynamic MIR—The dynamically allocated MIR for a GSP node in the SAS tree to be used during the next interval.

Figure 22:
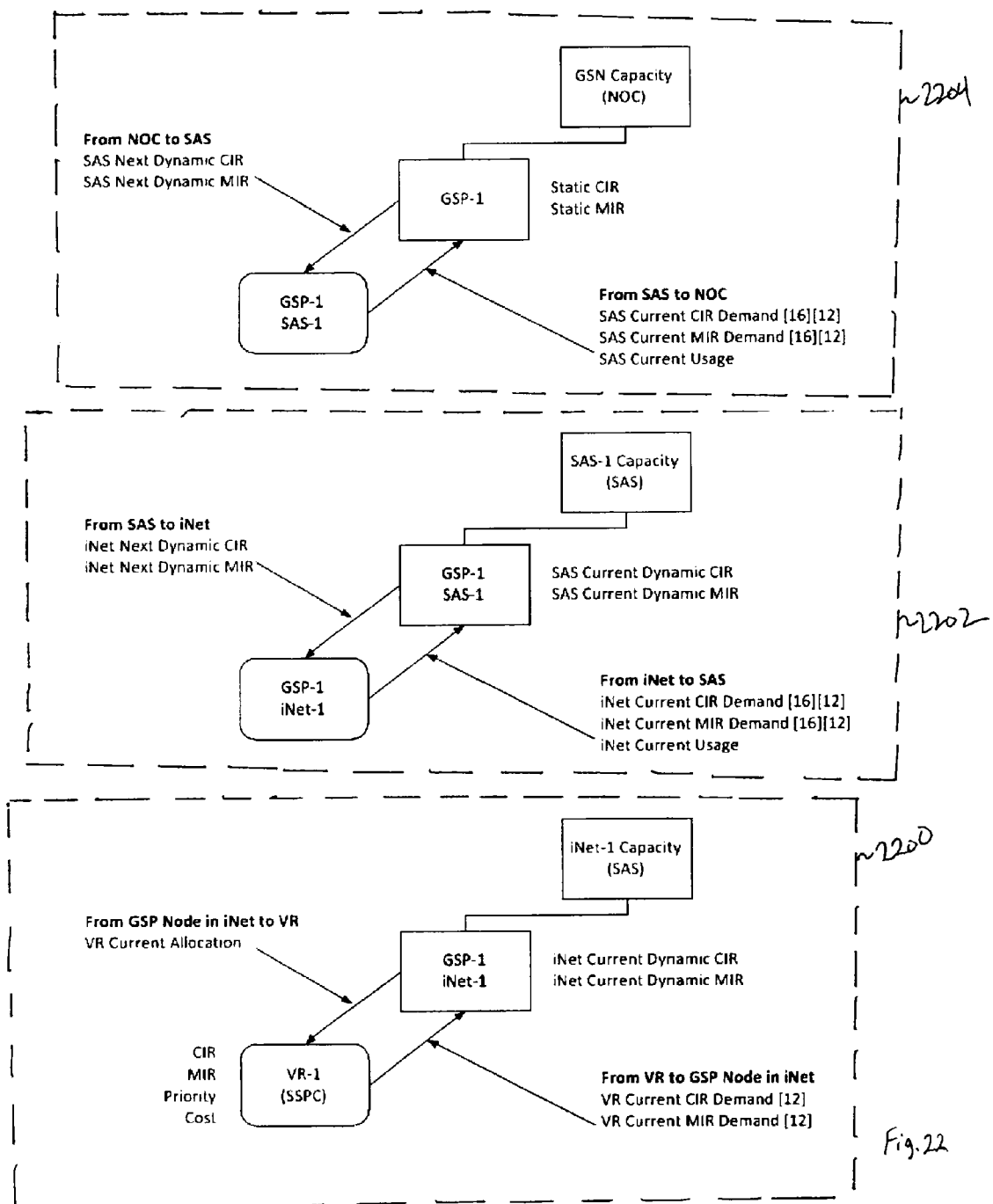
FIG. 22 illustrates an example of the data flow between SSPCs (or VRs) and a GSP node at the iNet, the data flow between the iNets and the SAS, and the data flow between the SAS and the NOC.

FIG. 22 illustrates an embodiment according to the data structures described above and shows the data flow between SSPCs (or VRs) and a GSP node at the iNet (2200), the data flow between the iNets and the SAS (2202) and the data flow between the SAS and the NOC (2204) for the global QoS enforcement of that GSP node.

1.6.1.3 Demand Brackets

According some embodiments, one of the objectives of the Global QoS Enforcer is to make bandwidth allocation across the GSN network behave as if it is done from a single global pool, even though each iNet capacity is a separately managed pool in the GSN network.

The source of traffic demand is the VR, which represents a SSPC. In some embodiments, the VRs have QoS configurations such as priority, cost, CIR and MIR which are used by the iNet GQoS engine to allocate bandwidth to the VR. In further embodiments, the cost parameter associated with the demand from each VR dictates the amount of bandwidth the VR is given in contention relative to other VRs.

One of the challenges of the Global QoS Enforcer algorithm is to factor in the VR cost while aggregating the demand.

Demand brackets allow the aggregation of demand from an iNet while making use of the cost parameter from each VR. As a result, in some embodiments, the configured CIR and MIR for the GSP can be distributed to satisfy the demand of one bracket at a time until the configured CIR and MIR is reached. In this way, the iNet sends to the SAS QoS enforcer the demand from its GSP nodes in demand brackets, which is the aggregate of all VRs' CIR and MIR demand brackets. According to some embodiments, the SAS QoS enforcer receives aggregated demand brackets per GSP per iNet. Similarly, the NOC QoS enforcer receivers aggregated demand brackets per GSP per SAS.

In some embodiments, the NOC QoS enforcer distributes the configured CIR and MIR for the GSP to satisfy the demand of one bracket at a time until the configured CIR and MIR is reached. In further embodiments, this process is repeated at the SAS where the dynamic CIR and MIR are distributed one bracket at a time until the current dynamic CIR and MIR is reached.

Express CIR and MIR Demand in Twelve Brackets to Factor in VR Cost

According to some embodiments, the brackets are designed with an exponential scale to limit the number of brackets to twelve. FIG. 23A illustrates an embodiment of a demand bracket. The first bracket b0 is used to allocate a minimum CIR and MIR to every VR, regardless of cost. In this example, the minimum is set to 1 Ksps. Brackets b1 through b11 use an exponential scale starting from b1 at 4 Ksps to b11 at 4 Msps. This allows demand of up to 8 Msps for a VR (i.e., the total demand is the sum of the demand of all brackets, which is 4M+2M+1M+512K+256K, etc. for a total of 8M). The CIR and MIR demand of the VR is then split into these brackets while using the configured cost to calculate each bracket's demand portion.

FIG. 23B illustrates an example of how demand brackets demand brackets are shaped for two VRs according to a cost. The VRs have 200 Ksps CIR demand each, where VR1 has a cost of 1.0 and VR2 has a cost of 0.25.

As shown, except for bracket b0, VR2 bracket demand is four times more than VR1 bracket demand. This allows for VR2 to get four times more allocated bandwidth than VR1. Particularly, the demand bracket for VR1 illustrates that for a cost=1.0, the demand of 200 Ksps is satisfied at b6 (i.e., 1+4+8+16+32+64+75=200). The demand bracket for VR2 illustrates that for a cost of 0.25, the demand of 200 Ksps is satisfied at b4 (i.e., 1+16+32+64+87=200).

Add VR Demand by Priority to Aggregate for iNet

FIG. 24A illustrates an example of CIR demand from multiple VRs under a GSP in an iNet with different costs and priorities and the conversion into a VR CIR demand vector for each VR. Each row in the table of FIG. 24A represents a demand bracket generated according to the cost and demand specified for each row. FIG. 24B shows and example of an iNet1 CIR demand matrix which is the result of aggregating the VR CIR demand by priority for all the VRs in FIG. 24B. For example, for priority 2 at b1, the aggregated demand is 16+4+8=28. As illustrated in FIG. 24B, the number of priorities is 16. Accordingly, since the demand from each VR of FIG. 24A is only up to priority 3, the entries of the demand matrix from priority 4 to priority 16 are treated as 0. In some embodiments, each iNet receives a demand matrix (FIG. 24B) that aggregates the demand according to priority of each VR in the service area of the iNet.

Add iNet Demand by Priority to Aggregate for SAS

According to some embodiments, the SAS receives one matrix per GSP node per iNet. In the example of FIG. 24B, the GSP node exists in two iNets. The SAS demand bracket by priority is the aggregate of iNet1 and iNet2 demand priority matrices for the GSP node.

Add SAS Demand by Priority to Aggregate for NOC

According to some embodiments, the NOC receives GSP aggregate demand brackets by SAS which then forms the NOC demand by priority matrix. For example, if the GSP node of the above example exists in three SASs then the NOC receives three GSP PTA demand matrices, one for each SAS.

As mentioned above, in some embodiments, the demand aggregation points are: the GSP PTA node at the iNet, the GSP PTA node at the SAS, and the GSP PTA node at the NOC. According to some embodiments, the dynamic adjustments of CIR and MIR are done by the NOC to all SASs, the dynamic adjustments of the iNets are done by the SAS and the iNets use their current dynamic CIR and MIR for allocating capacity to the VRs.

In some embodiments, if there is congestion for a GSP node in an iNet, bandwidth allocated to the GSP node cannot be consumed and the system distributes this bandwidth to the GSP nodes in other iNets where there is no congestion. In order to achieve this, when sending aggregated demand, each level of the hierarchy is also sending, in some embodiments, the used bandwidth of the previous round which is referred to as 'usage'.

In further embodiments, after the aggregated demand brackets and usage are received at the NOC, the dynamic adjustments and VR bandwidth allocation are performed.

FIG. 25 illustrates an embodiment of dynamically changing CIR/MIR in a GSN according to a static CIR/MIR associated with a group service plan (i.e., GSP-1). Particularly, FIG. 25 illustrates how the capacity specified for a group service plan, which is represented as a single node in each of the global, SAS, and iNet trees), is being managed between the NOC, SAS, iNets and VRs of the terminals.

For example, the NOC 2500 is in communication with SAS-1 (2502), SAS-2 (2504), and SAS-3 (2506). SAS-1 (2502) includes iNets 2508 and 2510, SAS-2 (2504) includes iNet 2512, and SAS-3 (2506) includes iNet 2514. An iNet manages the capacity of a channel on satellite. All iNets associated with the satellite are generally managed from one SAS. The satellite may also be designed to have some channels visible in one location on the ground and others visible in a different location. In such a case, there would be a SAS associated with each of those locations and managing the iNets that have associated channels visible at those locations.

iNet 2508 has terminal 2516 in the service area of iNet 2508, iNet 2510 has terminal 2518 in the service area of iNet 2510, iNet 2512 has terminal 2520 in the service area of iNet 2512, and iNet 2514 has terminal 2522 in the service area of iNet 2514. Furthermore, terminal 2516 includes virtual remotes VR-1 to VR-20, terminal 2518 includes virtual remotes VR-30 to VR-40, terminal 2520 has virtual remotes VR-50 to VR-60, and terminal 2522 has virtual remotes VR-70 to VR-80.

As an example, each virtual remote (VR) is associated with a different service and/or priority. For example, VR-1 may be a voice plan for terminal 2516, and VR-2 may be a data plan for 2518. Each VR in FIG. 25 has a demand that is reported up to a corresponding iNet. For example, demand brackets are generated for VR-1 to VR-20 as illustrated in FIG. 24A. Furthermore, after the demand brackets are generated, the demand for VR-1 to VR-20 is aggregated and reported as a demand matrix to iNet 2508. In this regard, the demand matrix illustrated in FIG. 24B may be reported to iNet 2508. Similarly the demand matrix for iNet 2508 is aggregated with the demand matrix of iNet 2510 and reported to SAS-1 (2502) as another demand matrix. Additionally the usage of iNet 2508 and iNet 2510 is reported to SAS-1 (2502), which is aggregated to become the usage of SAS-1 (2502). Similarly, the demand matrix for SAS-1 (2502), SAS-2 (2504), and SAS-3 (2506) are aggregated and reported as another demand matrix to the NOC 2500. Additionally, the usage for each of SAS-1 (2502), SAS-2 (2504), and SAS-3 (2506) is reported to NOC 2500.

The NOC 2500, to maintain the static CIR/MIR of GSP-1, provides a dynamic CIR/MIR to each of SAS-1 (2502), SAS-2 (2504), and SAS-3 (2506) according to the aggregated demand matrix received at the NOC 2500 and the usage reported by each SAS. Similarly, after SAS-1 (2502) receives the dynamic CIR/MIR from the NOC 2500, SAS-1 (2502) provide a dynamic CIR/MIR to each of iNet 2508 and iNet 2510 according to the aggregated demand matrix received at SAS-1 (2502). Similarly, after iNets 2508 and 2510 receive their respective dynamic CIR/MIR, iNets 2508 and 2510 accordingly provide an allocation to each VR included in terminals 2516 and 2518, respectively. A similar process is performed at SAS-2 (2504) and SAS-3 (2506) and at corresponding iNets and terminals.

1.6.1.4 Initialization Algorithm

According to some embodiments, when a GSP is configured at the NOC, an initialization algorithm distributes the configured static CIR and static MIR uniformly across all iNets within the Geographic Scope of the GSP. For example, the GSP node in each iNet in the scope of the GSP gets allocated an initial dynamic CIR and initial dynamic MIR. Each SAS gets allocated an initial dynamic CIR and initial dynamic MIR equal to the aggregate of the initial allocations to the iNets within the SAS.

In some embodiments, the input to the initialization algorithm includes:

Static GSP CIR
Static GSP MIR

Figure 26:
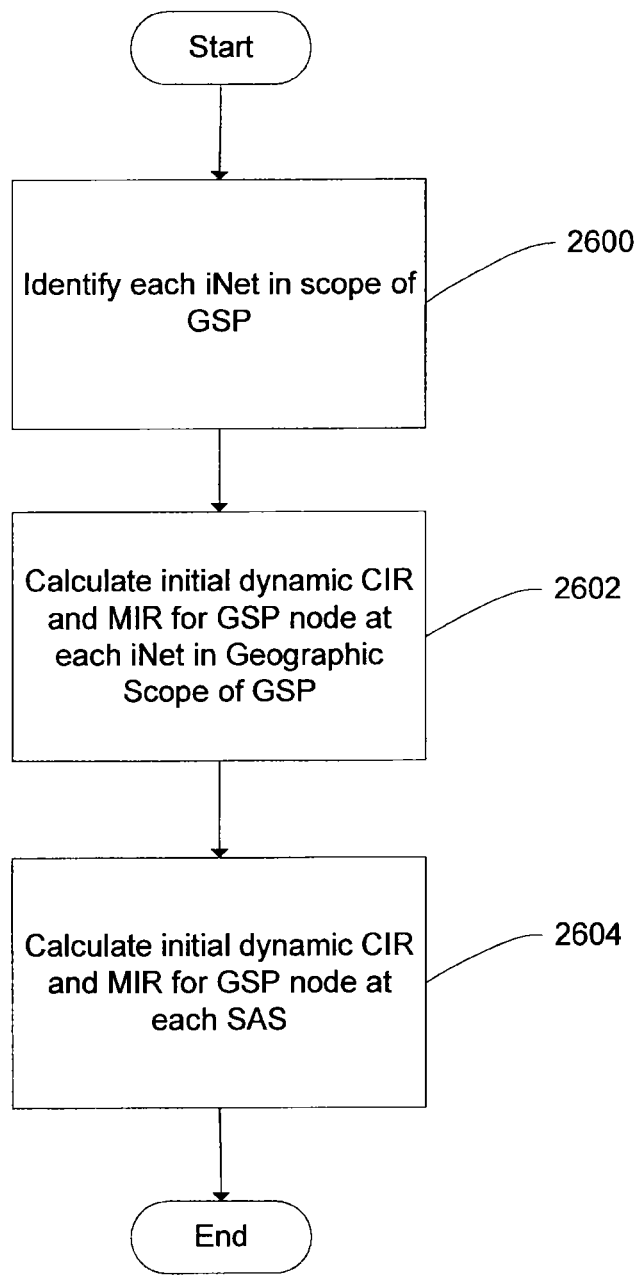
FIG. 26 illustrates an exemplary embodiment of an initialization process.

In further embodiments, the output of the initialization algorithm includes:
  Initial dynamic CIR for GSP node at each SAS and iNet
  Initial dynamic MIR for GSP node at each SAS and iNet FIG. 26 illustrates an example embodiment of the initialization algorithm. According to some embodiments, the initialization algorithm is performed at the NOC. In further embodiments, the process illustrated in FIG. 26 is performed for each GSP node during system initialization or for a newly configured GSP node. As an example, referring to FIG. 4, nodes 402, 404, and 414 represent different GSP nodes. Accordingly, the algorithm illustrated in FIG. 26 is performed for nodes 402, 404, and 414.

The process illustrated in FIG. 26 starts at, in some embodiments, 2600 to identify each iNet within the geographic scope of a GSP. For example, for GSP-1 illustrated in FIG. 25, iNets 2508, 2510, 2512, and 2514 are identified as the iNets within the geographic scope of GSP-1. Process flow proceeds from 2600 to 2602 to calculate an initial dynamic CIR and MIR for the GSP node at each iNet in the geographic scope of the GSP. According to some embodiments, calculating the initial dynamic CIR and MIR for each iNet within the geographic scope of the GSP is performed as follows:

Calculate initial dynamic CIR and MIR for GSP node at each iNet in Geographic Scope
  N=number of iNets in the Geographic Scope of GSP
  For each iNet:
    If (iNet is in the Geographic Scope of GSP), then
      Initial Dynamic CIR=Static GSP CIR/N
      Initial Dynamic MIR=Static GSP MIR/N
    Else
      Initial Dynamic CIR=0
      Initial Dynamic MIR=0

As an example, referring to FIG. 25, there are four iNets (2508, 2510, 2512, and 2514). If the static CIR and MIR for the GSP of FIG. 25 is 50 k and 80 k, respectively, the initial dynamic CIR for each iNet is 12.5K, and the initial dynamic MIR for each iNet is 20K.

Process flow proceeds from 2602 to 2604 to calculate an initial dynamic CIR and MIR for the GSP node for each SAS, which is performed, in some embodiments, as follows:

Calculate initial dynamic CIR and MIR for GSP node at each SAS
  For each SAS:
    Initial Dynamic CIR=Initial Dynamic CIR for all iNets in SAS
    Initial Dynamic MIR=Initial Dynamic MIR for all iNets in SAS For example, referring to FIG. 25, if the initial dynamic CIR for iNet 2508 and iNet 2510 is 12.5K each, the initial dynamic CIR for SAS-2 (2502) is 25K. Similarly, if the initial dynamic MIR for iNet 2508 and iNet 2510 is 20K each, the initial dynamic CIR for SAS-2 (2502) is 40K.

In some embodiments, the process illustrated in FIG. 26 ends at 2604.

1.6.1.5 Dynamic Adjustment of PTA Nodes
1.6.1.5.1 iNet Global QoS Enforcer Algorithm According to some embodiments, the functionality of the Global QoS Enforcer algorithm at the iNet consists of collecting aggregate demand and usage for PTA nodes.

In some embodiments, the VR generates demand ten times per second for the downstream direction and eight times per second for the upstream direction. In further embodiments, the iNet algorithm takes an average of the demand for the second that just ended to calculate the VR demand.

In some embodiments, the VR demand is used to compute the CIR demand and MIR demand based on the VR configured CIR and MIR. As discussed above, a terminal has one or multiple VRs. In some embodiments, each VR is a service plan with QoS parameters. For example, a terminal may have a data service plan with a 1M CIR (i.e., configured CIR) and 2M MIR (i.e., configured MIR) and a voice plan with a 128K CIR and 128K MIR.

In some embodiments, the algorithm breaks the CIR demand and MIR demand down into vectors of twelve entries corresponding to the twelve brackets. This is done to account for VR cost.

In further embodiments, the CIR demand and MIR demand brackets are then aggregated from all VRs by priority to produce a CIR demand and an MIR demand matrix of 16 priorities×12 brackets for their GSP PTA parent node.

In additional embodiments, the usage of all VRs for the PTA node is also calculated by aggregating the average allocation to all VRs over the current interval. In some embodiments, this algorithm runs every 1 second.

Figure 27A:
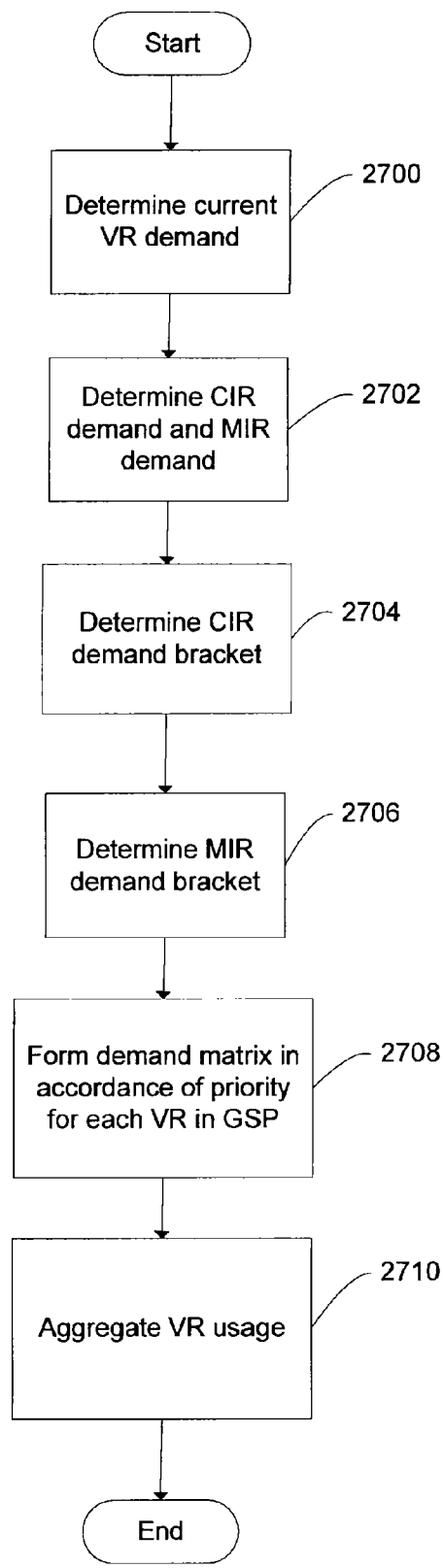
FIG. 27A illustrates an exemplary embodiment of a process for generating demand brackets.

According to some embodiments, input to the iNet QoS enforcer algorithm includes:
  VR current demand from each VR averaged over current interval
  VR current allocation from each VR averaged over current interval
  CIR of each VR
  MIR of each VR
  Priority of each VR
  Cost of each VR In some embodiments, parameters calculated by iNet QoS enforcer algorithm:
  CIR demand
  MIR demand
  VR current CIR demand [12] for each VR
  VR current MIR demand [12] for each VR In further embodiments, output of the iNet QoS enforcer algorithm:
  iNet current CIR demand [16][12] of PTA node
  iNet current MIR demand [16][12] of PTA node
  iNet current usage of PTA node FIG. 27A illustrates an example process for generating demand brackets. According to some embodiments, the process illustrated in FIG. 27 is performed for each VR associated with a particular GSP. For example, process illustrated in FIG. 27 is performed for VR 1-80 illustrated in FIG. 25.

According to some embodiments, the process illustrated in FIG. 27 starts at 2700 to determine the current VR demand for each VR associated with a GSP. Once the demand for each VR is determined, process flow proceeds to 2702 to determine the CIR demand and MIR demand for each VR. According to some embodiments, the CIR demand and MIR demand for each VR is determined as follows:

Calculate CIR demand & MIR demand
  CIR Demand=MM (VR Current Demand, CIR of VR)
  MIR Demand=Min (VR Current Demand, MIR of VR)

In the above equations, CIR of VR and MIR of a VR represent the current CIR and MIR, respectively, for a particular VR. As an example, a GSP PTA node with 20 subscriber service plan components (SSPCs) will result in 20 VRs. Each VR inherits the SSPC QoS configuration. This results in having VRs with varying priority and cost configuration.

Figure 27B:
FIG. 27B illustrates an exemplary embodiment of determining the VR CIR demand & MIR demand.

FIG. 27B illustrates how VR demand and the formula provided above are used to derive the VR CIR demand and MIR demand. For example, VR 1 has a current demand of 400, a dynamic CIR of 256, and a dynamic MIR 512. Accordingly, based on the above equations, the CIR demand and MIR demand for VR 1 is 256 and 400, respectively.

Process flow proceeds from 2702 to 2704 to determine the CIR demand bracket. According to some embodiments, the CIR demand bracket is determined as follows:
Break the CIR demand into 12 brackets by cost
  b=0
  VR Current CIR Demand [b]=Bracket Size [b]
  CIR Demand=CIR Demand−Bracket Size [b] (allow for min CIR)
  While (CIR Demand>0)
   Increment b
   Allocation Size=(Bracket Size [b])/Cost of VR
   Add Min (CIR Demand, Allocation Size) to VR Current CIR
   Demand [b]
    CIR Demand=CIR Demand—VR Current CIR Demand [b]

As an example, the demand brackets illustrated in FIG. 23B are generated according to the above illustrated process.

Process flow proceeds from 2704 to 2706 to determine the MIR demand bracket. According to some embodiments, the MIR demand bracket is determined as follows:
Break down MIR demand into 12 brackets by cost
  b=0
  VR Current MIR Demand [b]=Bracket Size [b] (allow for min MIR)
  MIR Demand=MIR Demand—Bracket Size [b]
  While (MIR Demand>0)
   Increment b
   Allocation Size=(Bracket Size [b])/Cost of VR
   Add Min (MIR Demand, Allocation Size) to VR Current MIR
   Demand [b]
    MIR Demand=MIR Demand—VR Current MIR Demand [b]

Figure 27C:
FIG. 27C illustrates an exemplary embodiment of a CIR demand vector

As an example, the demand brackets illustrated in FIG. 23B are generated according to the above illustrated process. FIG. 27C illustrates further examples of how the CIR demand for the example provided is formed into the VRs CIR demand vector of twelve brackets while factoring in the cost of each VR.

Process flow proceeds from 2706 to 2708 to form a demand matrix in accordance with the priority associated with each VR in the GSP. According to some embodiments, forming the demand matrix is performed as follows:
Calculate aggregate demand for the GSP node by priority by adding VRs demand brackets
  For b=0 to 11:
   Add VR Current CIR Demand [b] to iNet Current CIR Demand [VR Priority][b]
   Add VR Current MIR Demand [b] to iNet Current MIR Demand [VR Priority][b]

Figure 27D:
FIG. 27D illustrates an exemplary embodiment of a CIR demand matrix

FIG. 27D illustrates an example demand matrix formed in accordance with the above illustrated process. For example, the first table is the VR CIR demand vector, which is used to aggregate all VRs by priority to compute the GSP parent node CIR demand matrix at the iNet level. The MIR demand matrix is formed in a similar fashion. The example illustrated in FIG. 27D shows only four priorities; however, the iNet demand matrix has, in some embodiments, sixteen priorities.

Process flow proceeds from 2708 to 2710 to aggregate the VR usage to the iNet current usage, which is performed, in some embodiments, as follows:
Add VR usage to aggregate for the GSP node in the iNet
  Add Current VR Allocation to iNet Current Usage
  As an example, referring to FIG. 25, the current demand of VR 1-20 is added to the iNet current usage of iNet 2508.

1.6.1.5.2 SAS QoS Enforcer Algorithm

According to some embodiments, the Global QoS Enforcer algorithm at the SAS receives the current CIR demand and current MIR demand for each GSP PTA node of each iNet as 16×12 matrices with priorities as rows and brackets as columns. As an example, referring to FIG. 25, SAS-1 receives a demand matrix from iNet 2508 and iNet 2510.

In some embodiments, the Global QoS Enforcer adds all iNet current CIR demand matrices to generate the SAS current CIR demand as a 16×12 matrix and adds all of the iNet current MIR demand matrices to generate the SAS current MIR demand as a 16×12 matrix for a GSP PTA node.

In further embodiments, the algorithm then goes through the entries in the CIR matrix, starting with the highest priority and lowest bracket and adds them until it reaches the SAS current dynamic CIR.

For example, if the SAS current dynamic CIR is reached at [p3, b7] (i.e., priority 3, bracket 7), all iNets get their allocation for all brackets of p1 and p2 and up to bracket 7 of p3. The same method is used for distributing the SAS current dynamic MIR to all iNets.

According to some embodiments, if there is capacity left after demand is satisfied by the SAS current dynamic CIR all the way down to the lowest priority p16 and highest bracket b12, then the remaining capacity is allocated to the iNets proportionally to their iNet current CIR demand so that the aggregate dynamic CIR of all iNets is equal to the SAS current dynamic CIR. The same method is used for distributing the SAS current dynamic MIR to all iNets.

In some embodiments, the SAS QoS enforcer algorithm adjusts demand matrices to enforce per-beam limits. As an example, this is achieved by clipping iNet demand if the demand exceeds the per-beam limit capacity specified in the GSP. A beam may have multiple iNets which may also include HCP supplementing the beam coverage.

The current usage data from each iNet for the PTA node allows the algorithm to determine the iNets where the GSP node is experiencing congestion in order to redistribute the equivalent capacity of the unsatisfied demand, caused by congestion, to other iNets where the GSP node is not congested. This algorithm runs every 1 second.

According to some embodiments, the input to the SAS QoS enforcer algorithm includes:
  iNet current CIR demand [16][12] of PTA node from each iNet at SAS
  iNet current MIR demand [16][12] of PTA node from each iNet at SAS
  iNet current usage of PTA node from each iNet at SAS
  iNet current dynamic CIR for each GSP node at each iNet
  iNet current dynamic MIR for each GSP node at each iNet
  SAS current dynamic CIR for each GSP node at SAS (to be distributed to all iNets at SAS)
  SAS current dynamic MIR for each GSP node at SAS (to be distributed to all iNets at SAS)

According to some embodiments, the parameters calculated by SAS algorithm include:
  SAS current CIR demand [16][12] of PTA node
  SAS current MIR demand [16][12] of PTA node
  SAS current usage of PTA node According to some embodiments, the output generated by the SAS algorithm includes:
  iNet next dynamic CIR for each GSP node (PTA and non-PTA node) at each iNet
  iNet next dynamic MIR for each GSP node (PTA and non-PTA node) at each iNet FIG. 28A illustrates an example process for implementing the SAS QoS enforcer algorithm. As an example, the process illustrated in FIG. 28A is performed at SAS-1 (2502), SAS-2 (2504), and SAS-3 (2506) in FIG. 25.

According to some embodiments, the process illustrated in FIG. 28A starts at 2800 to enforce a per-beam limit. As an example, the per-beam limit is implemented by clipping the aggregated demand of nodes specified with the per-beam limit so that the total demand is not more than the beam limit.

FIGS. 28B(1) and 28B(2) illustrate an example of how the beam limit is enforced. In this scenario, Beam-1 has two iNets (iNet-1 and iNet-2) and GSP-1 has a CIR beam limit of 5 Msps. The first table shows the cumulative CIR demand for the beam through the brackets. The second table shows the cumulative CIR demand through the brackets truncated at the beam limit. The beam limit of 5 Msps is reached at bracket [p3, b2]. The algorithm reduces the CIR demand of [p3, b2] in each iNet proportionally to their demand so that the cumulative total at [p3, b2] is 5 Msps and sets the demand for all brackets beyond [p3, b2] to zero. The CIR demand matrices for iNet-1 and iNet-2 adjusted to enforce the beam limit are then used as input to the SAS enforcer.

Process flow proceeds from 2800 to 2802 calculate the current CIR demand matrix for the SAS. According to some embodiments, the demand matrix of the SAS is determined as follows:
Calculate SAS current CIR demand matrix of 16×12
SAS Current CIR Demand [16][12]=iNet=ΣCurrent CIR Demand [16][12] As illustrated above, the SAS current CIR demand matrix for each GSP PTA node is calculated by adding demand matrices of all iNets. FIG. 28C illustrates an example SAS demand matrix generated by adding the demand matrices of iNet-1, iNet-2, and iNet-3.

Process flow proceeds from 2802 to 2804 to determine how much of the SAS demand matrix can be allocated, which is determined in some embodiments, as follows:
Determine to what point (p, b) the SAS GSP PTA node demand matrix can be satisfied For each GSP PTA node in the SAS:
Unadjusted iNet Next Dynamic CIR=0
Remaining Allocation=SAS Current Dynamic CIR

```
For p = 0 to 15
    For b = 0 to 11
        If (Remaining Allocation > SAS Current CIR Demand [p][b]),
        then
            For all iNets in SAS
                Add iNet Current CIR Demand [p][b] to Unadjusted
                    iNet Next Dynamic CIR
                Remaining Allocation = Remaining Allocation - SAS
                    Current CIR Demand [p][b]
        Else
            Distribute Remaining Allocation proportionally to iNet
                Current CIR Demand [p][b]
            Remaining Allocation = 0
```

The above process takes the aggregated iNet CIR demand matrix of the GSP PTA node and determines how much of the demand can be satisfied by the SAS current dynamic CIR. While doing so, it calculates the unadjusted next iNet dynamic CIR for the GSP node.

In this regard, the next dynamic CIR calculated here is referred to as unadjusted, since in the next step depending on the iNet congestion, the algorithm may be tuning this CIR to calculate the next dynamic CIR for the PTA node.

As an example, FIG. 28D illustrates a demand matrix for SAS-1. In this example, SAS-1 has a dynamic CIR of 5 MSps, and a demand of 13.320 Msps. In this regard, the cumulative result of each entry in the SAS demand matrix is 13.320 Msps. For example, in the cumulative demand matrix of FIG. 28D, [p 1, b1] is determined by adding [p 1, b0] (i.e., 7) to [p1, b1] (i.e., 48) to get a cumulative value of 55. The process is repeated for each entry in the cumulative demand matrix. The current CIR of 5 Msps will result in satisfying the CIR demand up to bracket [p2, b6] as illustrated in FIG. 28D. Particularly, the cumulative demand matrix illustrated in FIG. 28D has a value of 4998 Ksps at bracket [p2, b6].

The [p2, b6] point in the matrix indicates that for each iNet, dynamic CIR allocation is done for brackets up to [p2, b6] as shown in FIG. 28E. As illustrated FIG. 28E:
iNet-1:
Total demand=5,532 Ksps
Dynamic CIR for next period=2,405 Ksps
iNet-2:
Total demand=4,336 Ksps
Dynamic CIR for next period=1,537 Ksps
iNet-3:
Total demand=3,452 Ksps
Dynamic CIR for next period=1,056 Ksps
Particularly, the cumulative demand up to bracket [p2, b6] for iNet-1 is 2.45 Ksps while the total cumulative demand is 5,532 Ksps. Accordingly, the dynamic CIR for iNet-1 for the next period is 2,405, Ksps. The dynamic CIR for iNet-2 and iNet-3 for the next period is determined in a similar fashion. These determined dynamic CIRs do not take into account network congestions, and therefore, are unadjusted dynamic CIRs.

Process flow proceeds from 2804 to 2806 to distribute the remaining portion of the SAS current dynamic CIR, which is performed, in some embodiments, as follows:
If there is still capacity left after going through the SAS current CIR demand matrix, then distribute the remaining portion of the SAS current dynamic CIR across all iNets proportionally to their demand so that the sum of all unadjusted iNet next dynamic CIRs is equal to the SAS current dynamic CIR.
For all iNets in SAS:
Add portion of remaining allocation to unadjusted iNet next dynamic CIR.

Process flow proceeds from 2806 to 2808 to distribute the remaining portion of the SAS dynamic MIR. As an example, the process above is repeated to calculate the unadjusted iNet next dynamic MIR for all iNets. Process flow proceeds from 2808 to 2810 to calculate the aggregate unused CIR capacity due to iNet congestion. According to some embodiments, calculating the aggregate unused CIR capacity due to iNet congestion is determined as follows:
Calculate aggregate unused CIR capacity due to iNet congestion
For each iNet in the geographic scope of the GSP:
Total Current CIR Demand=Σall entries in iNet Current CIR Demand
[16][12] matrix
If ((Total Current CIR Demand>iNet Current Dynamic CIR) & (iNet Current Usage<iNet Current Dynamic CIR)), then
There is congestion for the GSP node at the iNet.
Set Congestion Flag for iNet.
Unused iNet Capacity=iNet Current Dynamic CIR−iNet Current Usage.
Add Unused iNet Capacity to Aggregate Unused Capacity.

In the above process, when there is iNet congestion, the unused capacity is calculated and redistributed to other iNets during the next round. As an example, if the iNet current dynamic CIR is 2.5 Msps, and the iNet current usage is only 1.5 Msps, then the unused iNet capacity is 1 Msps. The Aggregate Unused Capacity is the sum of unused capacity at each iNet for the SAS. In some embodiments, the assumption is that the level of congestion is unlikely to change drastically from one second to the next and the decision for the next second can be based on data from the previous second. A percentage of the amount of unused capacity due to iNet congestion can be redistributed to other iNets where there is no congestion. The percentage factor can be a configurable parameter.

In further embodiments, a configurable percentage "x" (default 100%) of the redistributed capacity may be used. For example, the aggregate unused capacity is determined as:
Aggregate Unused Capacity=Aggregate Unused Capacity*x.

Process flow proceeds from 2810 to 2812 to determine the unused MIR capacity due to iNet congestions. According to some embodiments, the process described above to determine the CIR unused capacity at 2810 is repeated at 2812 using the iNet MIR demand matrices instead of the iNet CIR demand matrices.

Process flow proceeds from 2812 to 2814 to redistribute the aggregate unused CIR capacity to iNets that are not congested. According to some embodiments, redistributing the aggregate unused capacity is performed as follows:
Redistribute aggregate unused CIR capacity to iNets that are not congested
For each iNet PTA node in the Geographic Scope of the GSP:
    If (Congestion Flag Not Set), then
      iNet Next Dynamic CIR=Unadjusted iNet Next Dynamic CIR+iNet Dynamic CIR Adjustment
      Redistribute unused capacity from iNets that are congested to iNets that are not congested. The iNet dynamic CIR adjustment is calculated by continuing to go through the demand matrix from the exit point (p, b) of the first allocation loop of unadjusted iNet next dynamic CIR until the aggregate unused capacity is distributed.
    If (Congestion Flag Set), then
      A configurable percentage reduction "y" (default 0%) in the Dynamic CIR can be used.
      iNet Next Dynamic CIR=Unadjusted iNet Dynamic CIR*(1−y)

As illustrated above, when the congestion flag for an iNet is not set, the unused capacity is redistributed from iNets in contention to iNets that are not congested.

Process flow proceeds from 2814 to 2816 to redistribute the aggregate unused MIR capacity to iNets that are not congested. According to some embodiments, the process described above to redistribute the unused CIR capacity at 2814 is repeated at 2816 using the unused MIR capacity instead of the unused CIR capacity. Process flow proceeds from 2816 to 2818 to calculate the PTA node next dynamic CIR and next dynamic MIR for all iNets, which is performed, in some embodiments, as follows:
Calculate PTA node next dynamic CIR & next dynamic MIR for all iNets
    A Minimum Dynamic CIR and Minimum Dynamic MIR may be given to each iNet even if there is no demand to allow ramp up in case a terminal shows up. This minimum will most likely not be used. Therefore the Dynamic CIR and Dynamic MIR given to iNets as a minimum capacity will not be debited from the SAS Dynamic CIR and SAS Dynamic MIR. It will be in addition to the SAS Dynamic CIR and SAS Dynamic MIR for the GSP node that is distributed to the iNets where the GSP node currently has demand.
    If (Minimum Dynamic CIR>Calculated Dynamic CIR)
      Next Dynamic CIR=Minimum Dynamic CIR
    Else
      Next Dynamic CIR=Calculated Dynamic CIR 1.6.1.5.3 NOC QoS Enforcer Algorithm According to some embodiments, the Global QoS Enforcer algorithm at the NOC receives the SAS current CIR demand and SAS current MIR demand 16×12 matrices for each PTA node from each SAS and distributes the static CIR and static MIR configured for that GSP node in the NOC to the corresponding GSP node at each SAS. In further embodiments, the SAS current usage data from each SAS for the PTA node allows the algorithm to determine if a SAS is experiencing congestion for that GSP node, in order to redistribute the equivalent of the unused capacity due to congestion to other SASs, where the GSP node is not experiencing congestion. In some embodiments, this algorithm runs every 5 seconds.

According to some embodiments, if demand can be satisfied by the NOC static CIR all the way down to the lowest priority p16 and highest bracket b12, the remaining capacity is allocated to the SASs proportionally to their SAS current CIR demand so that the aggregate dynamic CIR of all SASs is equal to the NOC static CIR. The same method is used for distributing the NOC static MIR to the SASs.

In some embodiments, the current usage data from each SAS for the PTA node allows the algorithm to detect congestion at the SAS level in order to redistribute the equivalent capacity of the unsatisfied demand, due to congestion, to other SASs where the GSP node is not congested while allowing ramping up in the congested SAS. A use case for this scenario is a GSP with presence in two beams, one beam in each satellite (and SAS). If one beam is congested, the algorithm redistributes the equivalent of the unsatisfied demand to the other beam, which in this scenario is in the other satellite (and SAS).

According to some embodiments, the input to the NOC QoS Enforcer algorithm includes:
    SAS current CIR demand [16][12] of PTA node from each SAS
    SAS current MIR demand [16][12] of PTA node from each SAS
    SAS current usage of PTA node from each SAS
    SAS current dynamic CIR for each GSP node at SAS
    SAS current dynamic MIR for each GSP node at SAS
    Static CIR for each GSP node at NOC (to be distributed to the SASs)
    Static MIR for each GSP node at NOC (to be distributed to the SASs)

According to some embodiments, the parameters calculated by NOC QoS Enforcer algorithm include:
    NOC current CIR demand [16][12] of PTA node
    NOC current MIR demand [16][12] of PTA node
    NOC current usage of PTA node According to some embodiments, the output to of the NOC QoS Enforcer algorithm includes:
    SAS next dynamic CIR for each GSP node (PTA and non-PTA node) at each SAS
    SAS next dynamic MIR for each GSP node (PTA and non-PTA node) at each SAS According to some embodiments, the NOC QoS Enforcer algorithm is the same as the SAS QoS enforcer algorithm illustrated in FIGS. 28B(1) and 28B(2) performed at the NOC level. In some embodiments, this algorithm runs every five seconds.

1.6.1.6 Dynamic Adjustment of Non-PTA Nodes

According to some embodiments, for a non-PTA node, the SAS current dynamic CIR is distributed to the corresponding node in each of the iNets, proportionally to the aggregate iNet next dynamic CIR allocation of all children nodes. In some embodiments, the same scheme is used for the iNet next dynamic MIR of non-PTA nodes.

According to some embodiments, the dynamic adjustment of non-PTA nodes is performed as follows:

For each non-PTA node:
Calculate SAS aggregate current dynamic CIR of all children in SAS tree CIR Ratio=SAS Current Dynamic CIR of Non-PTA Node/SAS Aggregate Current Dynamic CIR of Children in SAS Tree
Calculate SAS aggregate current dynamic MIR of all children in SAS tree MIR Ratio=SAS Current Dynamic MIR of Non-PTA Node/SAS Aggregate Current Dynamic MIR of Children in SAS Tree
For each iNet:
Calculate iNet aggregate next dynamic CIR of all children in iNet tree
iNet Next Dynamic CIR=iNet Aggregate Next Dynamic CIR*CIR Ratio
Calculate iNet aggregate next dynamic MIR of all children in iNet tree
iNet Next Dynamic MIR=iNet Aggregate Next Dynamic MIR*MIR Ratio In FIG. 29, the ISPs 2902-2906 are PTA nodes, but the distribution partner 2900 node is a non-PTA node.

In this example, the dynamic MIRs have already been computed for all ISP nodes based on the algorithm described earlier. The adjustment of the MIRs at the GSP nodes at the iNets is done by dividing the global MIR for the node proportionally, based on the sum of the MIRs at the ISP nodes. In this example, iNet-1 (2908) has an aggregate of 4.5 Mbps MIR across the ISP nodes and iNet-2 (2910) has an aggregate of 1.5 Mbps. A proportional distribution of the distribution partner global MIR of 4 Mbps results in 3 Mbps for iNet-1 (i.e., 4.5/6*4) and 1 Mbps (i.e., 1.5/6*4) for iNet-2. The same scheme is used to calculate dynamic CIRs for non-PTA nodes.

1.6.1.7 Last Bracket Allocation—Alternate Method

Ideally, the Global QoS Enforcer would have the same behavior in allocating capacity as the QoS engine. In some situations, this may not be possible, since the GSN is not a single pool. The bracket method of aggregating demand while factoring in priority and cost results in the Global QoS Enforcer behaving exactly as the QoS engine in distributing capacity except for the distribution of the capacity available for the last bracket. While the difference in behavior may not be ideal, the Global QoS Enforcer is still performing its function correctly but may favor some VRs in some corner cases, particularly when the number of VRs with last bracket demand for the GSP is small.

Since the SAS bandwidth manager gets the aggregated demand and has no knowledge of the number of VRs with last bracket demand and the amount of demand from each VR, the behavior of the last bracket allocation is different from the QoS engine behavior. The Global QoS Enforcer distributes the capacity available for the last bracket proportionally to the last bracket demand from each iNet.

An optional implementation is for the SAS to request information from the iNets on the number of VRs with last bracket demand. This request is only sent when the SAS bandwidth manager is allocating the last bracket capacity and determines that the ratio of available last bracket capacity to last bracket demand is in a range that could potentially cause a result that is inconsistent with what QoS engine would allocate. That difference is most significant when the ratio is close to the 50% range. If the ratio is close to 0% or a 100% ranges, the difference in allocation using the two methods is insignificant. The algorithm would then distribute the last bracket capacity proportionally to the number of VRs in each iNet, up to the iNet aggregate last bracket demand, rather than proportionally to the iNet last bracket demand.

FIG. 30 illustrates an embodiment of a hardware configuration 3000 used for the NOC, SAS, iNet, and/or user terminal in which the present embodiments are implemented. Alternatively, other manners of implementing the present embodiments would be understood by one having ordinary skill in the art, and are also included within the scope of the invention. For example, the present embodiments may be implemented using hardware without software, firmware, or combinations of hardware, software, and firmware. The hardware configuration 3000 includes a general purpose computer 3008 including a bus 3022 that connects a display controller 3010, a main memory 3012, a Read Only Memory (ROM) 3014, a disk controller 3020, a general purpose arithmetic processor 3024, and a communication interface 3026. The disk controller 3020 interfaces several computer readable mediums to the bus 3022, such as a hard disk 3016 and a removable media drive 3018. A user may interface with the general purpose computer 3008 via a display 3002, a keyboard 3004, and a pointing device 3006. The display controller 3010 renders images provided to the display 3002.

The communication interface 3026 connects to an antenna 3028 for communication over a satellite network. Thus, the communication interface 3026 includes receivers and transmitters for communication over a satellite network, such as hardware circuit components necessary to up-convert a frequency and/or phase modulated carrier signal to a frequency suitable for RF transmission. As part of a non-limiting group of hardware components, the communication interface 3026 may include a reference frequency source, Digital-to-Analog Converters (DACs), Voltage Controlled Oscillators (VCO), Phase Locked Loops (PLLs) and frequency synchronizers, mixers, analog filters, Low Noise Amplifiers (LNAs), and other hardware components recognized as being used to up-convert a modulated carrier to a frequency suitable for RF transmission.

In operation, the arithmetic processor 3024 retrieves executable instructions stored on the hard disk 3016 and/or the removable media drive 3018, stores the executable instructions to the main memory 3012, and executes the executable instructions from the main memory. Alternatively, the arithmetic processor 3024 may execute instructions directly from the hard disk 3016 and/or the removable media drive 3018 to implement the present invention. As an alternative to the hard disk 3016 and/or the removable media drive 3018, other computer readable storage mediums would be understood by those one having ordinary skill in the art, and are also included in the scope of the invention. Examples of the arithmetic processor 3024 include a general purpose Central Processing Unit (CPU) and a Digital Signal Processor (DSP), for embodiments of the invention based at least in part on the execution of software, and a Field Programmable Gate Array (FPGA) and an Application Specific Integrated Circuit (ASIC), for embodiments of the invention based on hardware without software. Embodiments of the invention may also include both general purpose processors executing software instructions (i.e., CPUs and/or DSPs) as well as FPGAs and/or ASICs.

The embodiments also include a non-transitory computer readable medium that stores a program, which when executed by a computer or processing apparatus, causes the computer or processing apparatus to perform the methods of the embodiments disclosed and suggested above.

Numerous modifications and variations of the present embodiments are possible in light of the above teachings. It is therefore to be understood that within the scope of the appended claims, the invention may be practiced otherwise than as specifically described herein.

The invention claimed is:

1. A satellite communication system comprising:
a plurality of satellites each having one or more beams, each beam having one or more channels and the one or more channels from each of the one or more beams from each satellite providing a global bandwidth pool;
a global bandwidth enforcer that allocates bandwidth from the global bandwidth pool in accordance with a group service plan having a predetermined geographic scope;
a first satellite access station that receives the one or more channels of the one or more beams from a first satellite included in the plurality of satellites, the first satellite access station receiving, from the global bandwidth enforcer, an allocation of bandwidth from the one or more channels of the one or more beams of the first satellite in accordance with the group service plan;
a second satellite access station that receives the one or more channels of the one or more beams from a second satellite included in the plurality of satellites, the second satellite access station receiving, from the global bandwidth enforcer, an allocation of bandwidth from the one or more channels of the one or more beams of the second satellite in accordance with the group service plan;
a first sub-network associated with the first satellite access station having a channel bandwidth manager controlling the bandwidth pool of the channel associated with the sub-network and the channel associated with a beam having a coverage area in the predetermined geographic scope of the group service plan, the first sub-network receiving an allocation of bandwidth from the first satellite access station in accordance with the group service plan, the first sub-network providing the allocated bandwidth to each user terminal service associated with the group service plan and located in the coverage area of the first sub-network; and
a second sub-network associated with the first satellite access station has a coverage area in the predetermined geographic scope of the group service plan, wherein
the first and second sub-networks associated with the first satellite access station each include a local configuration of QoS parameters in association with the group service plan,
the first sub-network generates first and second terminal service demand vectors for a network service associated with first and second user terminals associated with the group service plan and located in the coverage area of the first sub-network,
the first and second terminal service demand vectors each include a predetermined number of demand brackets, and
bandwidth demand for the network service received from the first and second user terminals is linearly or exponentially proportioned among the predetermined number of demand brackets of the first and second terminal service demand vectors, respectively.

2. The satellite communication system according to claim 1, wherein the predetermined geographic scope includes a region covered by each beam from the plurality of satellites.

3. The satellite communication system according to claim 1, wherein the predetermined geographic scope includes a region covered by a subset of beams from the plurality of satellites.

4. The satellite communication system according to claim 1, wherein
the group service plan includes a global configuration of QoS parameters,
the first and second satellite access stations each include a local configuration of QoS parameters in association with the group service plan, and
the global bandwidth enforcer adjusts the local configuration of QoS parameters at the first and second satellite access stations in accordance with the global configuration of QoS parameters and bandwidth demand reported by the first and second satellite access stations.

5. The satellite communication system according to claim 4, wherein:
the first satellite access station adjusts the local configuration of QoS parameters of each of the first and second sub-networks in accordance with the adjustments from the global bandwidth enforcer and bandwidth demand reported from the first and second sub-networks.

6. The satellite communication system according to claim 5, wherein
the network service is associated with third and fourth user terminals associated with the group service plan and located in the coverage area of the second sub-network, and
the second sub-network generates third and fourth terminal service demand vectors for the network service associated with the third and fourth user terminals, and
the first and second terminal service demand vectors are aggregated to form a first sub-network demand vector and the third and fourth terminal service demand vectors are aggregated to form a second demand sub-network vector.

7. The satellite communication system according to claim 6, wherein
the network service is associated with a first priority,
the first and second terminal service demand vectors are only aggregated with other terminal service demand vectors in the first sub-network having the first priority to form the first sub-network demand vector,
the third and fourth terminal service demand vectors are only aggregated with other demand vectors in the second sub-network having the first priority to form the second sub-network demand vector,
the first sub-network demand vector is combined, to form a first sub-network demand matrix, with at least another sub-network demand vector having a priority different than the first priority and associated with the first sub-network,
the second sub-network demand vector is combined, to form a second sub-network demand matrix, with at least another sub-network demand vector having a priority different than the first priority and associated with the second sub-network,
the bandwidth demand reported from the first sub-network is the first sub-network demand matrix, and
the bandwidth demand reported from the second sub-network is the second sub-network demand matrix.

8. The satellite communication system according to claim 5, wherein
each of the predetermined number of brackets in the first terminal service demand vector is divided by a cost for bandwidth demand associated with the network service of the first terminal.

9. The satellite communication system according to claim 7, wherein
the first satellite access station receives the first sub-network demand matrix and the second sub-network demand matrix, and
the bandwidth demand reported by the first satellite access station is an aggregation of the first sub-network demand matrix with the second sub-network demand matrix.

10. The satellite communication system according to claim 1, wherein each satellite included in the plurality of satellites is a Ka type satellite operating in the Ka band.

11. The satellite communication system according to claim 1, wherein at least one terminal associated with the group service plan is mobile.

12. The satellite communication system according to claim 1, wherein at least one terminal associated with the group service plan is in a fixed location.

13. The satellite communication system according to claim 1, wherein the global configuration of QoS parameters includes at least one of Committed Information Rate (CIR), Maximum Information Rate (MIR), cost for bandwidth demand, and priority of service.

14. A satellite communication method comprising:
allocating, by a global bandwidth enforcer, bandwidth from a global bandwidth pool in accordance with a group service plan having a predetermined geographic scope, the global bandwidth pool provided by a plurality of satellites each having one or more beams, each beam having one or more channels and the one or more channels from each of the one or more beams from each satellite;
providing, to a first satellite access station that receives the one or more channels of the one or more beams from a first satellite included in the plurality of satellites, an allocation of bandwidth from the global bandwidth pool in accordance with the group service plan; and
providing, to a second satellite access station that receives the one or more channels of the one or more beams from a second satellite included in the plurality of satellites, an allocation of bandwidth from the global bandwidth pool in accordance with the group service plan, wherein
a first sub-network associated with the first satellite access station and having a channel bandwidth manager controlling the bandwidth pool of the channel associated with the sub-network and the channel associated with a beam having a coverage area in the predetermined geographic scope of the group service plan, receives an allocation of bandwidth from the first satellite access station in accordance with the group service plan, the first sub-network providing the allocated bandwidth to each user terminal service associated with the group service plan and located in the coverage area of the first sub-network, wherein
a second sub-network associated with the first satellite access station has a coverage area in the predetermined geographic scope of the group service plan, and
the first and second sub-networks associated with the first satellite access station each include a local configuration of QoS parameters in association with the group service plan, and the method further comprises:
generating, at the first sub-network, first and second terminal service demand vectors for a network service associated with first and second user terminals associated with the group service plan and located in the coverage area of the first sub-network, the first and second terminal service demand vectors each including a predetermined number of demand brackets, and
linearly or exponentially proportioning bandwidth demand for the network service received from the first and second user terminal among the predetermined number of demand brackets of the first and second terminal service demand vectors, respectively.

15. The satellite communication method according to claim 14, wherein the predetermined geographic scope includes a region covered by each beam from the plurality of satellites.

16. The satellite communication method according to claim 14, wherein the predetermined geographic scope includes a region covered by a subset of beams from the plurality of satellites.

17. The satellite communication method according to claim 14, wherein
the group service plan includes a global configuration of QoS parameters, and
the first and second satellite access stations each include a local configuration of QoS parameters in association with the group service plan, and the method further comprises:
adjusting, by the global bandwidth enforcer, the local configuration of QoS parameters at the first and second satellite access stations in accordance with the global configuration of QoS parameters and bandwidth demand reported by the first and second satellite access stations.

18. The satellite communication method according to claim 17, wherein
the method further comprises:
adjusting the local configuration of QoS parameters of each of the first and second sub-networks in accordance with the adjustments from the global bandwidth enforcer and bandwidth demand reported from the first and second sub-networks.

19. The satellite communication method according to claim 18, wherein
the network service is associated with third and fourth user terminals associated with the group service plan and located in the coverage area of the second sub-network, the method further comprises:
generating, at the second sub-network, third and fourth terminal service demand vectors for the network service associated with the third and fourth user terminals, and
aggregating the first and second terminal service demand vectors to form a first sub-network demand vector and the third and fourth terminal service demand vectors are aggregated to form a second demand sub-network vector.

20. The satellite communication method according to claim 19, wherein
the network service is associated with a first priority,
the first and second terminal service demand vectors are only aggregated with other terminal service demand vectors in the first sub-network having the first priority to form the first sub-network demand vector,
the third and fourth terminal service demand vectors are only aggregated with other demand vectors in the second sub-network having the first priority to form the second sub-network demand vector,
the first sub-network demand vector is combined, to form a first sub-network demand matrix, with at least another sub-network demand vector having a priority different than the first priority and associated with the first sub-network,
the second sub-network demand vector is combined, to form a second sub-network demand matrix, with at least another sub-network demand vector having a priority different than the first priority and associated with the second sub-network, the bandwidth demand reported from the first sub-network is the first sub-network demand matrix, and the bandwidth demand reported from the second sub-network is the second sub-network demand matrix.

21. The satellite communication method according to claim 18, the method further comprising:

dividing, by a cost for bandwidth demand associated with the network service of the first terminal, each of the predetermined number of brackets in the first terminal service demand vector.

22. The satellite communication method according to claim 20, wherein the first satellite access station receives the first sub-network demand matrix and the second sub-network demand matrix, and the bandwidth demand reported by the first satellite access station is an aggregation of the first sub-network demand matrix with the second sub-network demand matrix.

23. The satellite communication method according to claim 14, wherein each satellite included in the plurality of satellites is a Ka type satellite operating in the Ka band.

24. The satellite communication system according to claim 14, wherein at least one terminal associated with the group service plan is mobile.

25. The satellite communication method according to claim 14, wherein at least one terminal associated with the group service plan is in a fixed location.

26. The satellite communication method according to claim 14, wherein the global configuration of QoS parameters includes at least one of Committed Information Rate (CIR), Maximum Information Rate (MIR), cost for bandwidth demand, and priority of service.

27. A non-transitory computer readable storage medium having instructions stored therein, which when executed by a processor in a global bandwidth enforcer, causes the processor to execute a method comprising:

allocating, by the global bandwidth enforcer, bandwidth from a global bandwidth pool in accordance with a group service plan having a predetermined geographic scope, the global bandwidth pool provided by a plurality of satellites each having one or more beams, each beam having one or more channels and the one or more channels from each of the one or more beams from each satellite;

providing, to a first satellite access station that receives the one or more channels of the one or more beams from a first satellite included in the plurality of satellites, an allocation of bandwidth from the global bandwidth pool in accordance with the group service plan; and providing, to a second satellite access station that receives the one or more channels of the one or more beams from a second satellite included in the plurality of satellites, an allocation of bandwidth from the global bandwidth pool in accordance with the group service plan, wherein a first sub-network associated with the first satellite access station and having a channel bandwidth manager controlling the bandwidth pool of the channel associated with the sub-network and the channel associated with a beam having a coverage area in the predetermined geographic scope of the group service plan, receives an allocation of bandwidth from the first satellite access station in accordance with the group service plan, the first sub-network providing the allocated bandwidth to each user terminal service associated with the group service plan and located in the coverage area of the first sub-network, wherein a second sub-network associated with the first satellite access station has a coverage area in the predetermined geographic scope of the group service plan, and the first and second sub-networks associated with the first satellite access station each include a local configuration of QoS parameters in association with the group service plan, and the method further comprises:

generating, at the first sub-network, first and second terminal service demand vectors for a network service associated with first and second user terminals associated with the group service plan and located in the coverage area of the first sub-network, the first and second terminal service demand vectors each including a predetermined number of demand brackets, and linearly or exponentially proportioning bandwidth demand for the network service received from the first and second user terminal among the predetermined number of demand brackets of the first and second terminal service demand vectors, respectively.

28. The non-transitory computer readable storage medium according to claim 27, wherein the predetermined geographic scope includes a region covered by each beam from the plurality of satellites.

29. The non-transitory computer readable storage medium according to claim 27, wherein the predetermined geographic scope includes a region covered by a subset of beams from the plurality of satellites.

30. The non-transitory computer readable storage medium according to claim 27, wherein the group service plan includes a global configuration of QoS parameters, and the first and second satellite access stations each include a local configuration of QoS parameters in association with the group service plan, and the instructions further cause the processor to execute the method comprising:

adjusting, by the global bandwidth enforcer, the local configuration of QoS parameters at the first and second satellite access stations in accordance with the global configuration of QoS parameters and bandwidth demand reported by the first and second satellite access stations.

31. The non-transitory computer readable storage medium according to claim 30, wherein the instructions further cause the processor to execute the method comprising:

adjusting the local configuration of QoS parameters of each of the first and second sub-networks in accordance with the adjustments from the global bandwidth enforcer and bandwidth demand reported from the first and second sub-networks.

32. The non-transitory computer readable storage medium according to claim 31, wherein the network service is associated with third and fourth user terminals associated with the group service plan and located in the coverage area of the second sub-network, and the instructions further cause the processor to execute the method comprising:

generating, at the second sub-network, third and fourth terminal service demand vectors for the network service associated with the third and fourth user terminals, and aggregating the first and second terminal service demand vectors to form a first sub-network demand vector and the third and fourth terminal service demand vectors are aggregated to form a second demand sub-network vector.

33. The non-transitory computer readable storage medium according to claim 32, wherein
the network service is associated with a first priority,
the first and second terminal service demand vectors are only aggregated with other terminal service demand vectors in the first sub-network having the first priority to form the first sub-network demand vector,
the third and fourth terminal service demand vectors are only aggregated with other demand vectors in the second sub-network having the first priority to form the second sub-network demand vector,
the first sub-network demand vector is combined, to form a first sub-network demand matrix, with at least another sub-network demand vector having a priority different than the first priority and associated with the first sub-network,
the second sub-network demand vector is combined, to form a second sub-network demand matrix, with at least another sub-network demand vector having a priority different than the first priority and associated with the second sub-network,
the bandwidth demand reported from the first sub-network is the first sub-network demand matrix, and
the bandwidth demand reported from the second sub-network is the second sub-network demand matrix.

34. The non-transitory computer readable storage medium according to claim 31, wherein the instructions further cause the processor to execute the method comprising:
dividing, by a cost for bandwidth demand associated with the network service of the first terminal, each of the predetermined number of brackets in the first terminal service demand vector.

35. The non-transitory computer readable storage medium according to claim 33, wherein
the first satellite access station receives the first sub-network demand matrix and the second sub-network demand matrix, and
the bandwidth demand reported by the first satellite access station is an aggregation of the first sub-network demand matrix with the second sub-network demand matrix.

36. The non-transitory computer readable storage medium according to claim 27, wherein each satellite included in the plurality of satellites is a Ka type satellite operating in the Ka band.

37. The non-transitory computer readable storage medium according to claim 27, wherein at least one terminal associated with the group service plan is mobile.

38. The non-transitory computer readable storage medium according to claim 27, wherein at least one terminal associated with the group service plan is in a fixed location.

39. The non-transitory computer readable storage medium according to claim 27, wherein the global configuration of QoS parameters includes at least one of Committed Information Rate (CIR), Maximum Information Rate (MIR), cost for bandwidth demand, and priority of service.

* * * * *